United States Patent
Sugitani

[11] Patent Number: 6,147,487
[45] Date of Patent: Nov. 14, 2000

[54] MAGNETIC ROTATION DETECTOR FOR DETECTING CHARACTERISTIC OF A ROTARY MEMBER

[75] Inventor: Nobuyoshi Sugitani, Toyota, Japan

[73] Assignee: Toyota Jidosha Kabushiki Kaisha, Toyota, Japan

[21] Appl. No.: 08/764,111

[22] Filed: Dec. 6, 1996

[30] Foreign Application Priority Data

Dec. 6, 1995 [JP] Japan ................................. 7-318412

[51] Int. Cl.[7] ........................ G01P 3/487; G01D 5/245
[52] U.S. Cl. ............................... 324/207.21; 324/207.25
[58] Field of Search ...................... 324/207.21, 207.25, 324/174; 338/32 R; 428/692

[56] References Cited

U.S. PATENT DOCUMENTS

| | | | |
|---|---|---|---|
| 4,274,053 | 6/1981 | Ito et al. | 324/207.21 |
| 4,694,688 | 9/1987 | Takahashi et al. | 324/207.21 |
| 4,851,771 | 7/1989 | Ikeda et al. | 324/207.21 |
| 4,949,039 | 8/1990 | Grunberg . | |
| 5,315,282 | 5/1994 | Shinjo et al. | 324/207.21 |
| 5,475,304 | 12/1995 | Prinz | 324/207.21 |
| 5,617,071 | 4/1997 | Daughton | 324/207.21 |

FOREIGN PATENT DOCUMENTS

| | | |
|---|---|---|
| 61-201486 | 9/1986 | Japan . |
| 63-166601 | 7/1988 | Japan . |
| 261572 | 3/1990 | Japan . |
| 3287087 | 12/1991 | Japan . |
| 4370763 | 12/1992 | Japan . |

*Primary Examiner*—Walter E. Snow
*Attorney, Agent, or Firm*—Kenyon & Kenyon

[57] ABSTRACT

A magnetic rotation detector is composed of a rotary element alternately magnetized with north and south magnetic poles in a circumferential direction and arranged to rotatable about a rotational axis, a magnetoresistance element arranged to be opposed to the magnetized portion of the rotary element, the magnetoresistance element including a linearly patterned superlattice composed of alternately layered magnetic and nonmagnetic metals, and a signal processing circuit placed in a remote position apart from the magnetoresistance element and connected to a pair of terminals of the superlattice to produce a series of pulse signals based on variation of the resistance value of the superlattice caused by change of intensity of a field of the rotary element.

23 Claims, 49 Drawing Sheets

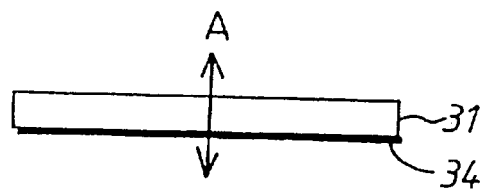
Fig.3(A)
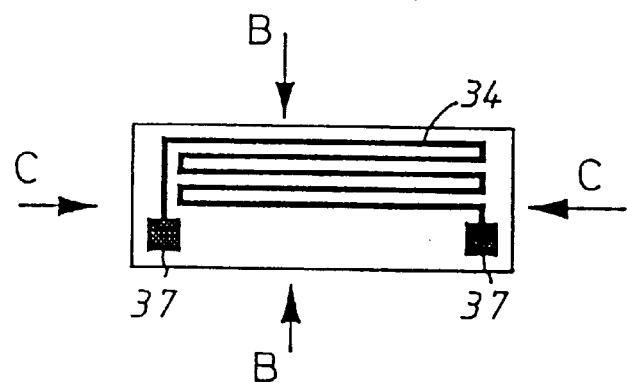
Fig.3(B)
Fig.4
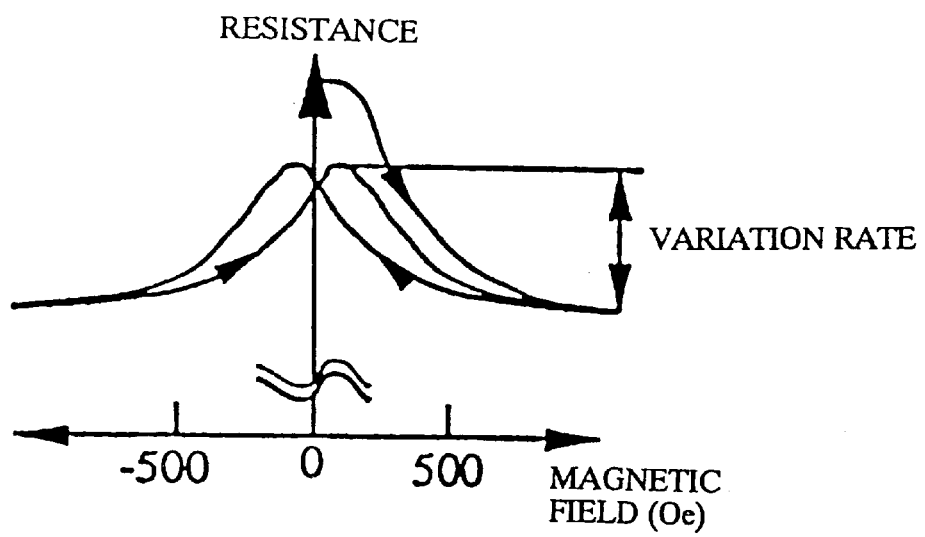

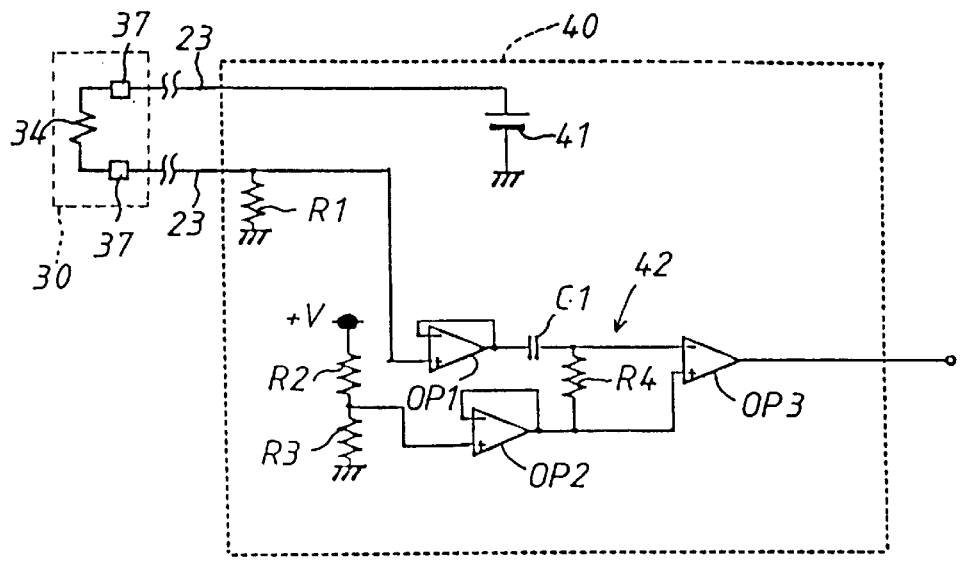
Fig. 15
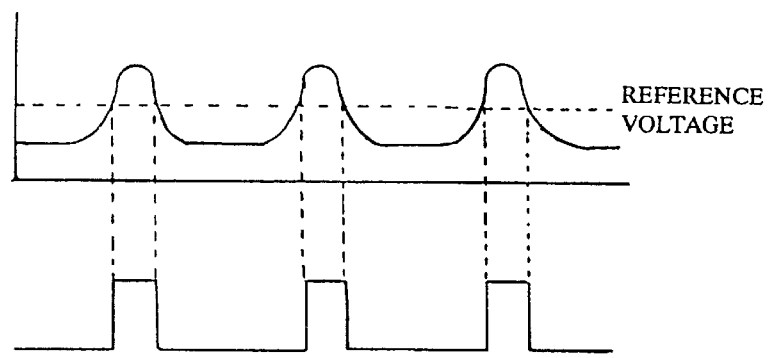
Fig. 16(A)
Fig. 16(B)

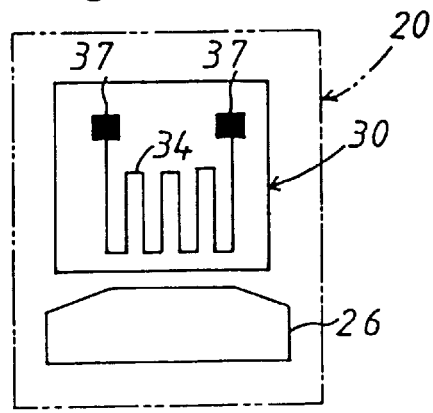
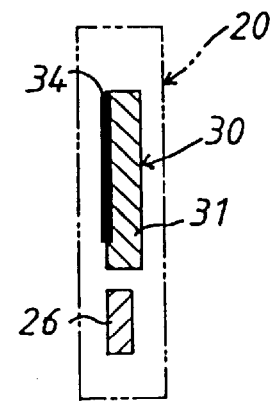
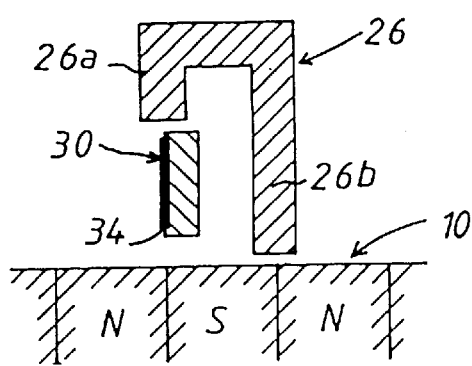
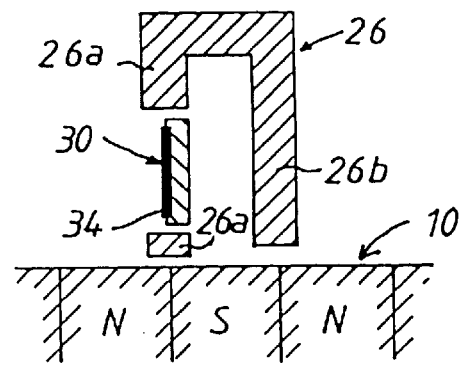
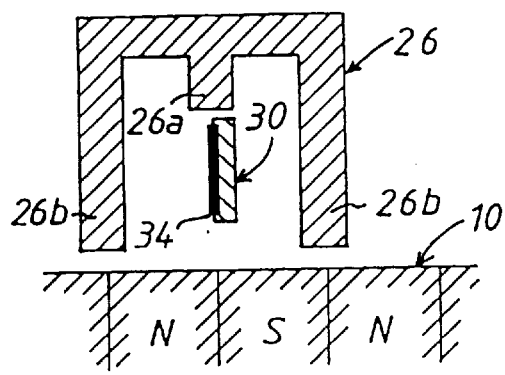
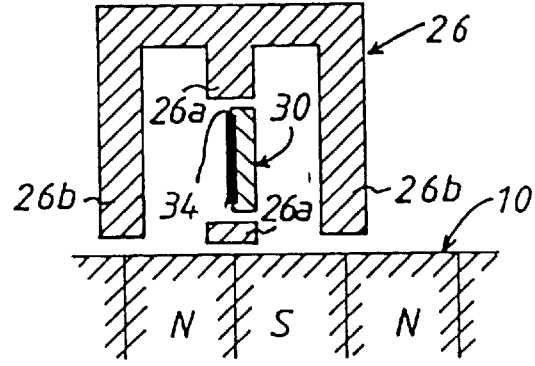

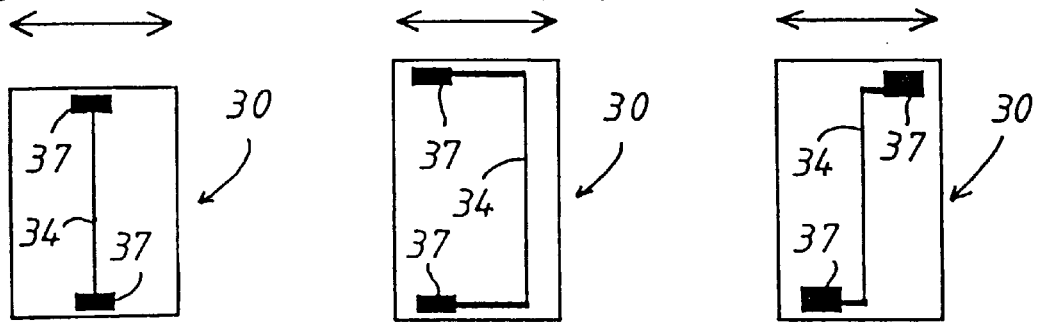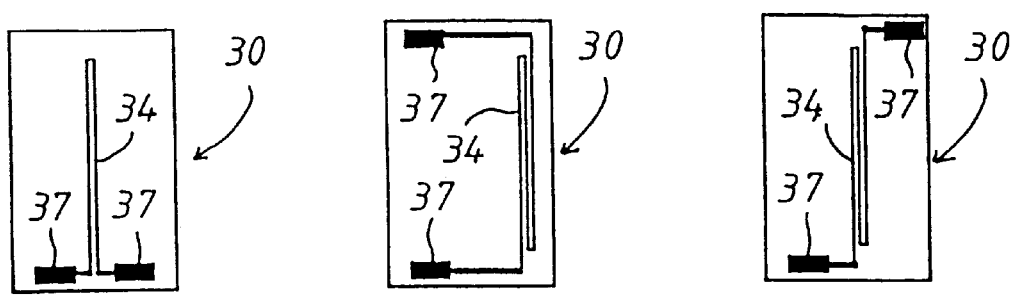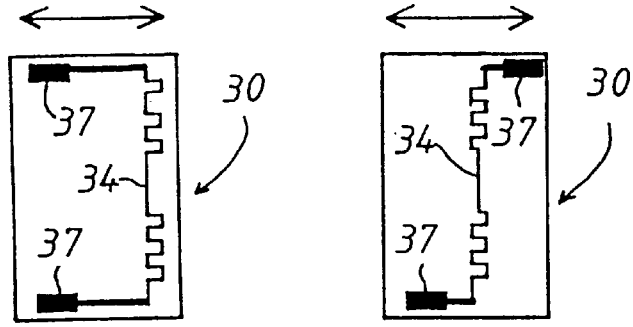

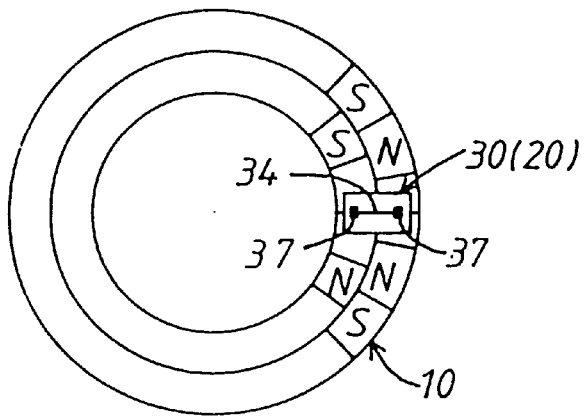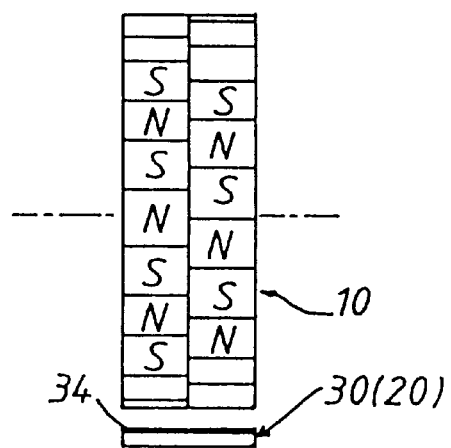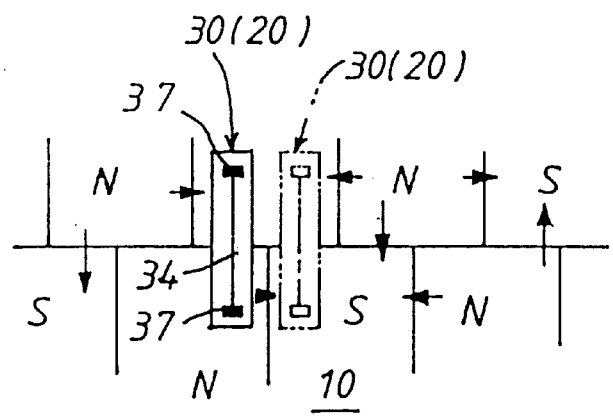

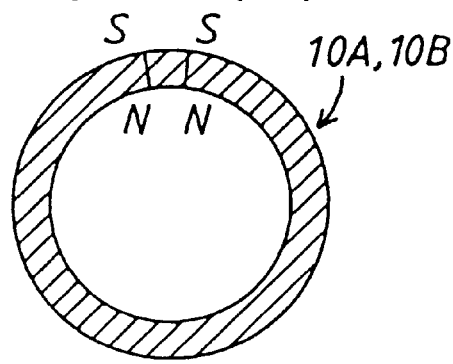
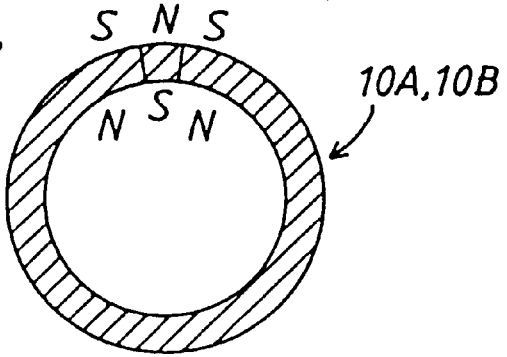
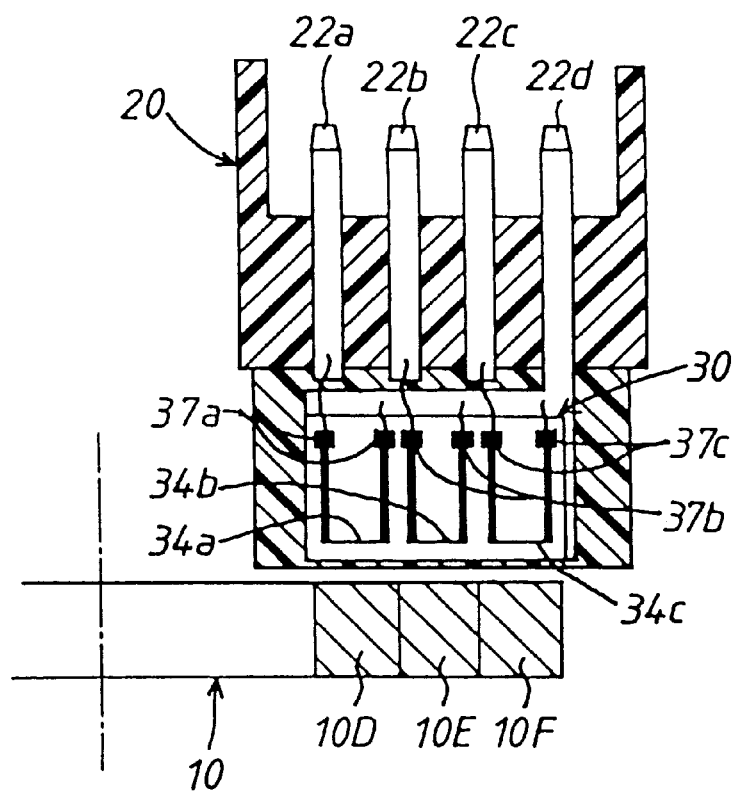

MAGNETIC ROTATION DETECTOR FOR DETECTING CHARACTERISTIC OF A ROTARY MEMBER

BACKGROUND OF THE INVENTION

1. Field of the Invention

The present invention relates to a magnetic rotation detector for magnetically detecting a rotation angle, a rotational direction or a rotation speed of a rotary member in various kinds of devices in automotive vehicles.

2. Description of the Prior Art

In Japanese Patent Laid-open Publication No. 4(1992)-370763, there has been proposed a magnetic rotation detector of the type which includes a set of magnetoresistance elements provided adjacent to a magnetized gear such that the resistance value of the magnetoresistance elements is converted into a voltage signal in accordance with rotation of the magnetized gear and that the value of the converted voltage signal is compared with a reference voltage to produce a series of pulse signals. In the magnetic rotation detector, however, the magnetoresistance elements are in the form of a bridge circuit since variation of the resistance value relative to variation of the magnetic field is small. Accordingly, the magnetic rotation detector is provided with at least three terminals such a source terminal, an earth terminal and an output terminal for producing the series of pulse signals. Due to small variation of the resistance value of the magnetoresistance elements, the rotation detector is further provided with various circuits such as an amplifier, a waveform shaper, etc. to apply an output of the magnetoresistance elements to an electric control apparatus placed in a remote position apart therefrom. In such an arrangement as described above, the magnetic rotation detector is provided with various circuits including a condenser for prevention of radiowave disturbance and is electromagnetically shielded. For these reasons, the magnetic rotation detector becomes costly.

SUMMARY OF THE INVENTION

It is, therefore, a primary object of the present invention to provide a magnetic rotation detector in which a magnetoresistance element including a linearly patterned superlattice composed of alternately layered magnetic and nonmagnetic metals is adapted to magnetically detect rotation of a rotary member as accurately as possible at a low cost.

According to the present invention, there is provided a magnetic rotation detector which comprises a rotary element alternately magnetized with different magnetic poles in a circumferential direction and arranged to be rotatable about a rotational axis, a magnetoresistance element arranged to be opposed to the magnetized portion of the rotary element, the magnetoresistance element including a linearly patterned superlattice composed of alternately layered magnetic and nonmagnetic metals, and a signal processing circuit placed in a remote position apart from the magnetoresistance element and connected to a pair of terminals of the superlattice to produce a series of pulse signals based on variation of the resistance value of the superlattice caused by change of intensity of a magnetic field of the rotary element.

According to an aspect of the present invention, there is provided a magnetic rotation detector which comprises a rotary element mounted on a rotary portion of an automotive vehicle to be rotated therewith about a rotational axis, the rotary element being alternately magnetized with different magnetic poles in a circumferential direction, a magnetoresistance element mounted on a stationary portion of the vehicle in a position opposed to the magnetized portion of the rotary element, the magnetoresistance element including a linearly patterned superlattice composed of alternately layered magnetic and nonmagnetic metals, a cover member mounted on the stationary portion of the vehicle to contain the rotary element and the magrietoresistance element, and a signal processing circuit mounted on the vehicle body in a remote position apart from the magnetoresistance element and connected to the superlattice through a leading wire for producing a series of pulse signals based on variation of the resistance value of the superlattice caused by change of intensity of a magnetic field of the rotary element.

According to another aspect of the present invention, there is provided a magnetic rotation detector which comprises a rotary element arranged to be rotated about a rotational axis, the rotary element being in the form of a rotary disk alternately magnetized with north and south magnetic poles in a circumferential direction, a magnetoresistance element arranged to be opposed to the magnetized surface of the rotary element, the magnetoresistance element including a linearly patterned superlattice composed of alternately layered magnetic and nonmagnetic metals, and means for detecting rotation of the rotary element on a basis of variation of the resistance value of the superlattice, wherein a surface of the superlattice is located perpendicularly to the magnetized surface of the rotary element in a radial direction of the rotary element, and a thickness of the magnetoresistance element in a circumferential direction of the rotary element is determined to be smaller than each width of the magnetic poles.

According to a further aspect of the present invention, there is provided a magnetic rotation detector which comprises a rotary element arranged to be rotated about a rotational axis, the rotary element having first and second surfaces in parallel to one another, the first surface being magnetized with a plurality of circumferentially equally spaced first magnetic poles, and the second surface being magnetized with a plurality of circumferentially equally spaced second magnetic poles, a magnetoresistance element arranged to be opposed to the first surface of the rotary element, the magnetoresistance element including a linearly patterned superlattice composed of alternately layered magnetic and nonmagnetic metals, and means for detecting rotation of the rotary element on a basis of variation of the resistance value of the superlattice, wherein a surface of the superlattice is placed perpendicularly to the first surface of the rotary element in a radial direction of the rotary element, and a thickness of the magnetoresistance element in a direction perpendicular to the surface of the superlattice is determined to be smaller than each width of the magnetic poles in the circumferential direction of the rotary element.

According to an aspect of the present invention, there is provided a magnetic rotation detector which comprises a rotary element alternately magnetized in the same width with north and south magnetic poles in a circumferential direction and arranged to be rotatable about a rotational axis, a magnetoresistance element arranged to be opposed to the magnetized surface of the rotary element, the magnetoresistance element including a linearly patterned superlattice composed of alternately layered magnetic and nonmagnetic metals, and means for detecting rotation of the rotary element based on variation of the resistance value of the superlattice, wherein a surface of the superlattice is arranged perpendicularly to the magnetized surface of the magnetic rotary element in a direction across a radial direction of the rotary element at a right angle, and wherein the resistance value of the superlattice in a unit length is determined to be higher than the other portion at two positions spaced substantially in the same distance as each width of the north and south magnetic poles of the rotary element.

According to another aspect of the present invention, there is provided a magnetic rotation detector which comprises an annular rotary element having two annular regions formed adjacent to one another, the two annular regions each being alternately magnetized with north and south magnetic poles in the same width in such a manner that the magnetic poles of one of the annular region are different in polarity from the magnetic poles of the other annular region, a magnetoresistance element arranged to be opposed to the magnetized two annular regions of the rotary element, the magnetoresistance element including a linearly patterned superlattice composed of alternately layered magnetic and nonmagnetic metals, and means for detecting rotation of the rotary element based on variation of the resistance value of the superlattice, wherein the surface of the superlattice is arranged perpendicularly to the magnetized two annular regions of the rotary element in a radial direction of the rotary element, and wherein the magnetoresistance element is formed smaller in thickness than each width of the magnetic poles in a circumferential direction of the rotary element.

According to a still another aspect of the present invention, there is provided a magnetic rotation detector which comprises an annular rotary element alternately magnetized with north and south magnetic poles respectively at the inner and outer peripheries thereof in such a manner that the magnetic poles at the outer periphery are different in polarity from the magnetic poles at the inner periphery, a magnetoresistance element arranged to be opposed to an upper surface of the rotary element, the magnetoresistance element including a linearly patterned superlattice composed of alternately layered magnetic and nonmagnetic metals, and means for detecting rotation of the rotary element based on variation of the resistance value of the superlattice, wherein a surface of the superlattice is arranged perpendicularly to the upper surface of the rotary element in the radial direction of the rotary element, and wherein the magnetoresistance element is formed smaller in thickness than each width of the magnetic poles in the circumferential direction of the rotary element.

According to an aspect of the present invention, there is provided a magnetic rotation detector which comprises a rotary element alternately magnetized in the same width with north and south magnetic poles in a circumferential direction, the rotary element being arranged to be rotatable about a rotation axis, a magnetoresistance element arranged to be opposed to the magnetized surface of the rotary element, the magnetoresistance element including a linearly patterned superlattice composed of alternately layered magnetic and nonmagnetic metals, and means for detecting rotation of the rotary element based on variation of the resistance of the superlattice, wherein a surface of the superlattice is arranged in parallel with the magnetized surface of the rotary element in a direction crossing the rotational direction of the rotary element at a right angle, and wherein the superlattice is formed smaller in width than each width of the magnetic poles in the rotational direction of the rotary element.

According to a further aspect of the present invention, there is provided a magnetic rotation detector which comprises an annular rotary element having two annular regions formed adjacent to one another, the two annular regions each being alternately magnetized with north and south magnetic poles in the same width in such a manner the magnetic poles of one of the annular regions are different in polarity from the magnetic poles of the other annular region, a magnetoresistance element arranged to be opposed to the magnetized two annular regions of the rotary element, the magnetoresistance element including a linearly patterned superlattice composed of alternately layered magnetic and nonmagnetic metals, and means for detecting rotation of the rotary element based on variation of the resistance value of the superlattice, wherein a surface of the superlattice is arranged in parallel with the magnetized surface of the rotary element in a direction crossing the rotational direction of the rotary element at a right angle, and wherein the superlattice is formed smaller in width than each width of the magnetic poles in the rotational direction of the rotary element.

According to an aspect of the present invention, there is provided a magnetic rotation detector which comprises an annular rotary element alternately magnetized in the same width with north and south magnetic poles respectively at first and second annular surfaces thereof in such a manner that the magnetic poles at the first annular surface are different in polarity from the magnetic poles at the second annular surface, a magnetoresistance element arranged to be opposed to one of magnetized annular surfaces of the rotary element, the magnetoresistance element including a linearly patterned superlattice composed of alternately layered magnetic and nonmagnetic metals, and means for detecting rotation of the rotary element based on variation of the resistance value of the superlattice, wherein a surface of the superlattice is arranged in parallel with a third annular surface of the rotary element in a direction crossing the rotational direction of the rotary element at a right angle, and wherein the superlattice is formed smaller in width than each width of the magnetic poles in the rotational direction of the rotary element.

BRIEF DESCRIPTION OF THE DRAWINGS

In the accompanying drawings:

FIG. 3(A) is a front view of the magnetoresistance element;

FIG. 3(B) is a plan view of the magnetoresistance element;

FIG. 4 is a graph illustrating variation of a resistance value in relation to intensity of a magnetic field of a magnetic rotary element;

FIG. 15 is a diagram of a signal processing circuit shown in FIG. 1;

FIG. 16(A) is a view showing a waveform of a voltage signal applied to the signal processing circuit of FIG. 15;

FIG. 16(B) illustrates a waveform of a pulse signal produced by the signal processing circuit;

FIG. 37(A) is a plan view of a rotation sensor having a magnetoresistance element provided with a magnetic plate;

FIG. 37(B) is a side view of the rotation sensor shown in FIG. 37(A);

FIGS. 38(A)–38(D) illustrate modifications of the magnetic plate shown in FIG. 37(A);

FIGS. 50(A)–50(H) illustrate modifications of the superlattice of the magnetoresistance element respectively shown in FIGS. 47(A) and 48(A);

FIGS. 51(A)–50(E) illustrate modifications of the magnetic rotary disk shown in FIG. 47(A);

FIG. 59(A) is a plan view showing a modification of the magnetization of the magnetic rotary disk shown in FIG. 51(A);

FIG. 59(B) is a front view showing a modification of the magnetization of the magnetic rotary disk shown in FIG. 53(A);

FIG. 60 is a plan view illustrating an operational relationship between the magnetic rotary disk and the magnetoresistance element shown in FIGS. 59(A) and 59(B);

FIGS. 66(A) and 66(B) illustrate each modification of magnetized conditions of the annular regions shown in FIGS. 63(A) and 63(B);

FIG. 67 is a sectional view of a modification of the magnetic rotation detector shown in FIG. 62;

FIGS. 72(A) and 71(B) illustrate another modification of the magnetic rotation detectors shown in FIGS. 68(A)–68 (D).

DESCRIPTION OF THE PREFERRED EMBODIMENTS

Figure 1:
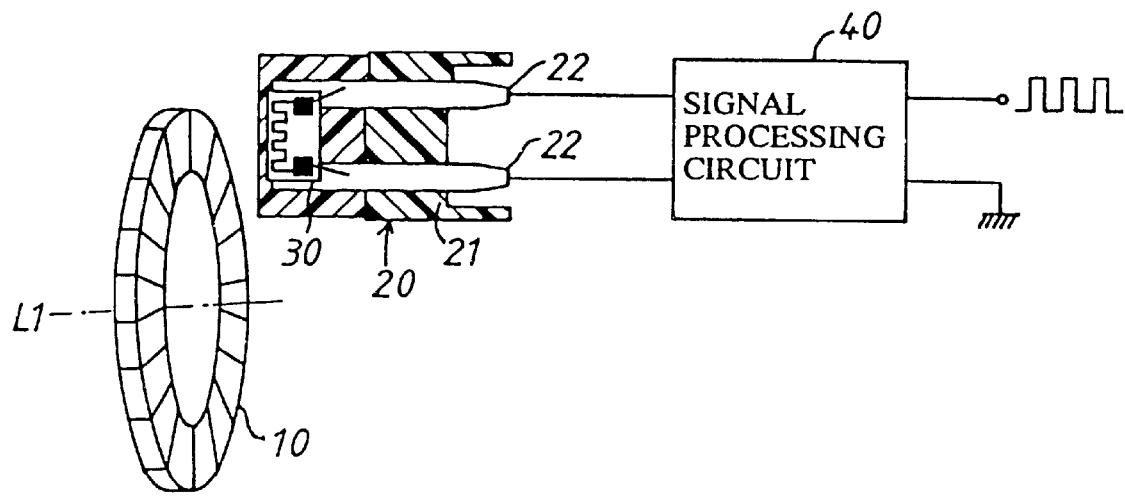
FIG. 1 is a schematic illustration of a magnetic rotation detector in accordance with the present invention.

In FIG. 1 of the drawings, there is schematically illustrated a magnetic rotation detector in accordance with the present invention which includes a rotation sensor 20 opposed to a magnetic rotary element 10 alternately magnetized with north and south magnetic poles. The rotation sensor 20 includes a magnetoresistance element 30 contained within a housing 21 made of synthetic resin. The resistance value of the magnetoresistance element 30 changes in accordance with variation of a magnetic field caused by rotation of the magnetic rotation disk 10. The rotation sensor 20 has a pair of terminals 22 connected to the magnetoresistance element 30 for connection to a signal processing circuit 40 which is applied with input voltage indicative of variation of the resistance value of the magnetoresistance element 30 to compare the input voltage with a predetermined threshold value for producing a series of pulse signals at a frequency proportional to a rotation speed of the magnetic rotary element 10.

Figure 2A:
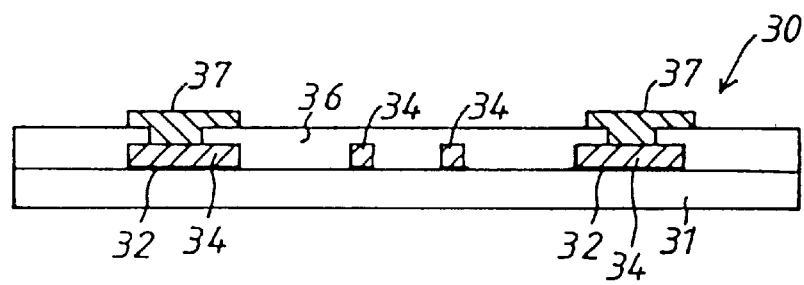
FIG. 2 (A) is a vertical sectional view of a magnetoresistance element shown in FIG. 1.
FIG. 2(B) is an enlarged sectional view of a superlattice shown in FIG. 2(A)
Figure 2B:
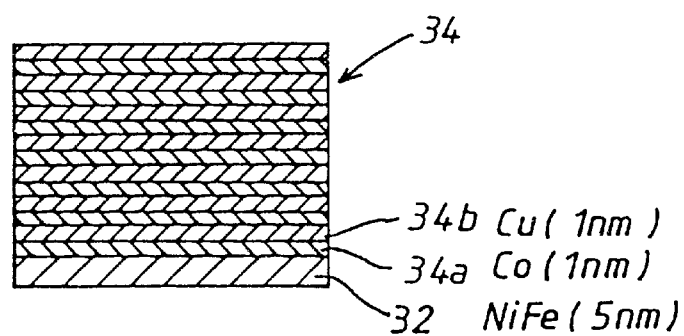

As shown in FIGS. 2(A) and 2(B), the magnetoresistance element 30 is composed of a silicon substrate plate 31 formed thereon with an insulation layer in the form of a silicon oxide membrane ($SiO_2$ membrane), a buffer layer 32 of magnetic material such as iron nickel (NiFe) formed on the silicon substrate plate 31 and a linearly patterned superlattice 34 of multilayers formed on the buffer layer 32. As shown in FIG. 2(B), the superlattice 34 is composed of alternately layered strong magnetic metal 34a and nonmagnetic metal 34b. In this embodiment, the superlattice 34 is formed by the steps of depositing a magnetic material such iron nickel as the buffer layer 32 in thickness of several nm (for instance, 5 nm) on the silicon substrate plate 31, alternately depositing cobalt and copper as the strong magnetic material 34a and nonmagnetic material 34b respectively in thickness of 1–2 nm on the buffer layer 32 and eliminating the buffer layer 32, strong magnetic metal 34a and nonmagnetic metal 34b using a linearly patterned resist layer. The buffer layer 32 and superlattices 34 thus formed are covered with a protection membrane 36 in the form of a silicon oxide membrane ($SiO_2$ membrane). When the superlattice 34 is linearly patterned, the opposite ends of superlattice 34 each are formed in a rectangular shape and provided thereon with aluminum electrodes 37 by vapor deposition after the protection membrane 36 is eliminated therefrom. Thus, the terminals 22 are connected to the electrodes 37 by means of a bonding wire and conductive adhesive material.

In FIGS. 3(A) and 3(B), there is schematically illustrated the magnetoresistance element 30 in which although a variation rate of resistance between the electrodes 37 of superlattice 34 relative to variation of intensity of a magnetic field in a direction A perpendicular to the superlattice does not greatly change, a variation rate of resistance between the electrodes 37 relative to variation of magnetic fields in directions B and C parallel to the superlattice greatly changes. As shown in FIG. 4, the resistance between the electrodes 37 of superlattice 34 becomes a maximum value when the intensity of magnetic fields in the directions B and C is zero and becomes a minimum value when the intensity of magnetic fields in the directions B and C is +500 oersted. The variation rate of the resistance between electrodes 37 relative to the intensity of the magnetic fields of +500 oersted is approximately 20%.

In preferred embodiments of the present invention described hereinafter, the magnetoresistance element 30 provided with the superlattice 34 capable of obtaining the great variation rate of the resistance has been adapted to directly transmit variation of the resistance to the signal processing circuit 40 placed in a remote position, and the construction and arrangement of the magnetoresistance element 30 and magnetic rotary element 10 have been improved to accurately detect rotation of the magnetic rotary element 10 mounted on a rotary member.

Figure 5:
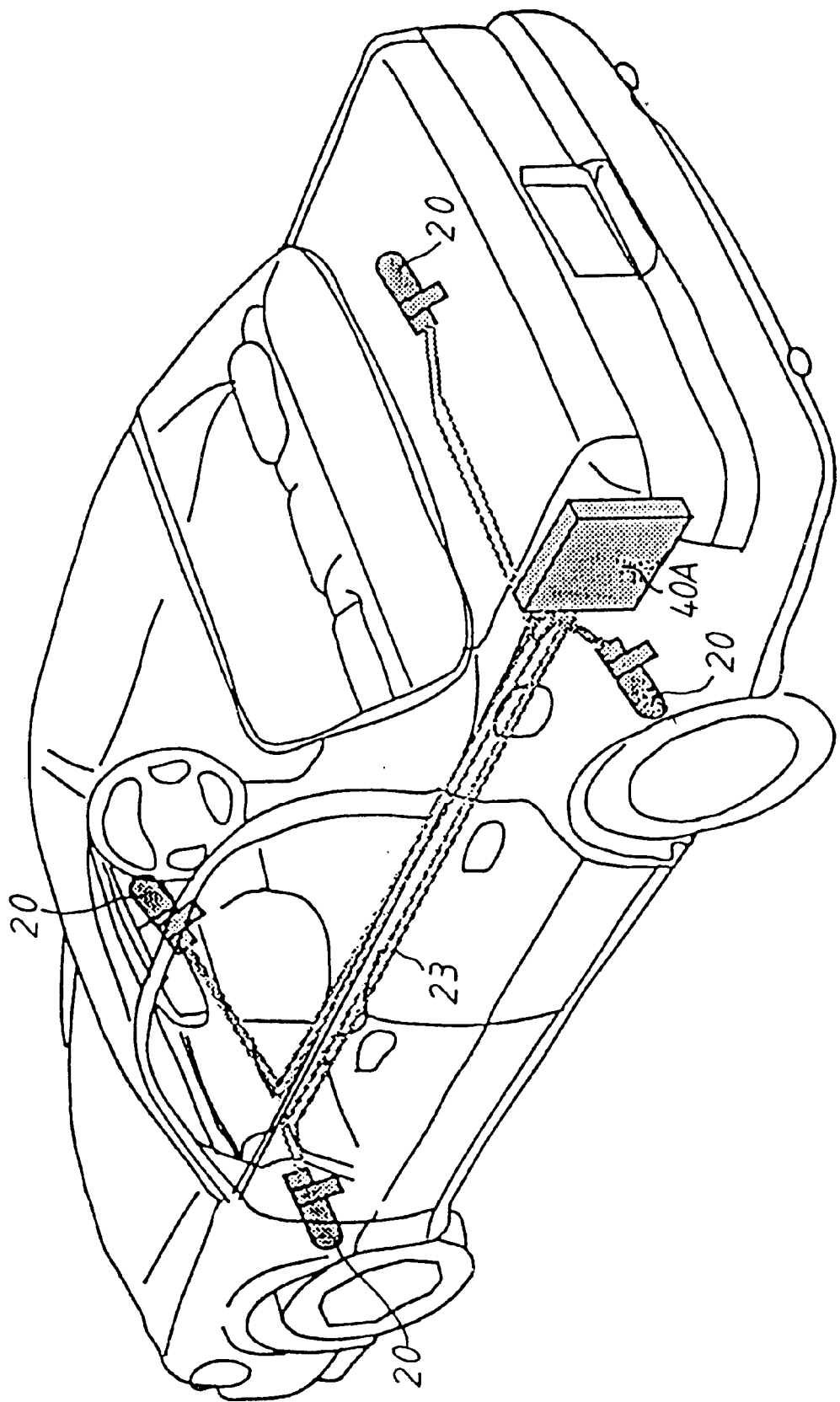
FIG. 5 is a perspective view of an automotive vehicle equipped with the magnetic rotation detector of the present invention for detecting each speed of road wheels.
Figure 6:
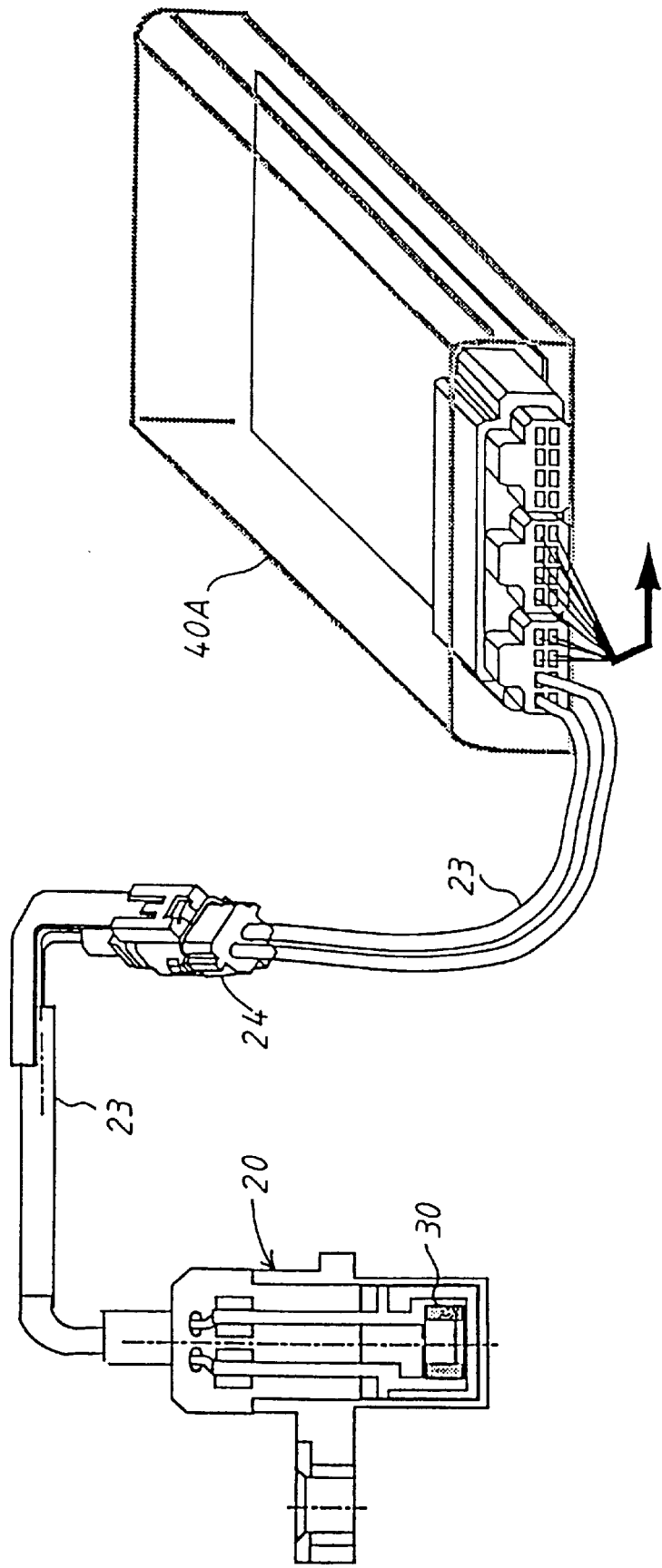
FIG. 6 is a schematic illustration of a connection between the magnetic rotation detector and an electric control apparatus shown in FIG. 5.
Figure 7:
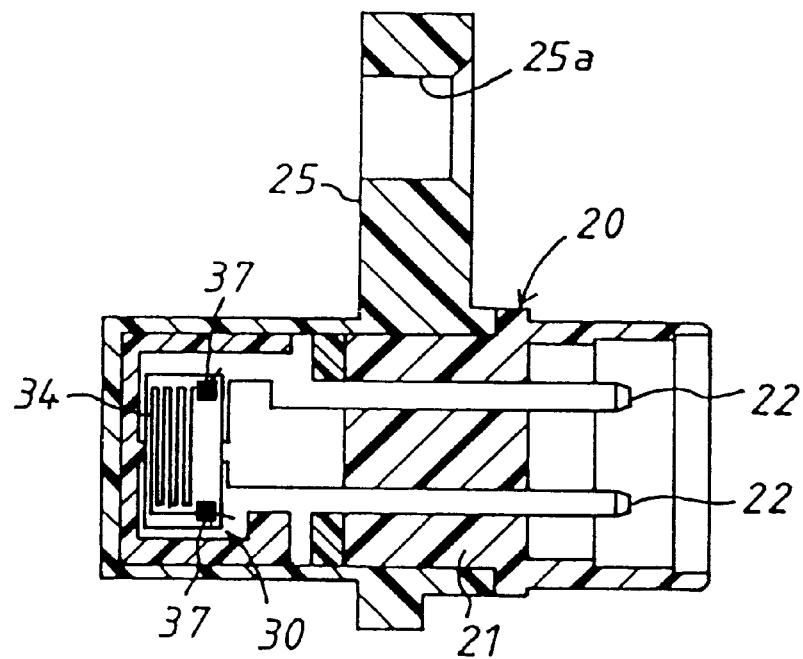
FIG. 7 is a sectional view of an embodiment of the magnetic rotation detector shown in FIG. 5.

Illustrated in FIG. 5 is an embodiment of the present invention wherein the rotation sensor 20 is adapted to detect each speed of road wheels of an automotive vehicle. As shown in FIGS. 5 and 6, the rotation sensor 20 is connected to an electric control apparatus 40A through a connecting cable 23 and a connector 24. The signal processing circuit 40 is included in the electric control apparatus 40A. As shown in FIG. 7, the rotation sensor 20 includes the magnetoresistance element 30 and terminals 22 assembled within the housing 21 which has a flange portion 25 formed with a mounting hole 25a. In the rotation sensor 20, the surface of the superlattice 34 is positioned in parallel with an axis direction of the rotation sensor 20 or an axis direction of the terminals 22. A straight line connecting the electrodes 37 is positioned perpendicular to the axis direction of the rotation sensor 20. The superlattice 34 is placed on an internal end wall of the sensor housing 21.

Figure 8:
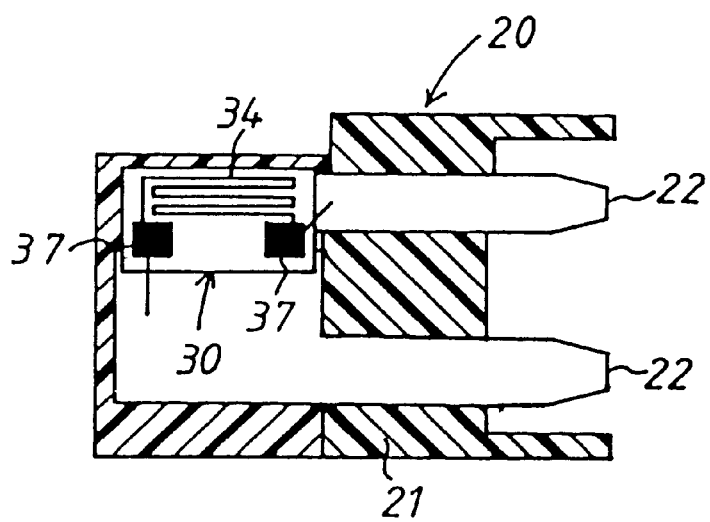
FIG. 8 is a sectional view of a first modification of the magnetic rotation detector shown in FIG. 7.
Figure 9A:
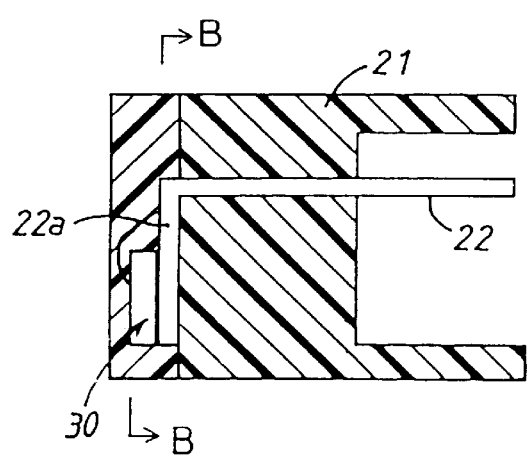
FIG. 9(A) is a sectional view of a second modification of the magnetic rotation detector shown in FIG. 7.
Figure 9B:
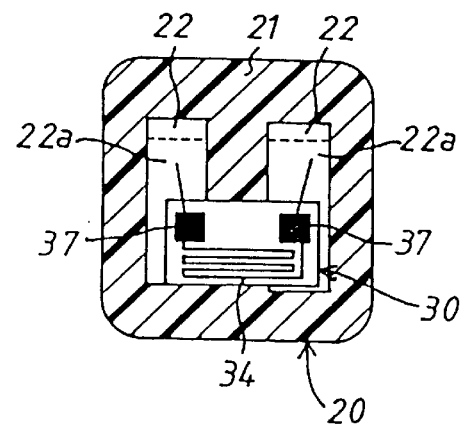
FIG. 9(B) is a cross-sectional view taken along line BB in FIG. 9(A)

In FIG. 8, there is illustrated a modification of the rotation sensor 20 wherein the straight line connecting the electrodes 37 is positioned in parallel with the axis direction of rotation sensor 20, and the superlattice 34 is placed on an internal side wall of the sensor housing 21. In another modification illustrated in FIGS. 9(A) and 9(B), the terminals 22 are bent at their internal portions 22a at a right angle and connected to the electrodes 37 of the magnetoresistance element 30 in such a manner that the surface of superlattice 34 and the straight line connecting the electrodes 37 are positioned perpendicularly to the axis direction of the rotation sensor 20. In this modification, the superlattice 34 is located at an internal end wall of the sensor housing 21. In a modification of the rotation sensor 20 illustrated in FIG. 10, a magnetic plate 26 is embedded in the distal end of the sensor housing 21 to converge lines of magnetic force from the magnetic rotary element 10 into the magnetoresistance element 30.

Figure 11:
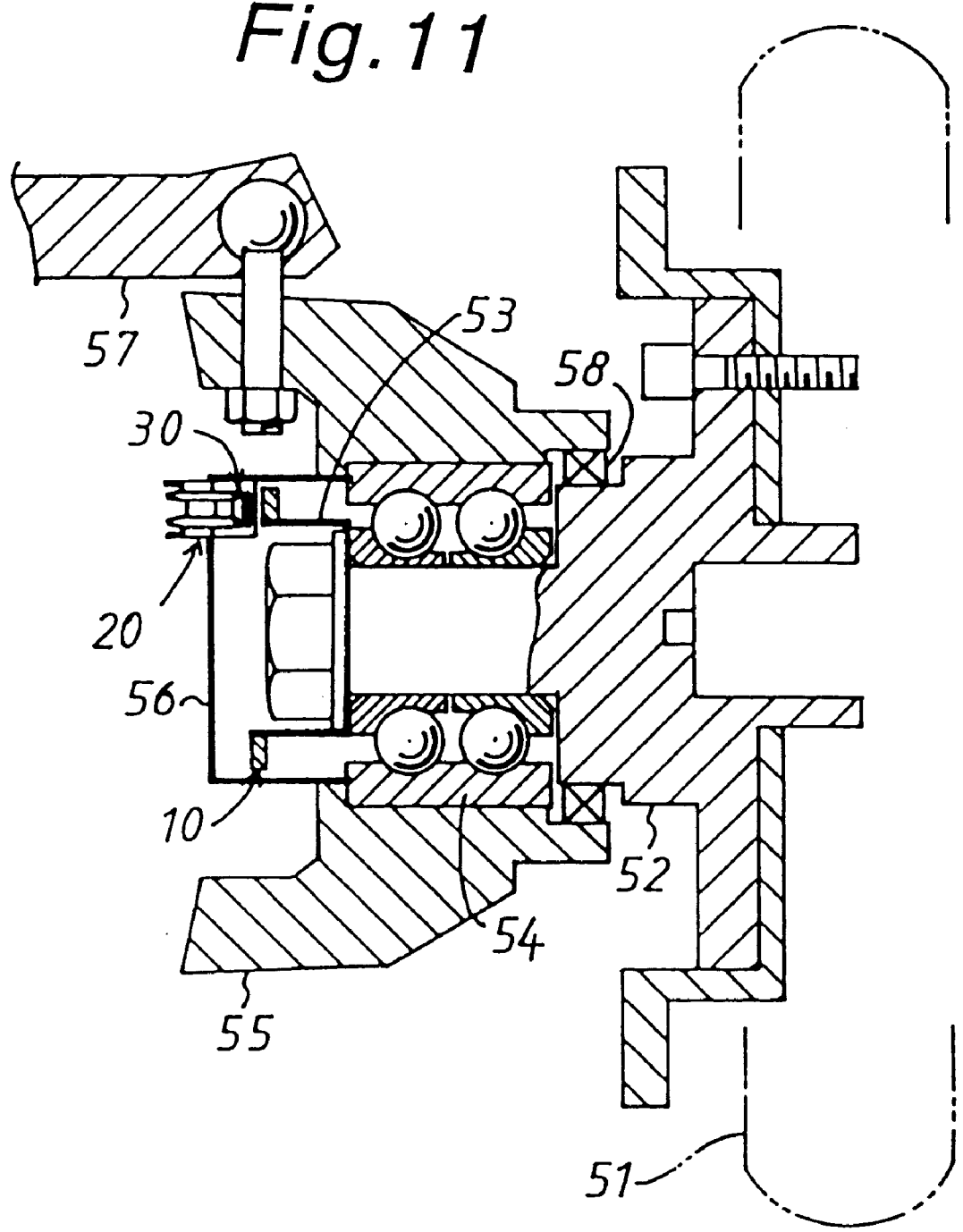
FIG. 11 is a sectional view illustrating a mounting construction of the magnetic rotation detector on a road wheel.

In FIG. 11 there is illustrated a mounting construction of the magnetic rotation detector at one of the road wheels 51 of the vehicle, wherein the magnetic rotary element 10 is fixedly mounted on to a cylindrical rotor 53 of nonmagnetic metal which is secured to a hub 52 of the road wheel 51 for rotation therewith, while the rotation sensor 20 is fixed to a cup-shaped cover 56 assembled with a carrier 55 which is connected to the vehicle body structure by means of an arm member 57 to rotatively support the hub 52 through a ball bearing 54. An annular sealing member 58 is disposed between an outer periphery of hub 52 and an inner periphery of carrier 55 to contain the magnetic rotary element 10 and the rotation sensor 20 in a fluid-tight manner within the cover 56. In such an arrangement of the magnetic rotary element 10 and the rotation sensor 20, any foreign matters such as water and contaminants do not enter into the space enclosed by the carrier 55, cover 56 and sealing member 58, and the magnetic rotary element 10 is protected from foreign particles such magnetic powders.

Figure 10:
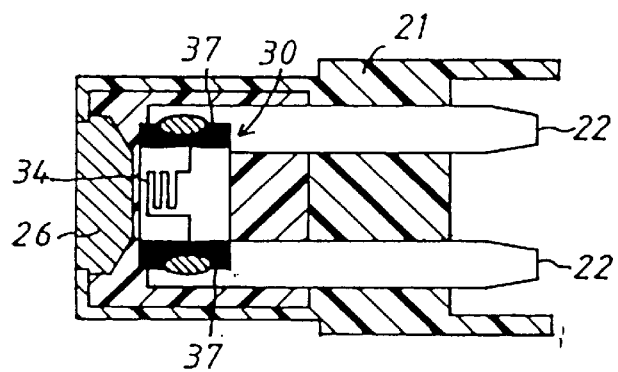
FIG. 10 is a sectional view of a third modification of the magnetic rotation detector shown in FIG. 7.

In the mounting construction shown in FIG. 11, the rotation sensor 20 is assembled with the bottom of cover 56, and the magnetic rotary element 10 is in the form of an annular member which is opposed to the distal end of the rotation sensor 20 and fixedly coupled with an outer end of the cylindrical rotor 53. The magnetic rotary element 10 is alternately magnetized at its front surface with north and south magnetic poles in a circumferential direction. The rotation sensor shown in FIG. 7 or 10 is used as the rotation sensor 20.

Figure 12:
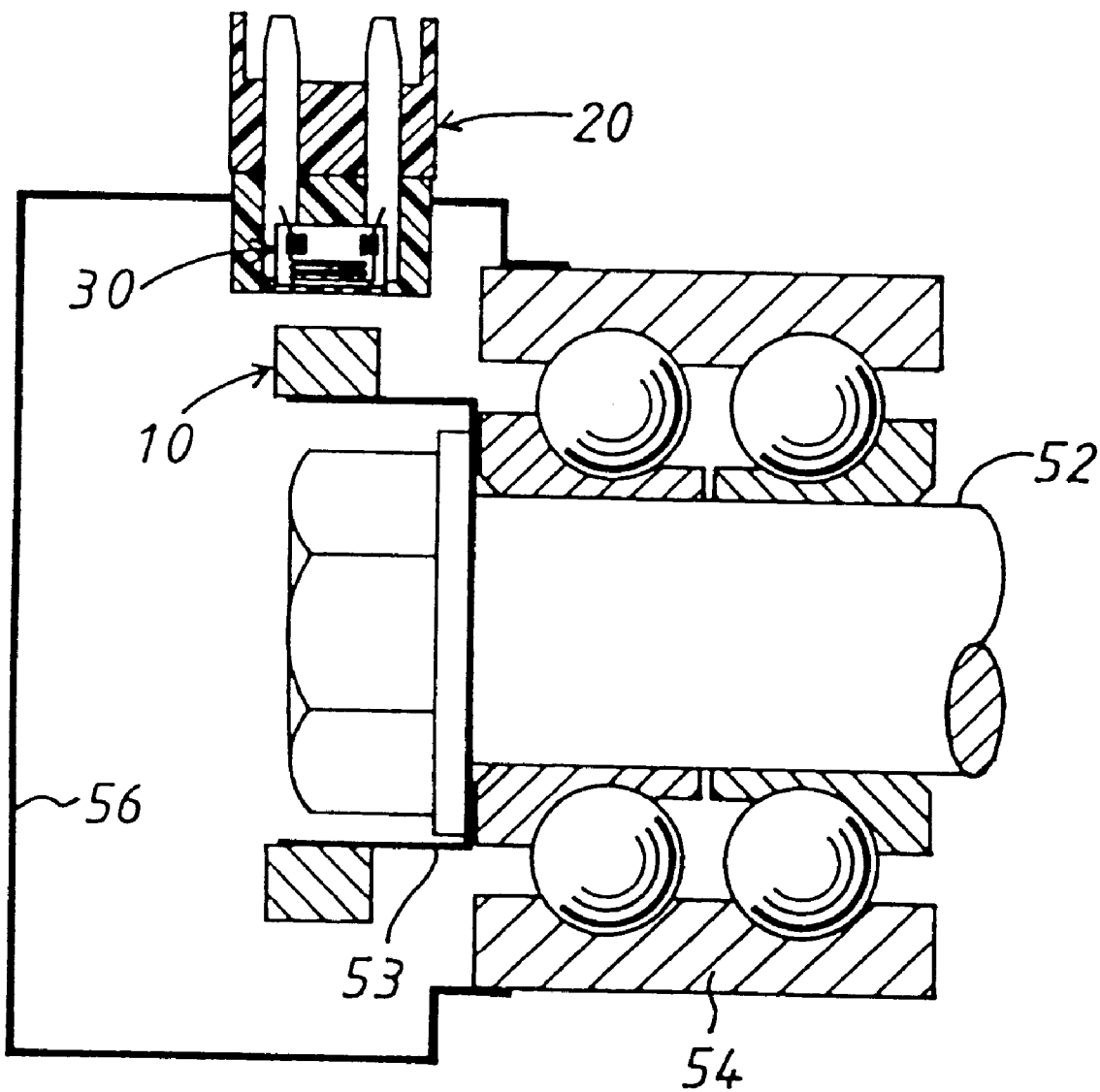
FIG. 12 is a sectional view illustrating a first modification of the mounting construction of the magnetic rotation detector.
Figure 13:
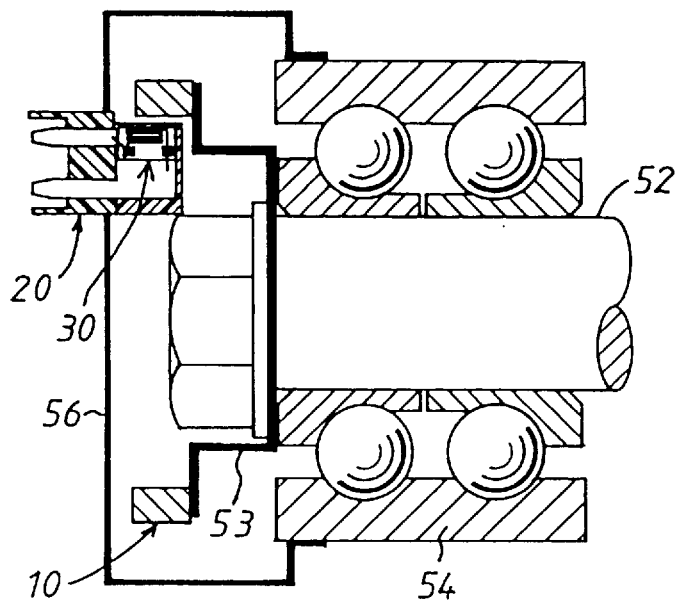
FIG. 13 is a sectional view illustrating a second modification of the mounting construction of the magnetic rotation detector.

In FIG. 12 there is illustrated a modification of the mounting construction of the magnetic rotation detector, wherein the rotation sensor 20 is mounted on a peripheral wall of the cover 56, and the annular magnetic rotary element 10 is fixedly coupled with the outer end of the cylindrical rotor 53 and opposed to the distal end of the rotation sensor 20. The magnetic rotary element 10 is alternately magnetized at its outer periphery with north and south magnetic poles in a circumferential direction. In this modification, the rotation sensor shown in FIG. 7 or 10 is used as the rotation sensor 20. In another modification of the mounting construction of the magnetic rotation detector shown in FIG. 13, the rotation sensor 20 is mounted on the bottom of cover 56, and the annular magnetic rotary element 10 is fixed to an annular flange of the cylindrical rotor 53 and opposed to an external side portion of the rotation sensor 20 at its inner periphery. The magnetic rotary element 10 is alternately magnetized at its inner periphery with north and south magnetic poles in a circumferential direction. In this modification, the rotation sensor shown in FIG. 8 is used as the rotation sensor 20.

Figure 14:
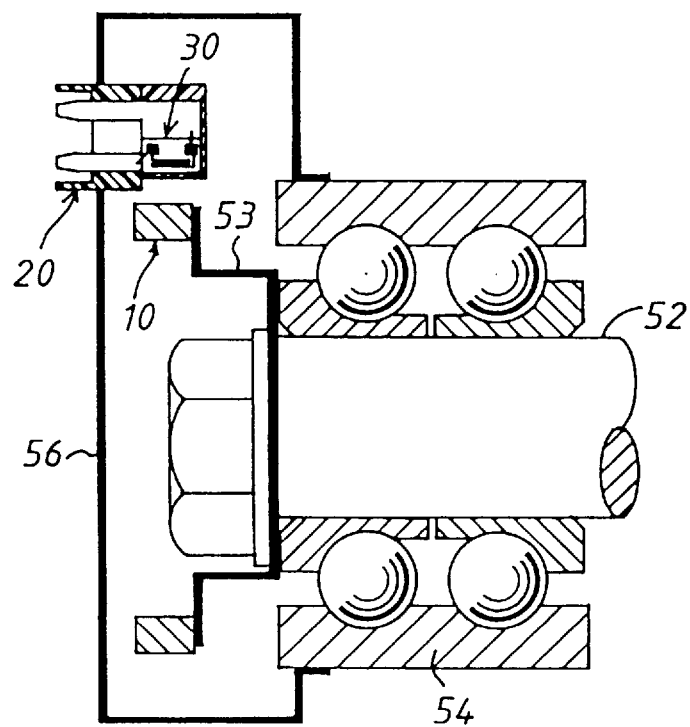
FIG. 14 is a sectional view illustrating a third modification of the mounting construction of the magnetic rotation detector.

In FIG. 14 there is illustrated a modification of the mounting construction of the magnetic rotation detector, wherein the rotation sensor 20 is mounted on the bottom of cover 56, and the annular magnetic rotary element 10 is fixed to an annular flange of the cylindrical rotor 53 and opposed to an internal side portion of the rotation sensor 20 at its outer periphery. The magnetic rotary element 10 is alternately magnetized at its outer periphery with north and south magnetic poles in a circumferential direction. In this modification, the rotation sensor shown in FIG. 8 is used as the rotation sensor 20.

As shown in FIG. 15, the signal processing circuit 40 in the electric control apparatus 40A includes a constant voltage source 41 which is connected to one of the electrodes 37 of the magnetoresistance element 30 through the connecting cable 23 and connector 24. The other electrode 37 of the magnetoresistance element 30 is connected to a resistor RI for current detection in the signal processing circuit 40 through the connecting cable 23 and connector 24. The resistor R1 is grounded at its one end and connected at its other end to a buffer amplifier OP1 of a waveform shaping circuit 42. The waveform shaping circuit 42 includes the buffer amplifier OP1, a reference voltage generator composed of resistors R2, R3 connected in series, a buffer amplifier OP2 arranged to be applied a reference voltage from the reference voltage generator, an alternate current coupling circuit composed of a condenser C1 and a resistor R4 for eliminating an offset direct current voltage from a voltage signal applied from the buffer amplifier OP1 and a comparator OP3 for comparing output voltages of the buffer amplifiers OP1 and OP2.

In operation of the signal processing circuit 40, the resistance of superlattice 34 in the magnetoresistance element 30 is varied by rotation of the magnetic rotary disk 10 while the superlattice 34 is being applied with a constant voltage from the constant voltage source 41. Thus, there will occur flow of a current reversely in proportion to a sum of the resistance values of the superlattice 34 and resistor R1. In this instance, the resistor R1 detects the current and applies a voltage signal in proportion to the current to the buffer amplifier OP1. In turn, the waveform shaping circuit 42 compares the voltage signal with the reference voltage signal applied from the reference voltage generator to produce a series of rectangular waveform pulse signals as shown in FIGS. 16(A) and 16(B). The pulse signals are applied to a computer (not shown) in connection to the signal processing circuit 40 so that a duration of the pulse signals or a number of the pulse signals in a unit time is calculated to detect a rotation speed of the road wheel. For instance, a number of rises and/or falls of the pulse signals in a predetermined time (6 ms) are counted, and the counted value is substituted in a calculation formula or referred to a predetermined map to detect a rotation speed of the road wheel.

Since in the magnetic rotation detector, the resistance value of the superlattice in the magnetoresistance element greatly changes in accordance with intensity of the magnetic field, the current flowing through the superlattices 34 and resistor R1 is greatly varied by rotation of the magnetic rotary element 10. Thus, the buffer amplifier OP1 of the signal processing circuit 40 is applied with the voltage signal at a great S/N ratio. This is effective to obtain a series of pulse signals accurately indicative of rotation of the road wheel from the signal processing circuit 40 in a simple construction at a low cost.

Figure 17:
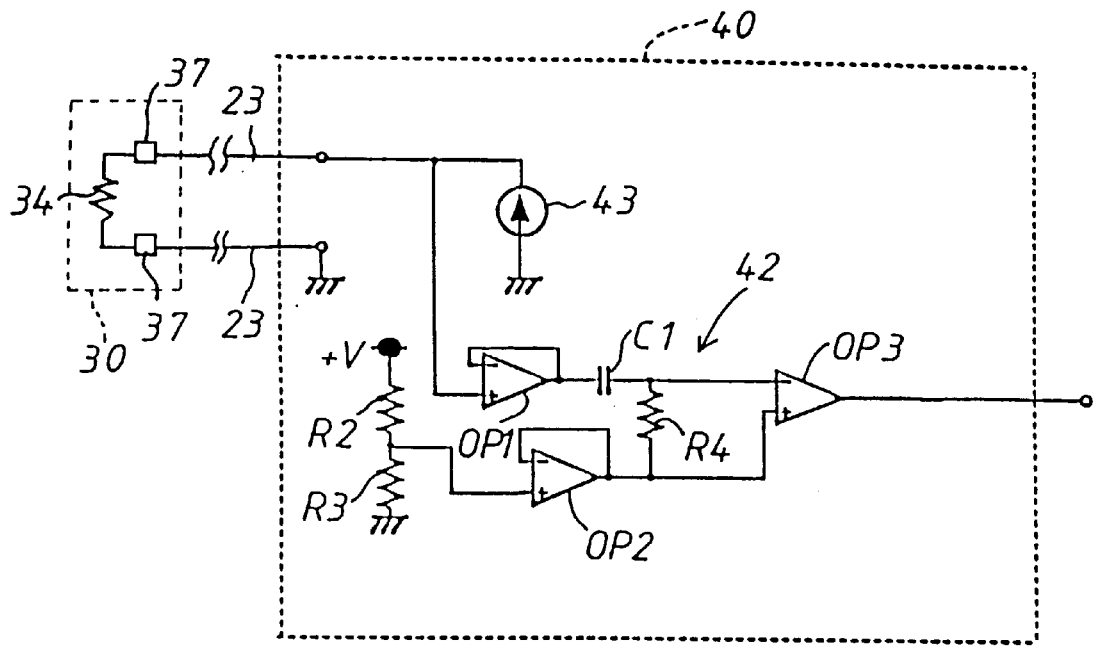
FIG. 17 is a diagram of a first modification of the signal processing circuit shown in FIG. 15.
Figure 18:
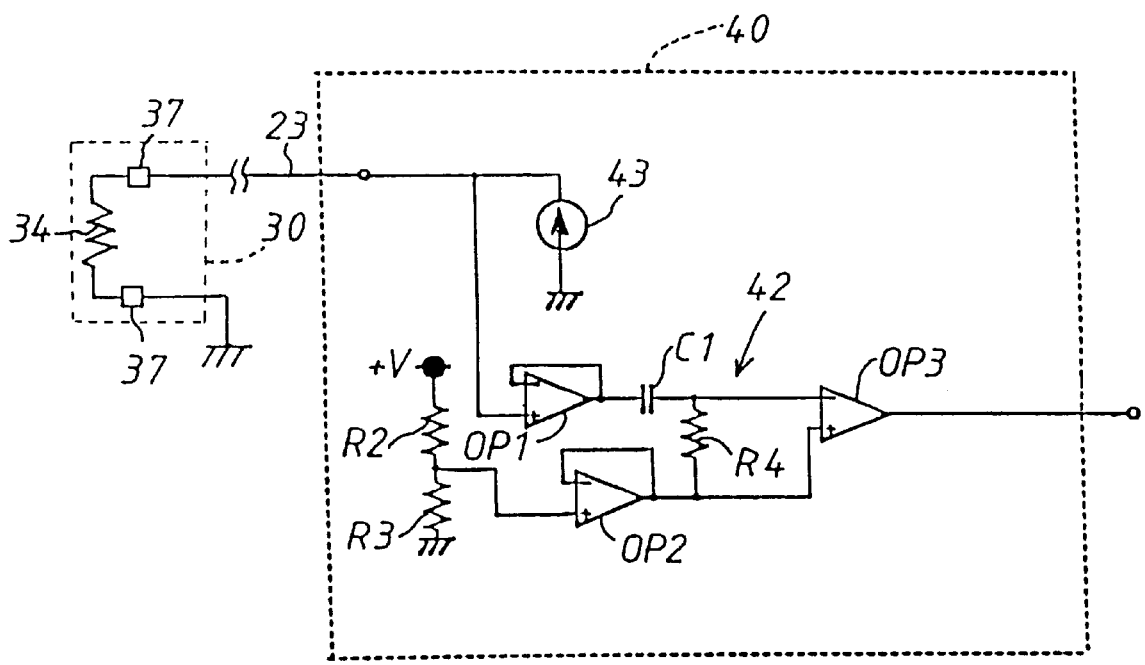
FIG. 18 is a diagram of a second modification of the signal processing circuit.

In FIG. 17 there is illustrated a modification of the signal processing circuit 40 wherein the other electrode 37 of the magnetoresistance element 30 is directly connected to an earth terminal in the signal processing circuit 40 so that the buffer amplifier OP1 is applied with voltag between the electrodes 37 of the magnetoresistance element 30. In this modification, the superlattice 34 is applied with a constant voltage from a constant voltage circuit 43 when the resistance value of superlattice 34 is varied in accordance with rotation of the magnetic rotary disk 10. Thus, the buffer amplifier OP1 is applied with a voltage signal the value of which changes in accordance with variation of the resistance value of superlattice 34 as in the signal processing circuit 40 shown in FIG. 15. In a modification of the signal processing circuit 40 shown in FIG. 18, the other electrode 37 of the magnetoresistance element 30 is directly connected to the vehicle body. With this modification, the magnetoresistance element 30 can be connected to the signal processing circuit 40 by means of a single wire passing through the connecting cable 23.

Figure 19:
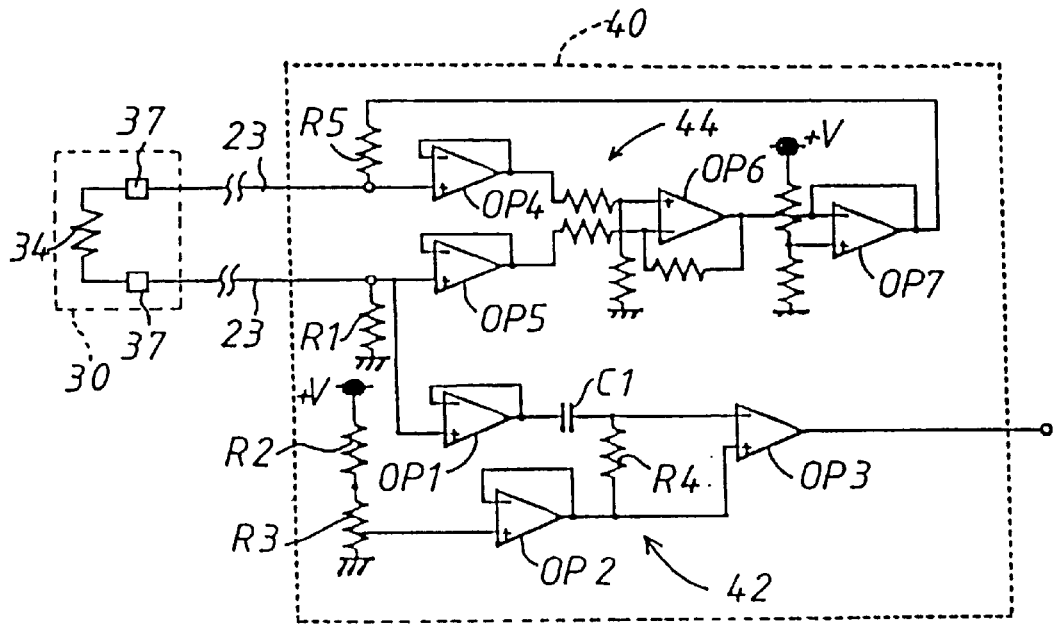
FIG. 19 is a diagram of a third modification of the signal processing circuit.

In FIG. 19 there is illustrated another modification of the signal processing circuit 40 wherein a constant voltage source circuit 44 is provided to apply a constant voltage to the superlattice 34 of the magnetoresistance element 30. The constant voltage source circuit 44 includes buffer amplifiers OP4, OP5 arranged to be applied with each voltage of the electrodes 37 of the magnetoresistance element 30, a differential amplifier OP6 for detecting a difference in voltage between the electrodes 37 and an output amplifier OP7 for amplifying an output voltage of the differential amplifier OP6. The output voltage of the amplifier OP7 is applied as a variable voltage to one of the electrodes 37 through a protection resistor R5. The other electrode 37 of the magnetoresistance element 30 is grounded through the resistor R1 for current detection as in the signal processing circuit 40 shown in FIG. 15.

Figure 20:
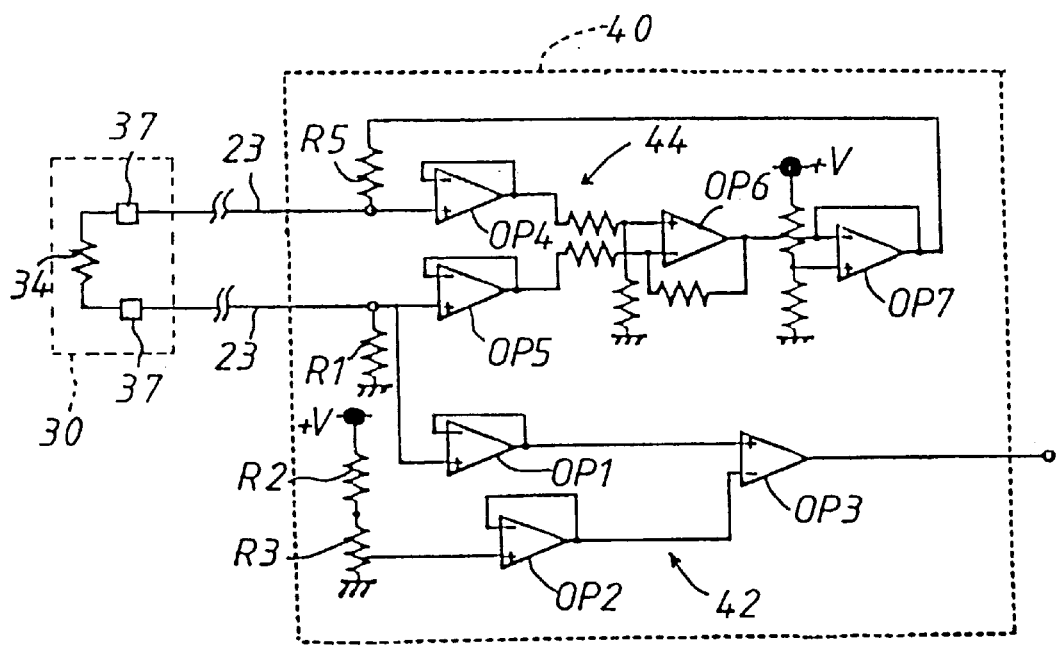
FIG. 20 is a diagram of a fourth modification of the signal processing circuit.

In the modification shown in FIG. 19, the superlattice 34 is applied with a constant voltage from the constant voltage source circuit 44 when the resistance of superlattices 34 in the magnetoresistance element 30 is varied in accordance with rotation of the magnetic rotary element 10. Thus, a current reversely in proportion to the resistance value of the superlattice 34 will flow- through the protection resistor R5, superlattices 34 and resistor Rl. In turn, the waveform shaping circuit 42 is applied with a voltage signal inversely proportional to the resistance value of the superlattices 34 to produce a series of pulse signals indicative of rotation of the magnetic rotary element 10. The signal processing circuit 40 may be also modified as shown in FIG. 20, wherein the alternate current coupling circuit composed of the condenser Cl and resistor R4 in FIG. 19 is removed. In this modification, the waveform shaping circuit 42 is applied with a voltage signal inversely proportional to the resistance value of the superlattice 34 as in the signal processing circuit 40 in FIG. 19 to produce a series of pulse signals indicative of rotation of the magnetic rotary disk 10.

Figure 21A:
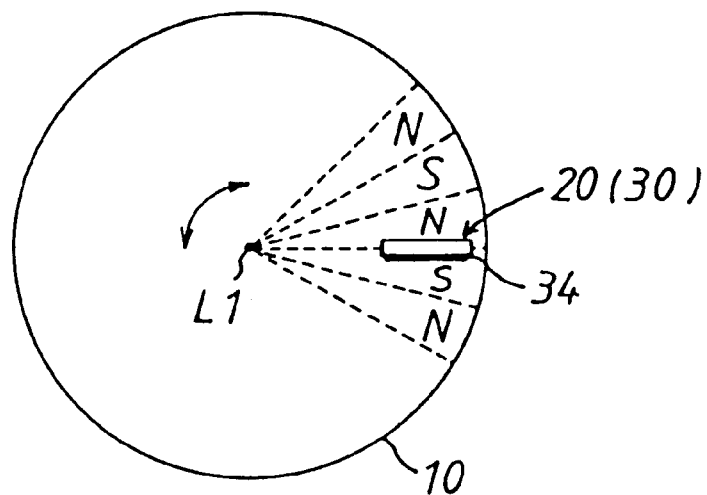
FIG. 21(A) is a plan view illustrating a first basic arrangement of a magnetoresistance element the superlattice of which is placed perpendicularly to the magnetized surface of a magnetic rotary element.
Figure 21B:
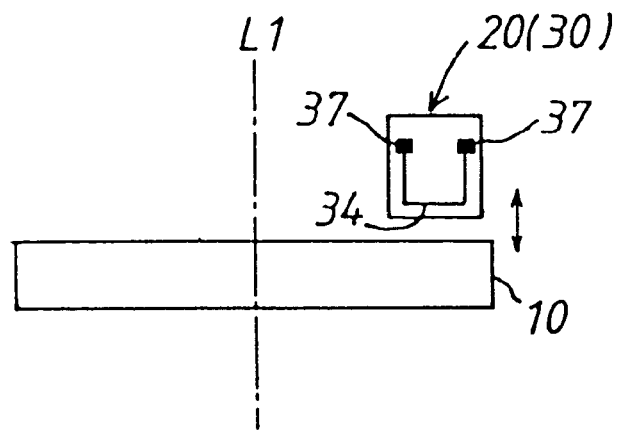
FIG. 21(B) is a front view of the first basic arrangement of the magnetoresistance element.
Figure 22A:
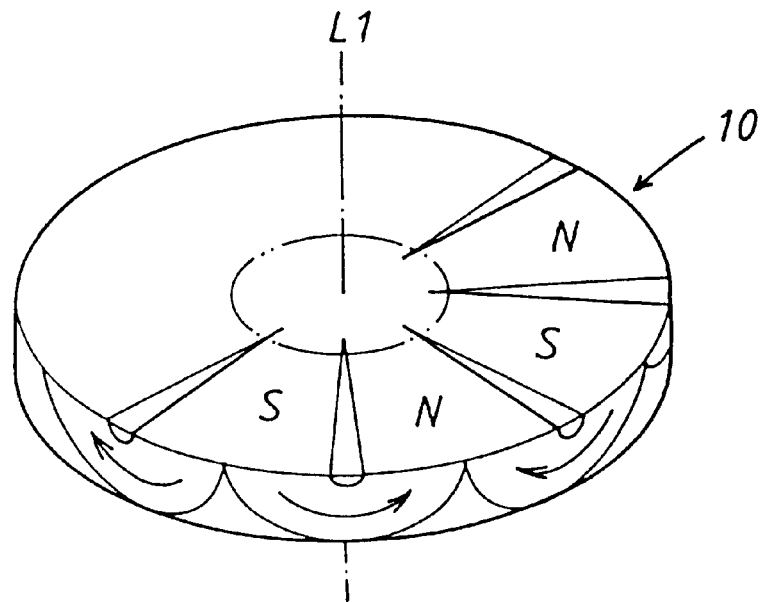
FIG. 22(A) is a perspective view showing a magnetized condition of the magnetic rotary element in the basic arrangement.
Figure 22B:
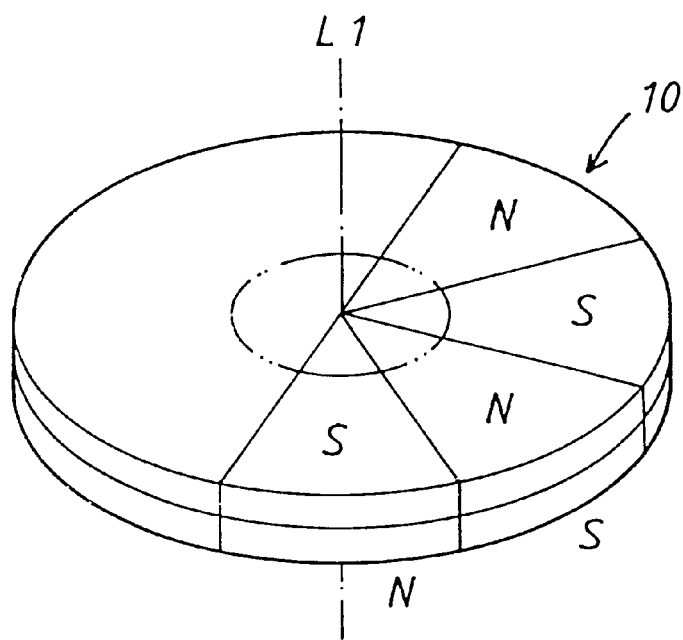
FIG. 22(B) is a perspective view showing another magnetized condition of the magnetic rotary element.

Hereinafter, a first basic arrangement of the magnetoresistance element 30 relative to the magnetic rotary disk 10 will be described with reference to FIGS. 21(A) and 21(B). In this first basic arrangement, the magnetoresistance element 30 is placed perpendicularly to the magnetized surface of rotary disk 10. The magnetic rotary disk 10 is magnetized at its upper surface and opposed to the rotation sensor 20. As shown in FIG. 21(A), the magnetic rotary disk 10 is alternately magnetized with north and south magnetic poles N and S in a circumferential direction about a rotation axis L1. In this arrangement, as shown in FIG. 22(A), the magnetic rotary disk 10 may be alternately magnetized only at its upper surface with north and south magnetic poles N and S. Alternatively, as shown in FIG. 22(B), the magnetic rotary disk 10 may be alternately magnetized at its upper and bottom surfaces with north and south magnetic poles N and S. As shown by imaginary lines in FIGS. 22(A) and 22(B), the magnetic rotary disk 10 may be also formed in the form of an annular member taking into account a mounting structure thereof.

The magnetoresistance element 30 in the rotation sensor 20 is arranged in such a manner that the surface of superlattice 34 is located perpendicular to the magnetized surface of magnetic rotary disk 10 in a radial direction and that the superlattice 34 is located adjacent to the magnetized surface of magnetic rotary disk 10 in parallel therewith. Each width of the north and south magnetic poles N and S in the circumferential direction is determined to be larger than the thickness of magnetoresistance element 20. In addition, the rotational direction of magnetic rotary disk 10 is shown by an arrow in FIG. 21(A), and the direction of the magnetic field is shown by an arrow in FIG. 21(B).

When the magnetic rotary disk 10 is rotated about the rotation axis L1, the resistance value of superlattice 34 changes in accordance with rotation of magnetic rotary disk 10. In this instance, the magnetic field on the north and south magnetic poles N and S in a direction perpendicular to the surface of magnetic rotary disk 10 becomes strong, while the magnetic field between the north and south magnetic poles N and S is approximately zero. The magnetic field in parallel with the surface of magnetic rotary disk 10 becomes weak on the north and south magnetic poles N and S and becomes strong at a position between the magnetic poles N and S. On the other hand, the resistance value of the magnetoresistance element 30 greatly changes in accordance with variation of the magnetic field in parallel with the superlattice 34 and changes in a small value in accordance with variation of the magnetic field in a direction perpendicular to the superlattice 34. Thus, during rotation of the magnetic rotary disk 10, the resistance value of superlattice 34 is noticeably decreased when the magnetoresistance element 30 is faced to the north and south magnetic poles N and S and is noticeably increased when the magnetoresistance element 30 is faced to a position between the north and south magnetic poles N and S. For this reason, the resistance value of the superlattice 34 greatly changes in accordance with rotation of the magnetic rotary disk 10. This is useful to accurately detect rotation of the magnetic rotary disk 10.

Figure 23A:
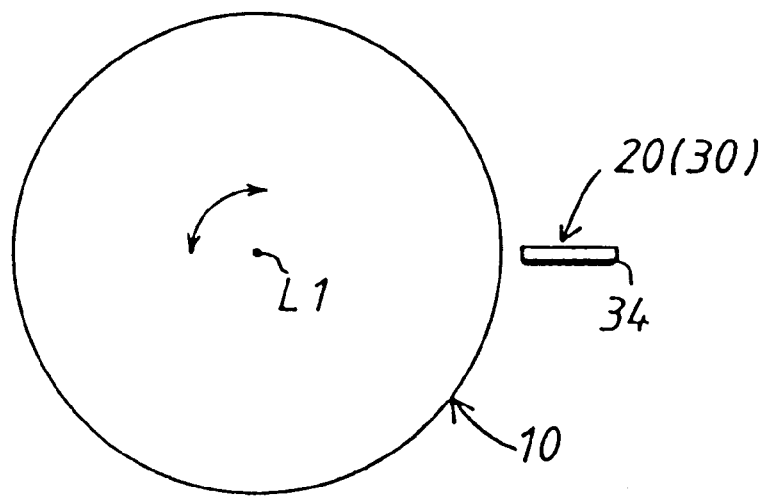
FIG. 23(A) is a plan view showing a second basic arrangement of the magnetoresistance element the superlattice of which is placed perpendicularly to the magnetized surface of the magnetic rotary element.
Figure 23B:
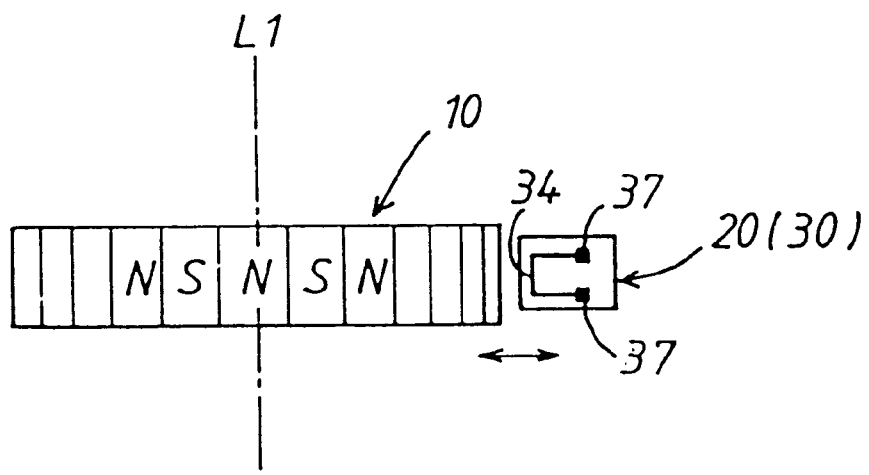
FIG. 23(B) is a front view of the second basic arrangement of the magnetoresistance element.
Figure 24A:
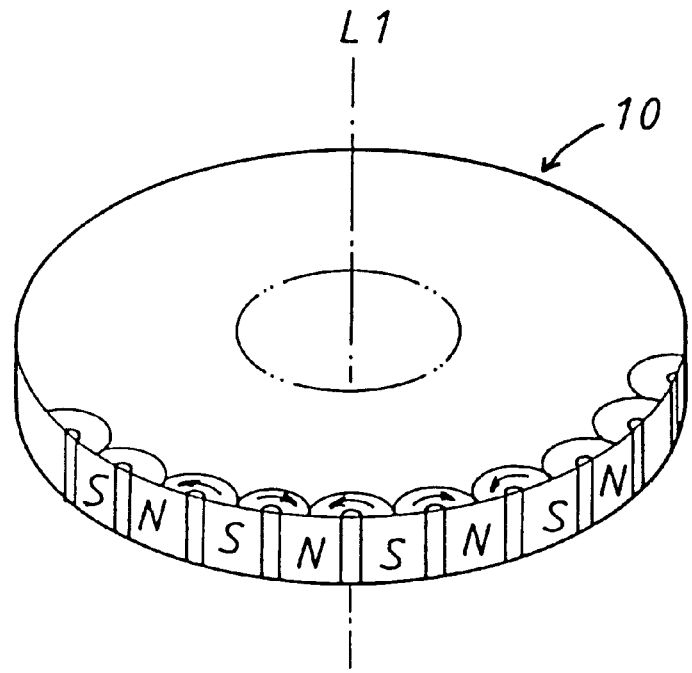
FIG. 24(A) is a perspective view showing a magnetized condition of the magnetic rotary element in the second basic arrangement.
Figure 24B:
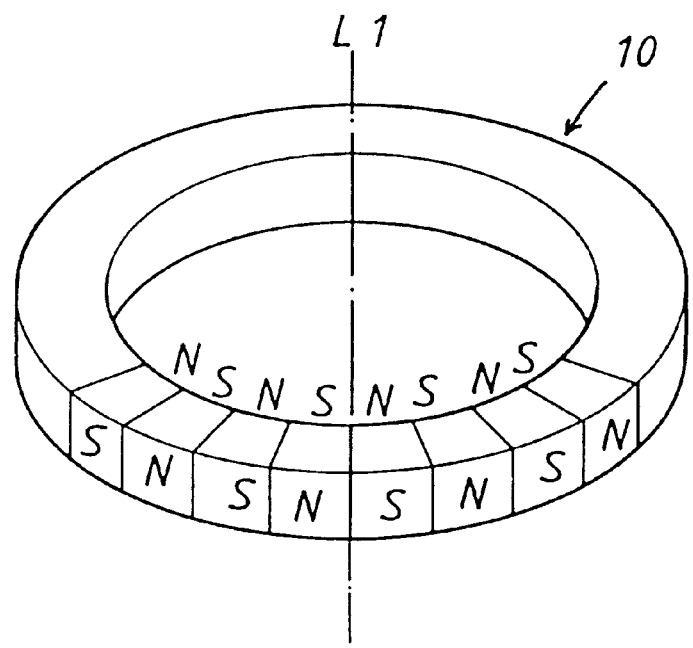
FIG. 24(B) is a perspective view showing another magnetized condition of the magnetic rotary element.

Illustrated in FIGS. 23(A) and 23(B) is a second basic arrangement of the magnetoresistance element 30 relative to the magnetic rotary element 10, wherein the magnetic rotary element 10 is in the form of a rotary disk which is alternately magnetized at its outer periphery with north and south magnetic poles N and S in a circumferential direction about a rotation axis L1 as shown in FIG. 24(A), and wherein the rotation sensor 20 is opposed to the magnetized outer periphery of the magnetic rotary disk 10. In this arrangement, the magnetic rotary element 10 may be in the form of an annular member which is alternately magnetized at its inner and outer peripheries with north and south magnetic poles N and S as shown in FIG. 24(B).

The magnetoresistance element 30 in the rotation sensor 20 is arranged in such a manner that the surface of supperlattice 34 is located perpendicularly to the upper and bottom surfaces of magnetic rotary disk 10 in a radial direction and that the superlattice 34 is located adjacent to the magnetized outer periphery of the magnetic rotary disk 10 in parallel therewith. Each circumferential width of the north and south magnetic poles N and S is determined to be larger than the width of the magnetoresistance element 30.

When the magnetic rotary disk 10 is rotated about the rotation axis L1, the resistance value of superlattice 34 changes in accordance with rotation of the magnetic rotary disk 10. In this instance, the magnetic field on the north and south magnetic poles N and S in the radial direction of the magnetic rotary disk 10 is increased, while the magnetic field between the north and south magnetic poles N and S becomes approximately zero. The magnetic field in parallel with the outer periphery of the magnetic rotary disk 10 is decreased when faced to the north and south magnetic poles N and S and is increased when faced to each position between the north and south magnetic poles N and S. Thus, during rotation of the magnetic rotary disk 10, the resistance value of superlattice 34 is noticeably decreased when the magnetoresistance element 30 is faced to the north and south magnetic poles N and S of the magnetic rotary disk 10 and is noticeably increased when the magnetoresistance element 30 is faced to each position between the north and south magnetic poles N and S. As a result, the resistance value of superlattices 34 greatly changes in accordance with rotation of the magnetic rotary disk 10. This is useful to accurately detect rotation of the magnetic rotary disk 10.

Figure 25A:
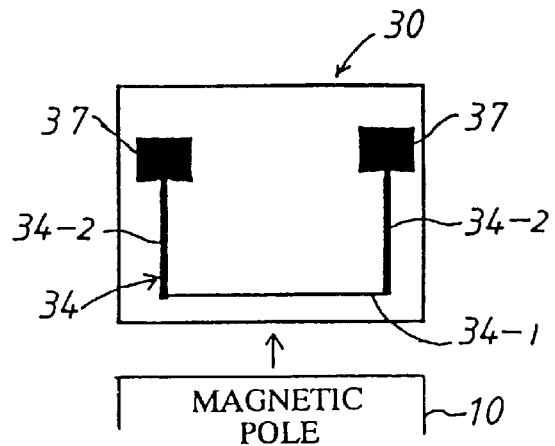
FIGS. 25(A)–25(C) illustrate different patterns of the superlattice in the magnetoresistance element, respectively.
Figure 25B:
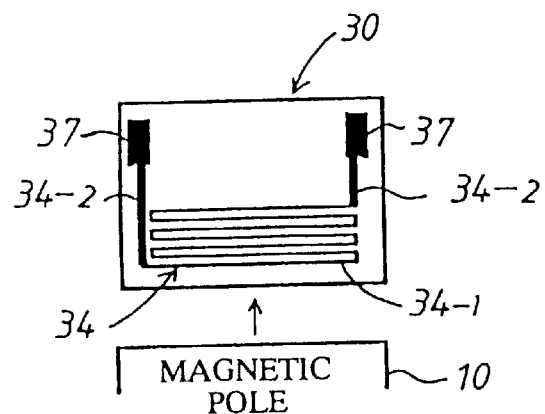

Hereinafter, preferred embodiments of the superlattice 34 will be described with reference to FIGS. 25(A)–25(C); 26(A), 26(B); and 27(A)–27(C). In the case that the magnetoresistance element 30 is located perpendicularly to the magnetized surface of the magnetic rotary disk 10, as shown in FIGS. 25(A) and 25(B), the magnetoresistance element 30 is formed in a rectangular shape each side of which is approximately 1–5 mm in size. In the magnetoresistance element shown in FIG. 25(A), a magnetic sensitive portion 34-1 of the superlattice 34 is in the form of a single linear pattern located adjacent to the magnetized surface of magnetic rotary disk 10 in parallel therewith. The sensitive portion 34-1 is formed to be 1–4 mm in length and 0.03–0.05 mm in width. The opposite ends of sensitive portion 34-1 are connected to the electrodes 37 respectively by means of a connecting portion 34-2 the length of which is determined to be approximately 0.2–1.0 mm and the width of which is determined to be several times the width of sensitive portion 34-1. Since the width of sensitive portion 341 is determined smaller than that of the connecting portions 34-2 to reduce the cross-sectional area of sensitive portion 34-1, the variation rate of the resistance value of superlattice 34 is increased to enhance the sensitivity of the magnetoresistance element 30.

Figure 25C:
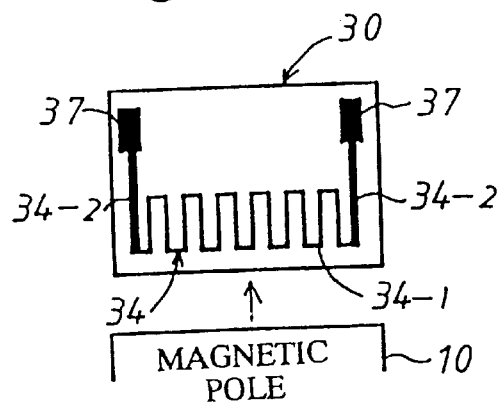

In an embodiment of the superlattice 34 shown in FIG. 25(B) or 25(C), a magnetic sensitive portion 34-1 of the superlattice 34 is in the form of a plurality of parallel linear patterns which are arranged in parallel with or perpendicularly to the magnetized surface of the magnetic rotary disk 10 to prolong an effective length of the sensitive portion 34-1. With this arrangement, the variation rate of the resistance value of superlattices 34 can be further increased.

Figure 26A:
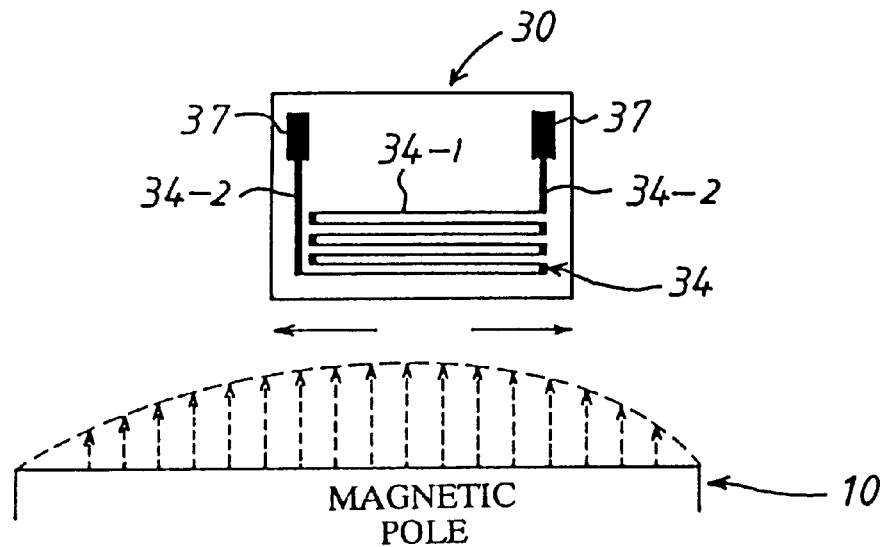
FIGS. 26(A) and 26(B) illustrate modifications of the superlattices in the magnetoresistance element, respectively.
Figure 26B:
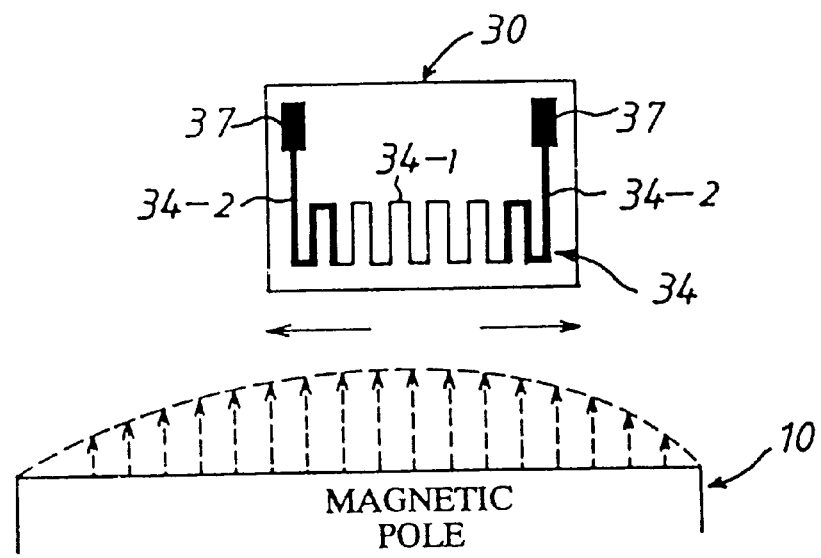

Illustrated in FIGS. 26(A) and 26(B) are modifications of the superlattice 34 shown in FIGS. 25(B) and 25(C), wherein the sensitive portion 34-1 is enlarged in width at its opposite ends and reduced in width at its central portion. In the case that the length of the magnetized surface along the superlattice 34 is larger than the width of the magnetoresistance element 30 as shown in FIGS. 21(A) and 21(B), the intensity of the magnetic field of the rotary disk 10 decreases at the opposite ends of the sensitive portion 34-1 and increases at the central portion of the sensitive portion 34-1 as shown by broken lines in FIGS. 26(A) and 26(B). This is effective to increase the variation rate of the resistance value of superlattices 34.

Figure 27A:
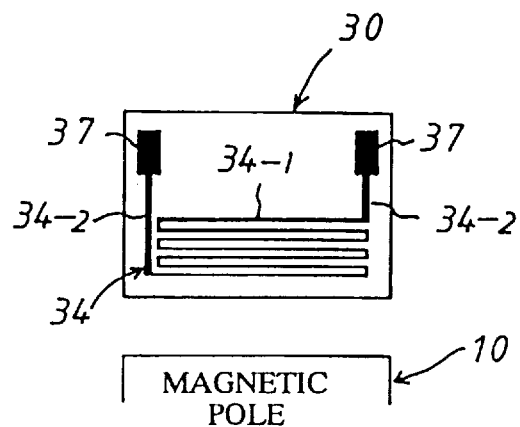
FIGS. 27(A)–27(C) illustrate other modifications of the supperlattices in the magnetoresistance element.
Figure 27B:
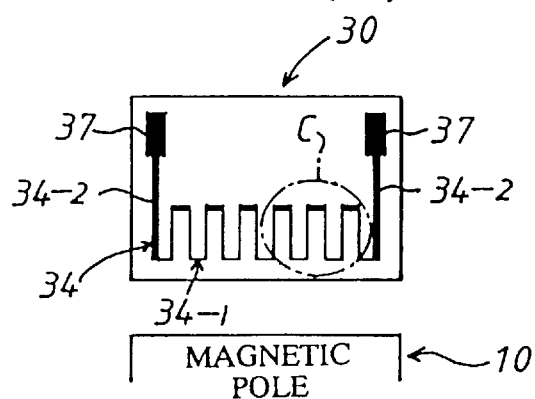
Figure 27C:

The superlattice 34 shown in FIG. 25(B) or 25(C) may be modified as Illustrated in FIG. 27(A) or 27(B), wherein the linear patterns of the sensitive portion 34-1 are reduced in width at their central portions and enlarged in width at their opposite side portions. Thus, the intensity of the magnetic field of the rotary disk 10 increases at the linear patterns reduced in width and decreases at the linear patterns enlarged in width. This is also effective to increase the variation rate of the resistance value of superlattices 34. The superlattice 34 shown in FIG. 25(C) may be also modified as shown in FIG. 27(C), wherein the linear patterns of the sensitive portion 34-1 are enlarged in width at the opposite ends thereof and reduced in width at their central portions. In this modification, the linear patterns of the sensitive portion 34-1 are enlarged in width at a portion apart from the magnetized surface of the rotary disk 10. This is effective to further increase the variation rate of the resistance value of superlattice 34.

Figure 28:
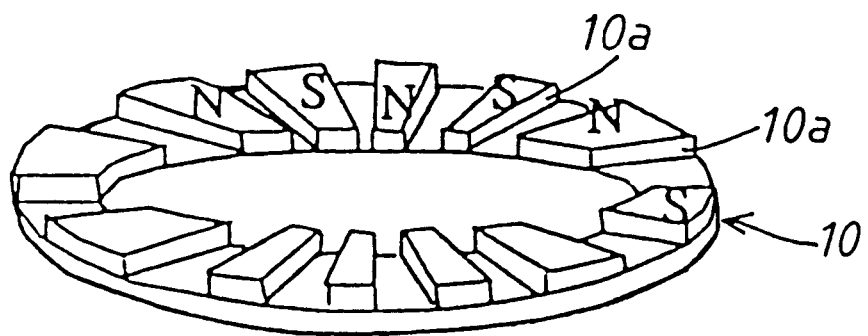
FIG. 28 is a perspective view of a magnetic rotary element formed with a plurality of circumferentially equally spaced radial grooves and magnetized at its upper surface.
Figure 29:
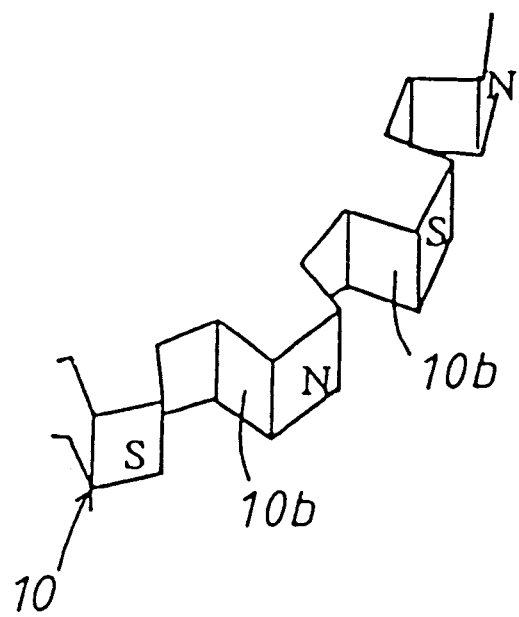
FIG. 29 is a perspective view of a magnetic rotary element formed with a plurality of circumferentially equally spaced vertical grooves and magnetized at its outer periphery.
Figure 30A:
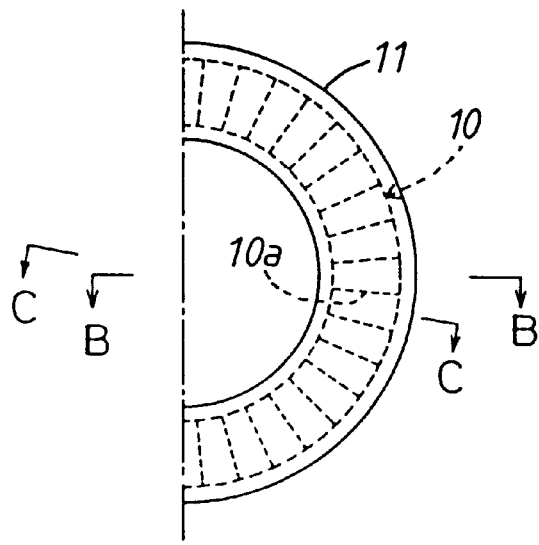
FIG. 30(A) is a plan view of a magnetic rotary element molded with synthetic resin.
Figure 30B:
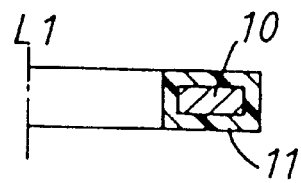
FIG. 30(B) is a cross-sectional view taken along line B—B in FIG. 30(A)
Figure 30C:
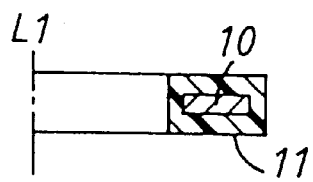
FIG. 30(C) is a cross-sectional view taken along line C—C in FIG. 30(A)
Figure 31A:
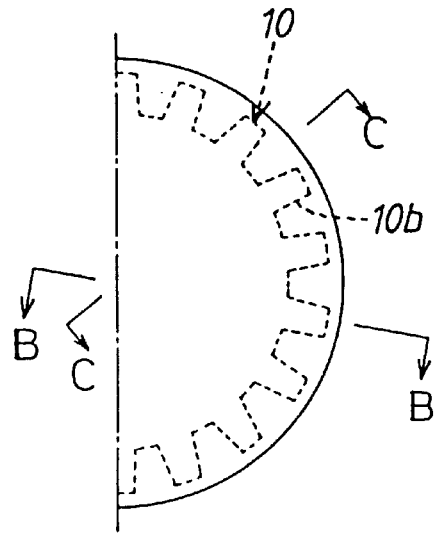
FIG. 31(A) is a plan view of a modification of the magnetic rotary element shown in FIG. 30(A)
Figure 31B:
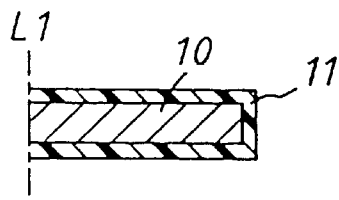
FIG. 31(B) is a cross-sectional view taken along line B—B In FIG. 31(A)
Figure 31C:
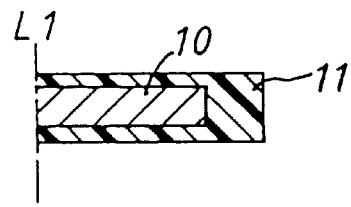
FIG. 31(C) is a cross-sectional view taken along line C—C in FIG. 31(A)

Hereinafter, preferred embodiments of the magnetic rotary element 10 will be described with reference to FIGS. 28 and 29. In the case that the magnetic rotary element 10 is magnetized as shown in FIGS. 22(A), 22(B) or 24(A), 24(B), the space between the north and south magnetic poles N and S becomes narrow in width. As a result, a time during which the magnetoresistance element 30 is faced to the north and south magnetic poles N and S becomes long, while a time during which the magnetoresistance element 30 is faced to each space between the north and south poles N and S becomes short. This means that a duty factor of the pulse signals produced by the signal processing circuit 40 is deviated from 50%, resulting deterioration of the sensitivity of the magnetoresistance element 30 during high speed rotation of the magnetic rotary disk 10. To solve such a problem, it is preferable that the magnetic rotary element 10 is formed with a non-magnetized radial groove 10a at each space between the north and south magnetic poles N and S as shown in FIG. 28. With the magnetic rotary element 10, it is able to prolong a time during which the magnetoresistance element 30 is faced to each space between the north and south magnetic poles N and S. Thus, the duty factor of the pulse signals can be adjusted to 50% to enhance the sensitivity of the magnetoresistance element 30 during high speed rotation of the magnetic rotary element 10. In addition, the intensity of the magnetic field in parallel with the magnetic rotary element 10 becomes weak when faced to each space between the north and south magnetic poles N and S. This causes the resistance value of the magnetoresistance element 30 to greatly change in accordance with rotation of the magnetic rotary disk 10. In the case that the magnetic rotary element 10 is magnetized at its outer periphery as shown in FIG. 24(A), it is preferable that the magnetic rotary disk 10 is formed with a non-magnetized vertical groove 10b at each space between the north and south magnetic poles N and S as shown in FIG. 29. With this arrangement, the duty factor of the pulse signals can be adjusted to 50% to enhance the sensitivity of the magnetoresistance element 10. To enhance the mechanical strength of the magnetic rotary disk 10, it is desirable that the magnetic rotary disk 10 shown in FIG. 28 or 29 is molded with synthetic resin to cover the radial grooves 10a or vertical grooves lob with a mold layer 11 as shown in FIGS. 30(A)–30(C) or FIGS. 31(A)–31(C). In a manufacturing process of the magnetic rotary disk 10, a rotary disk is formed by a mixture of magnetic powders and synthetic resin and molded with the same synthetic resin as that of the mixture to form the mold layer 11 after magnetized.

Figure 32:
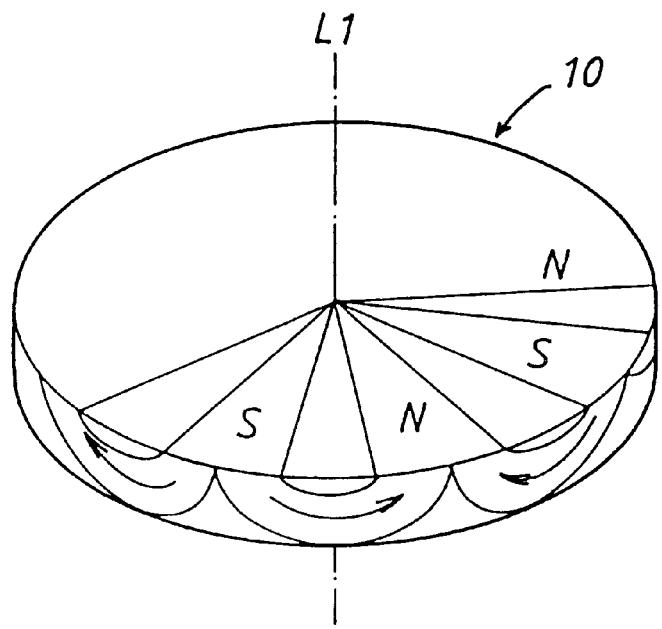
FIG. 32 is a perspective view of a magnetic rotary disk formed with nonmagnetic portions between respective magnetic poles and magnetized at its upper surface.
Figure 33:
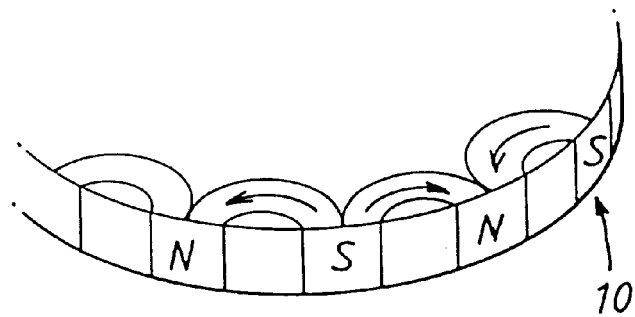
FIG. 33 is a perspective view of a magnetic rotary disk formed with nonmagnetic portions between respective magnetic poles and magnetized at its outer periphery.
Figure 34A:
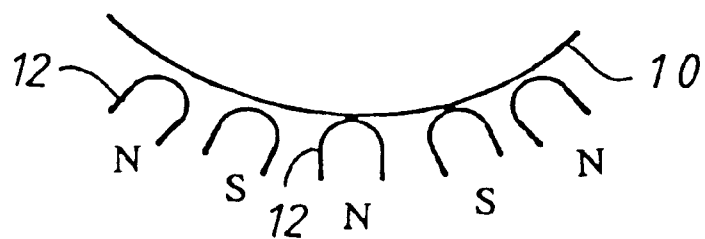
FIG. 34(A) illustrates a plurality of yokes for magnetizing a magnetic rotary disk.
Figure 34B:
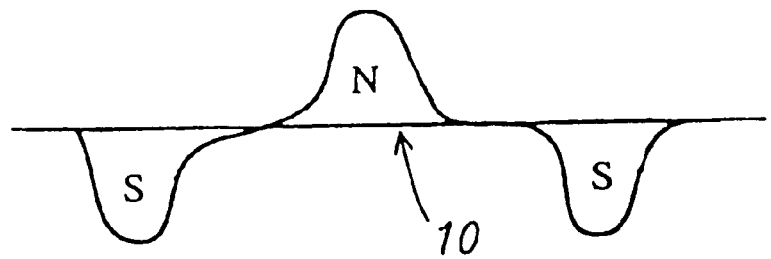
FIG. 34(B) is a development view illustrating a magnetized condition of the magnetic rotary disk shown in FIG. 34(A)
Figure 34C:
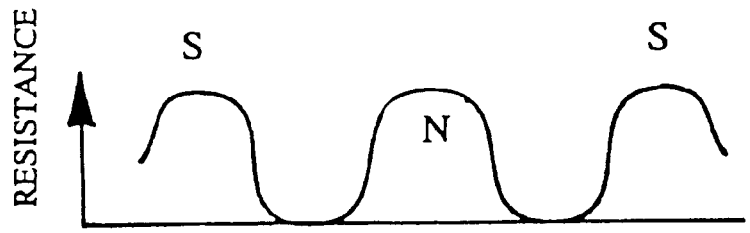
FIG. 34(C) is a time chart illustrating variation of the resistance value of the magnetoresistance element associated with the magnetic rotary disk shown in FIG. 34(A)

To enhance the sensitivity of the magnetoresistance element 30, it is also desirable that the magnetic rotary disk 10 is magnetized in such a manner as shown in FIGS. 32 and 33. In the case that the magnetic rotary disk 10 is magnetized as shown in FIGS. 22(A) and 22(B), the rotary disk 10 is formed with a plurality of circumferentially equally spaced non-magnetic portions which are respectively located between the north and south magnetic poles N and S as shown in FIG. 32. In the case that the magnetic rotary disk 10 is magnetized as shown in FIGS. 24(A) and 24(B), the rotary disk 10 is formed with a plurality of circumferentially equally spaced non-magnetic portions which are respectively located between the north and south magnetic poles N and S as shown in FIG. 33. In FIGS. 32 and 33, the line of magnetic force in the magnetic rotary disk 10 is shown by arrows. In the case that the rotary disk 10 is magnetized as shown In FIG. 32 or 33, magnetizing yokes 12 rounded at their distal ends are used as shown in FIG. 34(A) so that the intensity of the magnetic field on the magnetized surface of the rotary disk 10 is adjusted in a sinusoidal condition as shown in FIG. 34 to change the resistance value of the magnetoresistance element 30 in accordance with rotation of the magnetic rotary disk 10 as shown in FIG. 34(C).

Figure 35:
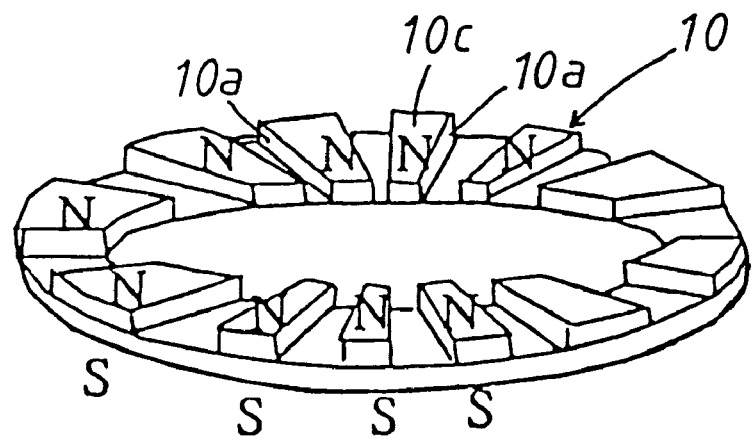
FIG. 35 is a perspective view of a magnetic rotary element magnetized with different magnetic poles at its upper and bottom surfaces.
Figure 36:
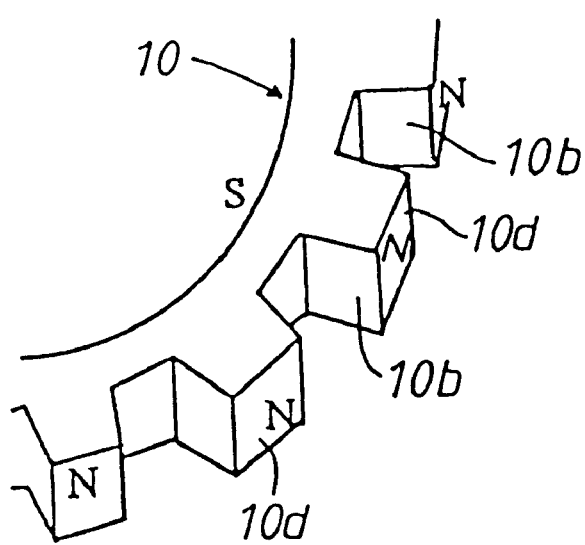
FIG. 36 is a perspective view of a magnetic rotary element magnetized with different magnetic poles at its inner and-outer peripheries.

The magnetic rotary disk 10 may be further modified as shown in FIG. 35, wherein the annular magnetic rotary member 10 is formed thereon with a plurality of circumferentially equally spaced radial grooves 10a and projections 10c in the same width, and wherein the radial projections of the magnetic rotary member 10 are magnetized at their upper surfaces with a north or south magnetic pole N or S and at their bottom surfaces with a south or north magnetic pole S or N. In use of the magnetic rotary member, the magnetoresistance element 30 is arranged perpendicularly to the upper surface of the rotary magnetic member 10 as shown in FIGS. 21(A) and 21(B) so that variation of the resistance value of the magnetoresistance element 30 is detected by a difference in intensity of the magnetic field perpendicular to the radial grooves 10a and projections 10c and 10c. In the case that the annular magnetic rotary member 10 is magnetized at its inner and outer peripheries, the annular rotary member 10 is formed at its outer periphery with a plurality of circumferentially equally spaced vertical grooves 10b and radial projections 10d as shown in FIG. 36. The annular rotary member 10 is magnetized at its radial projections 10d with north or south magnetic poles N or S and at its inner periphery with a south or north magnetic pole S or N. In use of the annular magnetic rotary member 10, the magnetoresistance element 30 is arranged perpendicularly to the outer periphery of the annular rotary member as shown in FIGS. 23(A) and 23(B) so that variation of the resistance value of the magnetoresistance element 30 is detected by a difference in intensity of the magnetic field perpendicular to the vertical grooves 10b and radial projections 10d.

In FIGS. 37(A) and 37(B) there is illustrated a preferred embodiment of the rotation sensor 20 including the magnetic plate 26 associated with the magnetoresistance element 30. The magnetic plate 26 is formed to have the same thickness as that of the magnetoresistance element 30 and placed in the same plane as the superlattice 34. In use of the rotation sensor 20, the lines of magnetic force perpendicular to the magnetized surface of the magnetic rotary member 10 are efficiently converged into the superlattice 34 to enhance the sensitivity of the magnetoresistance element 30.

Illustrated in FIGS. 38(A)–38(D) are modifications of the magnetic plate 26 assembled within the rotation sensor 20. In these modifications, the magnetic plate 26 has a body portion 26a placed in the same vertical plane as the magnetoresistance element 30 and a leg portion 26b formed in parallel with the body portion 26a and placed perpendicularly to the magnetized surface of the magnetic rotary member 10. The space between the body portion 26a and leg portion 26b is determined to have the same width as that of the respective magnetic poles of the magnetic rotary member 10. While the magnetoresistance element 30 is being faced to the magnetic poles of the magnetic rotary member 10, the leg portion 26b is faced to the magnetic poles adjacent to one another. When the magnetoresistance element 30 is faced to a position between the magnetic poles of the magnetic rotary member 10, the leg portion 26b is faced to a position between the magnetic poles adjacent to one another. With these modifications, a magnetic flux perpendicular to the magnetic poles is converged into the magnetoresistance element 30 to increase variation of the resistance value of the superlattice 34 in accordance with rotation of the magnetic rotary member 10.

Figure 39A:
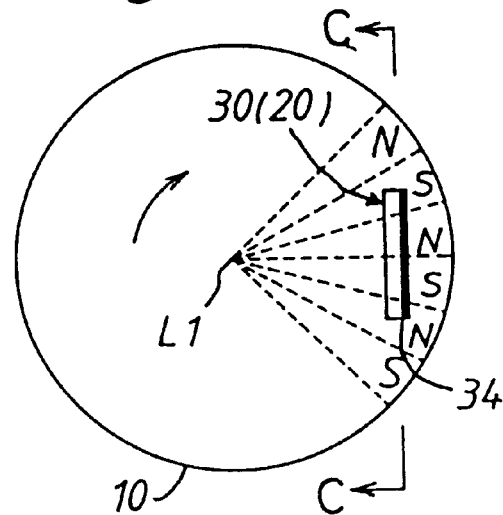
FIG. 39(A) is a plan view of a magnetic rotation detector having a magnetoresistance element opposed to an upper surface of a magnetic rotary disk to produce lines of magnetic force approximately perpendicular to each surface of magnetic poles N and S.
Figure 39B:
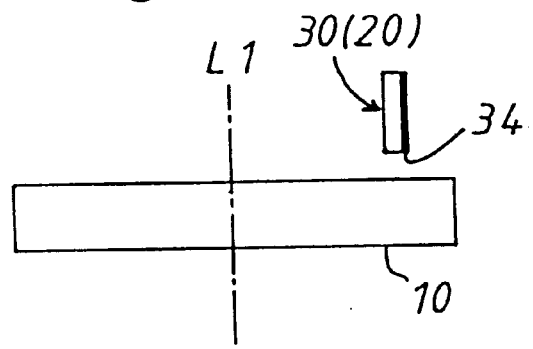
FIG. 39(B) is a front view of the magnetic rotation detector shown in FIG. 39(A)
Figure 39C:
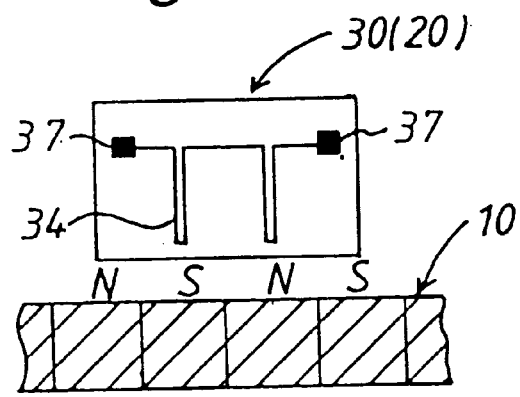
FIG. 39(C) is a cross-sectional view taken along line C–C in FIG. 39(A)

Although in the embodiments described above, the magnetoresistance element 30 is arranged to be responsive to the line of magnetic force perpendicularly applied to and from one of the magnetic poles of the magnetic rotary member 10, the magnetoresistance element 30 may be designed to be responsive to the line of magnetic force applied from the north magnetic pole N of the magnetic rotary member 10 perpendicular thereto and to the line of magnetic force perpendicularly applied to the south magnetic pole S of the magnetic rotary member 10. In the case that the magnetic rotary element 10 is alternately magnetized at its upper surface with north and south magnetic poles N and S in a circumferential direction as shown in FIG. 21, the rotation sensor 20 is opposed to the magnetized upper surface of the magnetic rotary element 10 in such a manner that the superlattice 34 of the magnetoresistance element 30 is opposed perpendicularly to the magnetized upper surface of the magnetic rotary element 10 and located in a direction perpendicular to the radial direction of the magnetic rotary element 10 as shown in FIGS. 39(A) and 39(B). As shown in FIG. 39(C), the superlattices 34 of the magnetoresistance element 30 is located in the circumferential direction of magnetic rotary element 10, and the linear patterns of superlattice 34 are concentrated in the approximately same width as the width between respective centers of the north and south magnetic poles N and S of magnetic rotary element 10. In other words, the resistance value of the superlattice 34 in a unit length in the circumferential direction is determined to be higher than that in the other portion at two positions spaced in the same distance as the space between the north and south magnetic poles N and S of the magnetic rotary element 10 in the circumferential direction.

In such a magnetic rotation detector as described above, when the concentrated portion of the linear patterns of superlattice 34 is faced to the north and south magnetic poles N and S, the resistance value of the concentrated portion is decreased by a magnetic field perpendicularly to the surfaces of the magnetic poles N and S. When the concentrated portion of the linear patterns is faced to a position between the north and south magnetic poles N and S, the resistance value of the concentrated portion is in creased. Thus, rotation of the rotary element 10 is detected by variation of the resistance value of the superlattice 34.

Figure 40A:
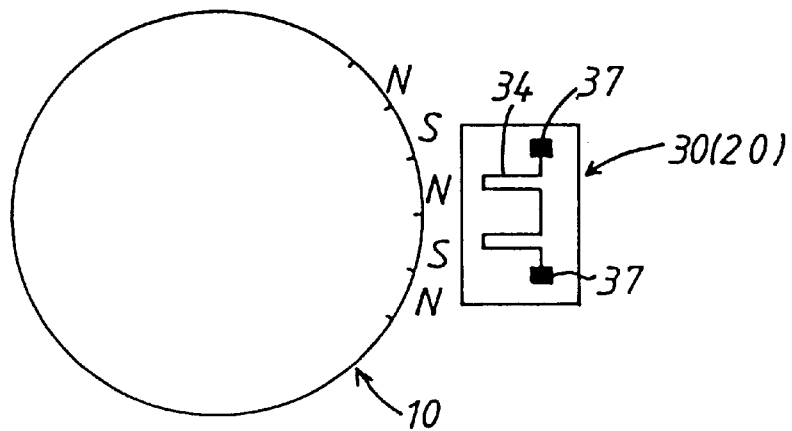
FIG. 40(A) Is a plan view of a magnetic rotation detector having a magnetoresistance element opposed to an outer periphery of a magnetic rotary disk to produce lines of magnetic force approximately perpendicular to each surface of magnetic poles N and S.
Figure 40B:
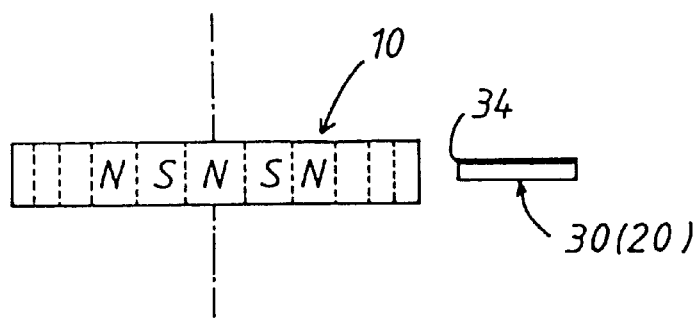
FIG. 40(B) is a front view of the magnetic rotation detector shown in FIG. 40(A)

In the case that the magnetic rotary disk 10 is alternately magnetized at its outer periphery with north and south poles N and S as shown in FIG. 23, the rotation sensor 20 is placed in a position opposed to the outer periphery of magnetic rotary disk 10 so that the superlattice 34 of the magnetoresistance element 30 is located perpendicularly to the outer periphery of magnetic rotary disk 10 as shown in FIGS. 40(A) and 40(B). The magnetoresistance element 30 is provided in the same construction as that shown in FIG. 39(C). In this case, the variation rate of the resistance value of the magnetoresistance element 30 can be increased for the reason described above.

Figure 41:
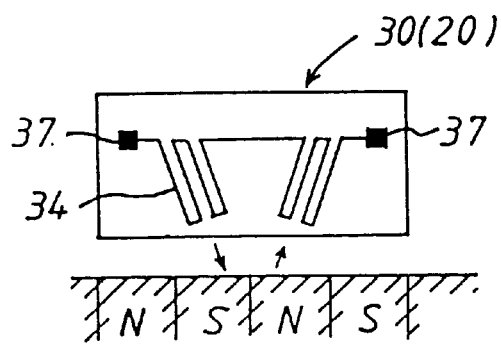
FIG. 41 is a schematic illustration of a modification of the superlattice shown in FIG. 39((C)

In the magnetic rotation detector shown in FIGS. 39(A), 39(B) and 40(A), 40(B), the line of magnetic force applied to and from the north and south magnetic poles N and S of the magnetic rotary disk 10 is slightly inclined with respect to the magnetized surface as shown by arrows in FIG. 41. Accordingly, in the case that the concentrated portions of the linear patterns of superlattice 34 are inclined along the line of magnetic force, the variation rate of the resistance value of the magnetoresistance element 30 is further increased in accordance with rotation of the magnetic rotary disk 10 to more accurately detect rotation of the magnetic rotary disk 10.

Figure 42:
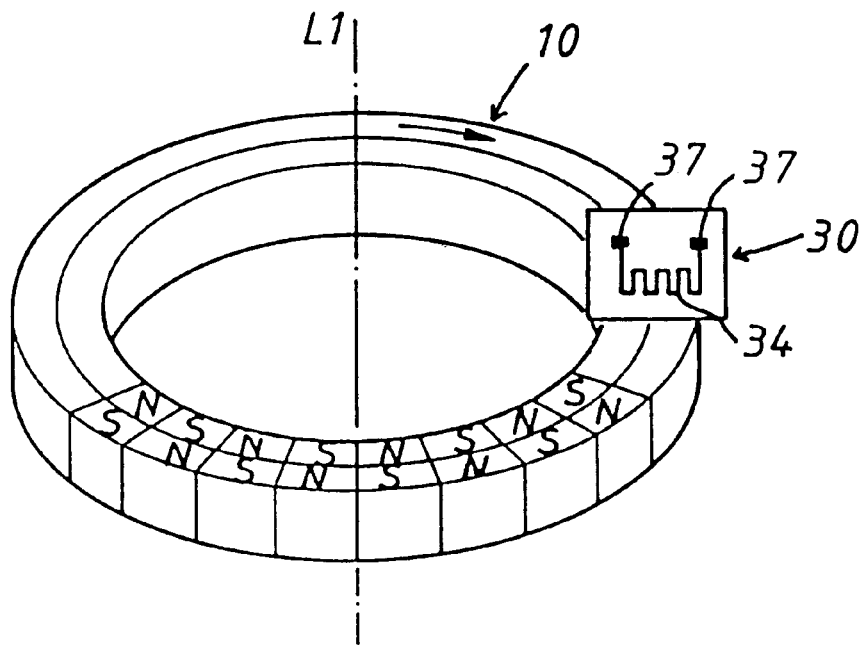
FIG. 42 is a perspective view of a modification of the magnetic rotation detector shown in FIG. 39(A)

Illustrated in FIG. 42 is a modification of the magnetic rotation detector in which the magnetic rotary element 10 is in the form of an annular rotary member having inside and outside annular regions each alternately magnetized in the same width with north and south magnetic poles N and S in the circumferential direction thereof. The magnetic poles N and S of the inside annular region are arranged different in polarity from those of the outside annular region. The surface of the superlattice 34 is arranged perpendicularly to the upper surface of the magnetic rotary element 10 in the radial direction in such a manner that the central portion of the superlattice 34 is opposed to the boundary of the inside and outside annular regions of the magnetic rotary element 10. The thickness of the superlattice 34 is smaller than each width of the magnetic poles, and the length of the superlattice 34 is substantially the same as the width of the annular rotary element 10 in the radial direction thereof.

In the magnetic rotation detector described above, a strong magnetic field applied to and from the magnetic poles passes in parallel with the surface of the superlattice 34 when the magnetoresistance element 30 is faced to the magnetic poles of the inside and outside annular regions. In this instance, the resistance value of the superlattice 34 becomes small. When the magnetoresistance element 30 is faced to a position between the magnetic poles of inside and outside annular regions, the magnetic field does not pass through the superlattice 34. In this instance, a magnetic field in parallel with the surface of the magnetic rotary element 10 occurs at a position between the magnetic poles adjacent to one another. As the magnetic field is applied to the superlattice 34 at a right angle, the resistance value of the superlattice 34 is maintained in a great value. This is effective to accurately detect rotation of the magnetic rotary element 10.

Figure 43:
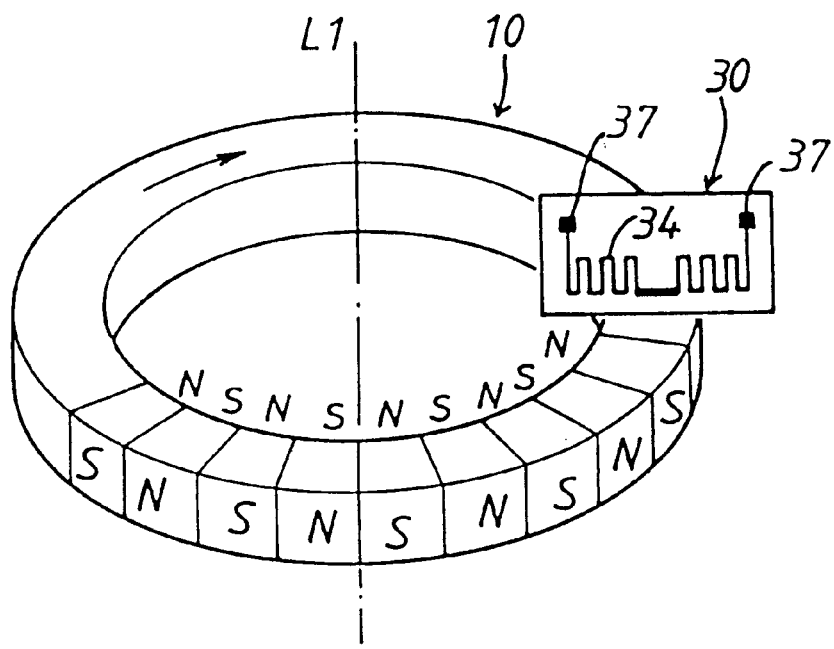
FIG. 43 is a perspective view of another modification of the magnetic rotation detector shown in FIG. 39(A)

In another modification of the magnetic rotation detector shown in FIG. 43, the magnetic rotary element 10 is in the form of an annular rotary member which is alternately magnetized at its inner and outer peripheries with north and south magnetic poles N and S in the same width. The magnetic poles at the inner periphery is opposed reversely in polarity to the magnetic poles at the outer periphery. In this modification, the magnetoresistance element 30 is arranged perpendicularly to the upper surface of the annular rotary member 10 as in the modification shown in FIG. 42, and the magnetoresistance element 30 is formed larger in width than the radial width of the annular rotary member 10 so that the superlattice 34 is located above the inner and outer peripheries of the annular rotary member 10. With such an arrangement, the resistance value of the superlattice 34 becomes small when the magnetoresistance element 30 is faced to the magnetic poles of the annular rotary member 10 and becomes large when the magnetoresistance 30 is faced to a position between magnetic poles. This is also effective to accurately detect rotation of the annular rotary member 10.

Figure 44A:
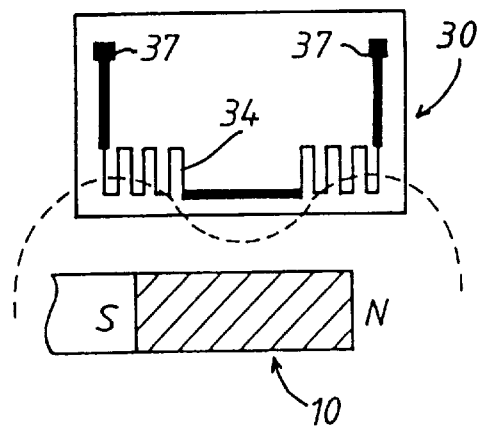
FIG. 44(A) is an enlarged view of a magnetoresistance element suitable for use in the magnetic rotation detector shown in FIG. 43.
Figure 44B:
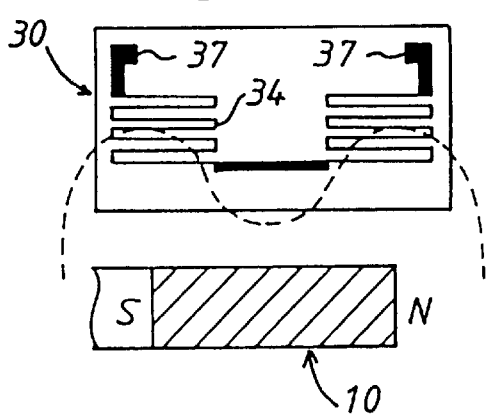
FIG. 44(B) is an enlarged view of another magnetoresistance element suitable for use in the magnetic rotation detector shown in FIG. 43.

Additionally, in the modification, the intensity of the magnetic field applied to and from the magnetic poles becomes large at the inner and outer peripheries of the annular rotary member 10 as illustrated in FIGS. 44(A) and 44(B). It is, therefore, preferable that the linear patterns of the superlattice are concentrated in width at the opposite end portions thereof opposed to the inner and outer peripheries of the annular rotary member 10 and enlarged in width at the central portion thereof. In other words, it is preferable to increase the resistance value of the superlattice 34 in a unit length at the opposite end portions of the magnetoresistance element 30 more than that at the central portion of the magnetoresistance element 30. This is effective to increase the variation rate of the resistance of the superlattice 34 thereby to more accurately detect rotation of the annular magnetic rotary member 10.

Figure 45:
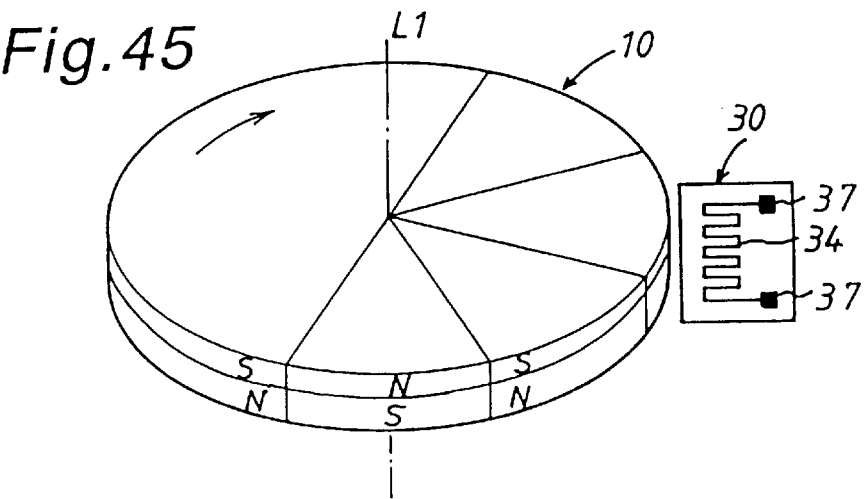
FIG. 45 is a perspective view of a modification of the magnetic rotation detector shown in FIG. 40(A)

In a modification of the magnetic rotation detector shown in FIG. 45, the magnetic rotary element 10 is in the form of a magnetic rotary disk of two layers which are alternately magnetized in the same width with north and south magnetic poles in a circumferential direction. The magnetic poles of the upper layer are opposed reversely in polarity to the magnetic poles of the lower layer. In this modification, the magnetoresistance element 30 is placed in a position opposed to the outer periphery of the magnetic rotary disk 10. The thickness of the magnetoresistance element 30 is smaller than each width of the magnetic poles, while the vertical length of the magnetoresistance element 30 is approximately the same as the thickness of the magnetic rotary disk 10. The superlattice 34 of the magnetoresistance element 30 is located in parallel with the outer periphery of the magnetic rotary member 10 and opposed to the two layers of the magnetic rotary member 10 at its central portion.

In the magnetic rotation detector shown in FIG. 45, a strong magnetic field applied to and from the magnetic poles of the rotary disk 10 passes through a plane in parallel with the surface of the superlattice 34 when the magnetoresistance element 30 is faced to the magnetic poles of the rotary disk 10. In this instance, the resistance of the superlattice 34 becomes small. When the magnetoresistance element 30 is faced to a position between the magnetic poles of the rotary disk 10, the magnetic field does not pass through the superlattice 34. In this instance, there will occur a magnetic field in parallel with the outer periphery of the magnetic rotary disk 10 at a position between the magnetic poles of the upper and lower layers adjacent to one another. As the magnetic field is applied perpendicularly to the superlattice 34, the resistance value of superlattice 34 is maintained in a great value. This is effective to accurately detect rotation of the magnetic rotary disk 10.

Figure 46:
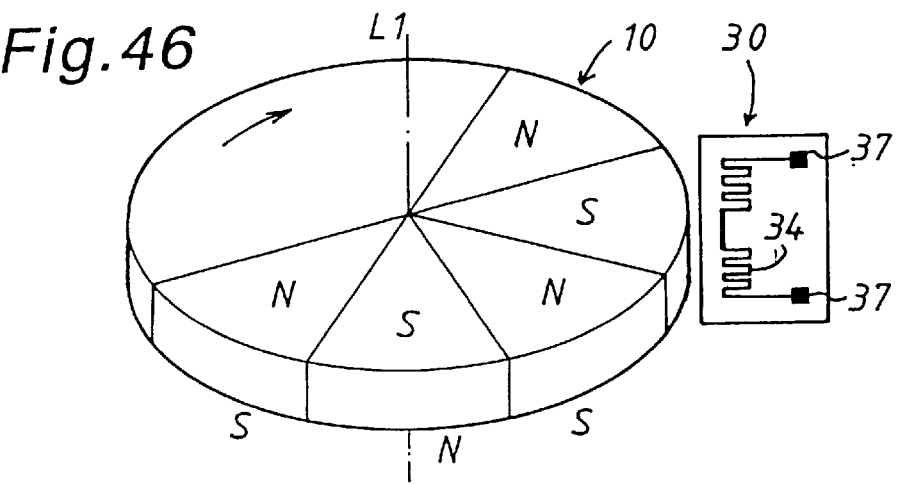
FIG. 46 is a perspective view of another modification of the magnetic rotation detector shown in FIG. 40(A)

In a modification of the magnetic rotation detector shown in FIG. 46, the magnetic rotary disk 10 is alternately magnetized at its upper and bottom surfaces with north and south magnetic poles N an S in the same width in a circumferential direction. The magnetic poles at the upper surface is opposed reversely in polarity to the magnetic poles at the bottom surface. In this modification, the magnetoresistance element 30 is placed in a position opposed to the outer periphery of the magnetic rotary disk 10 as in the modification shown in FIG. 45. With this arrangement, the resistance value of the superlattice 34 is decreased when the magnetoresistance element 30 is faced to the magnetic poles of rotary disk 10 and increased when the magnetoresistance element is faced to a position between the magnetic poles adjacent to one another. Thus, rotation of the magnetic rotary disk 10 can be accurately detected as in the modification shown in FIG. 45.

Additionally, in the magnetic rotation detector shown in FIG. 46, the intensity of the magnetic field applied to and from the magnetic poles of the rotary disk 10 is increased at each outer periphery of the upper and bottom surfaces of the rotary disk 10. It is, therefore, preferable that the linear patterns of superlattice 34 are concentrated in width at the opposite end portions thereof to be faced to each outer periphery of the upper and bottom surfaces of the rotary disk 10 and enlarged in width at the central portion thereof. This is effective to increase the variation rate of the resistance value of superlattice 34 In accordance with rotation of the rotary disk 10 thereby to more accurately detect rotation of the rotary disk 10.

Figure 47A:
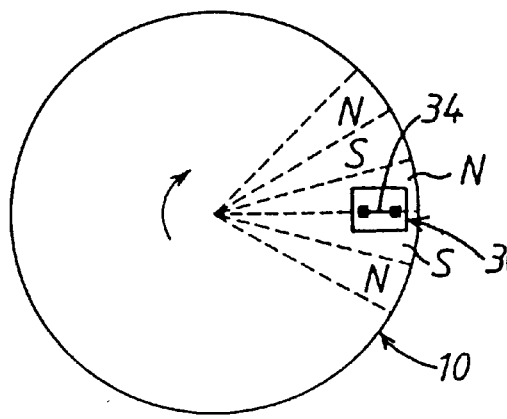
FIG. 47(A) is a plan view showing a first basic arrangement of a superlattice of a magnetoresistance element placed in parallel with the magnetized upper surface of a magnetic rotary disk.
Figure 47B:
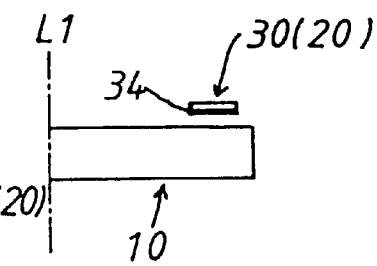
FIG. 47(B) is a front view of the first basic arrangement shown in FIG. 47(A)

In FIGS. 47(A) and 47(B), there is a basic arrangement of the magnetoresistance element 30 placed in parallel with the surface of the rotary element 10. In this arrangement, the magnetic rotary element is in the form of a rotary disk which is alternately magnetized at its upper surface with north and south magnetic poles N and S in the same width in a circumferential direction. The magnetoresistance element 30 is arranged in such a manner that the surface of superlattice 34 is located in parallel with the magnetized surface of the rotary disk 10. The linear pattern of the superlattice 34 is formed smaller in width than each width of the magnetic poles and placed in a radial direction of the rotary disk 10. Preferably, the linear pattern of the superlattice 34 is formed as small as possible in width.

Figure 48A:
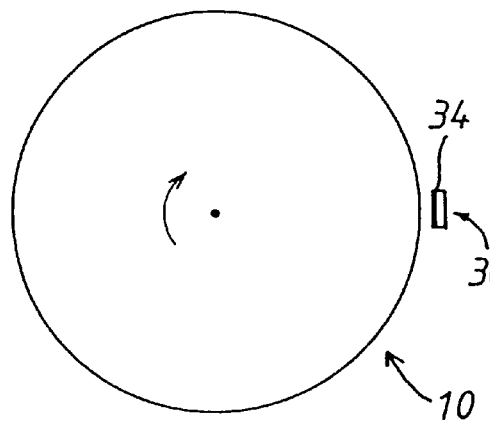
FIG. 48(A) is a plan view showing a second basic arrangement of a superlattice of a magnetoresistance element placed in parallel with the magnetized outer periphery of a magnetic rotary disk.
Figure 48B:
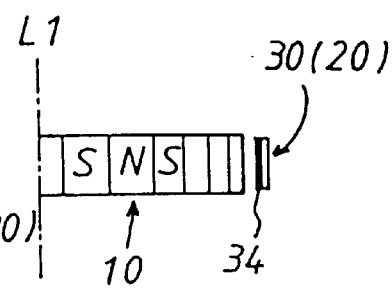
FIG. 48(B) is a front view of the second basic arrangement shown in FIG. 48(A)
Figure 49A:
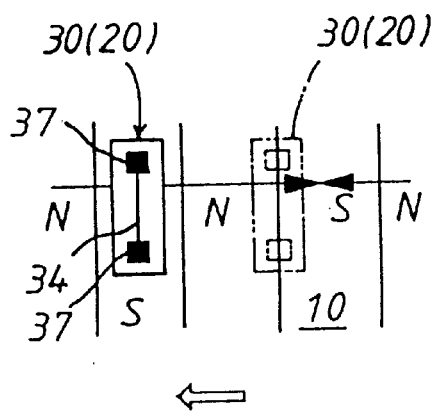
FIG. 49(A) is a plan view showing in detail a relative arrangement of the magnetized surface and the magnetoresistance element respectively shown in FIGS. 47(A) and 48(A)

Illustrated in FIGS. 48(A) and 48(B) is a basic arrangement of the magnetoresistance element 30 placed in parallel with the outer periphery of the rotary element 10. In this arrangement, the magnetic rotary element 10 is in the form of a rotary disk which is alternately magnetized at its outer periphery with north and south magnetic poles N and S in the same width. The magnetoresistance element 30 is arranged in such a manner that the surface of the superlattice 34 is located in parallel with the magnetized outer periphery of rotary disk 10. As shown in FIG. 49(A), the linear pattern of superlattice 34 is formed smaller in width than each width of the magnetic poles and placed in parallel with the outer periphery of rotary disk 10. Preferably, the linear pattern of superlattice 34 is formed as small as possible in width. In addition, the magnetic rotary element 10 may be in the form of an annular rotary member alternately magnetized at its inner and outer peripheries with north and south magnetic poles N and S in the same width. In use of the annular rotary member 10, the magnetoresistance element 30 may be opposed to the inner periphery of the annular rotary member 10 in parallel therewith.

Figure 49B:
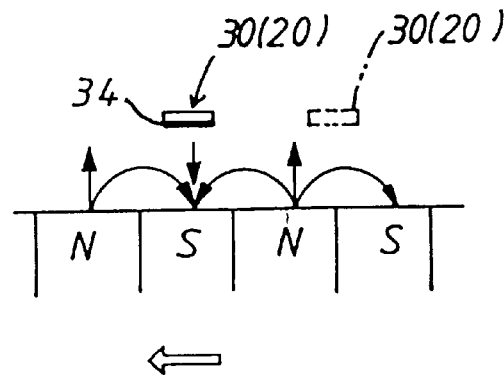
FIG. 49(B) is a front view of the relative arrangement of the magnetized surface and the magnetoresistance element shown in FIG. 49(A)

Assuming that the magnetoresistance element 30 has been faced to the magnetic pole S or N 10 during rotation of the magnetic rotary disk 10 as shown by solid lines in FIGS. 49(A) and 49(B), the magnetic field perpendicularly applied to and from the superlattice 34 becomes large while the magnetic field in parallel with the surface of superlattice 34 becomes small. In this instance, the resistance value of superlattice 34 is increased. When the magnetoresistance element 30 is faced to a position between the magnetic poles N and S as shown by imaginary lines in FIGS. 49(A) and 49(B), the magnetic field in parallel with the surface of superlattice 34 becomes large. In this instance, the resistance value of superlattice 34 is decreased. Thus, in the arrangement of the magnetoresistance element 30 shown in FIGS. 47(A), 47(B) or 48(A), 48(B), rotation of the magnetic rotary disk 10 can be detected as variation of the resistance value of superlattice 34.

In the case that rotation of the magnetic rotary disk 10 is detected in the above arrangement, it is necessary to avoid the superlattice 34 from influence of the magnetic field in parallel with the magnetized surface of the rotary disk 10 when the magnetoresistance element 30 is faced to the magnetic poles. It is, therefore, preferable that the linear pattern of superlattice 34 is provided in the form of a single line pattern as shown in FIGS. 50(A)–50(C). On the other hand, it is required to prolong the effective length of superlattice 34 in order to enhance the variation rate of the resistance value of superlattice 34. It is, therefore, desirable that as shown in FIGS. 50(D)–50(H), the linear patterns of superlattice 34 is vertically or laterally prolonged with a narrow width in a direction of the magnetic field to be detected. In the respective figures, the direction of the magnetic field to be detect is indicated by an arrow.

Figure 51A:
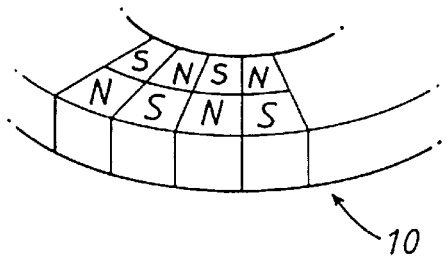
Figure 51B:
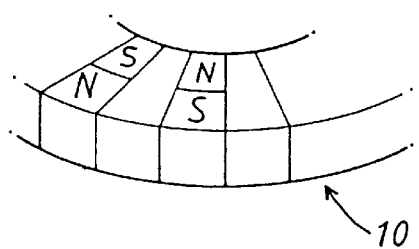
Figure 51D:
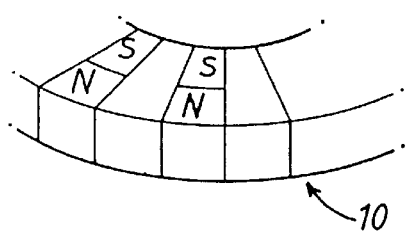
Figure 51C:
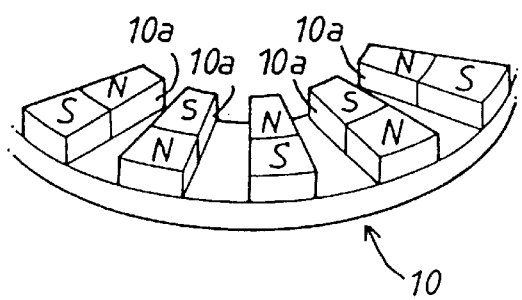

In the arrangement of the magnetic rotation detector shown in FIGS. 47(A) and 47(B), the magnetic rotary disk 10 may be modified as shown in FIGS. 51(A)–51(E). In FIG. 51(A), the magnetic rotary disk 10 is in the form of an annular rotary member composed of inside and outside annular regions which are alternately magnetized with north and south magnetic poles N and S in the same width. The magnetic poles of the inside annular region are opposed reversely in polarity to the magnetic poles of the outside annular region. Assuming that the magnetoresistance element 30 has been faced to a position between the magnetic poles of the annular rotary member 10 shown in FIG. 51(A), the magnetic field in parallel with the magnetic poles adjacent to one another acts to decrease the resistance value of superlattice 34. It is, therefore, preferable that the magnetic annular rotary member 10 of FIG. 51(A) is modified as shown in FIG. 51(B) or 51(C). In FIG. 51(B), the magnetic annular member 10 is provided with a plurality of circumferentially equally spaced nonmagnetic portions among the magnetic poles of the inside and-outside annular regions. In FIG. 51(C), the magnetic annular rotary member 10 is provided with a plurality of circumferentially equally spaced radial grooves 10*a* among the magnetic poles of the inside and outside annular regions. In use of these magnetic annular rotary members 10, when the magnetoresistance element is faced to the nonmagnetic portion or radial groove b1*a* between the magnetic poles, the resistance value of superlattice 34 is increased without being applied with undesired influence of the magnetic field in parallel with the magnetized surface of the rotary member 10.

Figure 51E:
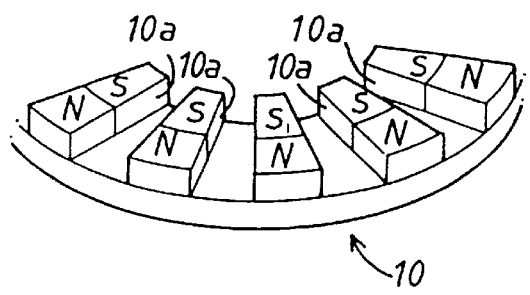
Figure 52A:
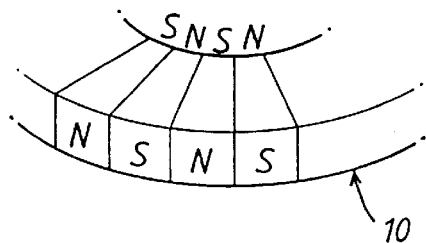
FIGS. 52(A)–52(E) illustrate other modifications of the magnetic rotary disk shown in FIG. 47(A)
Figure 52B:
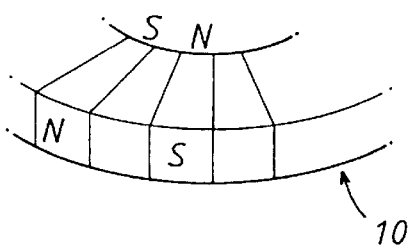
Figure 52D:
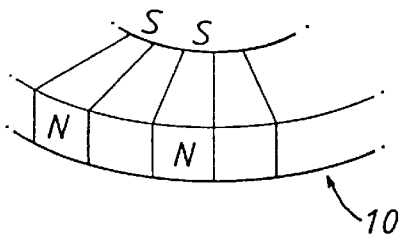
Figure 52C:
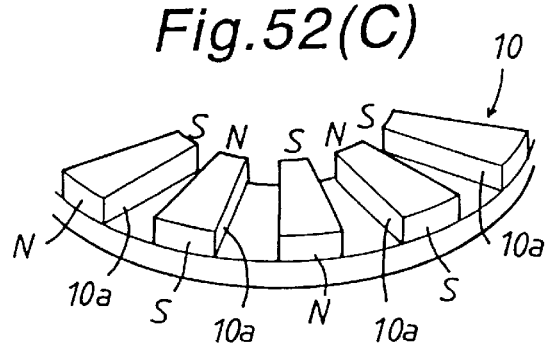
Figure 52E:
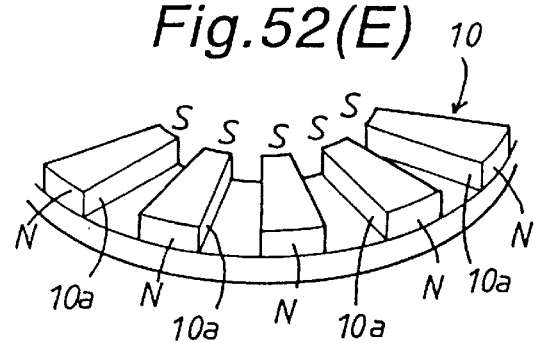

In FIG. 51(D), the annular rotary member 10 is provided with a plurality of circumferentially equally spaced north magnetic poles N at its outside annular region and is provided with a plurality of circumferentially equally spaced south magnetic poles S at its inside annular region. The annular rotary member 10 is provided with a plurality of circumferentially equally spaced radial nonmagnetic portions among the magnetic poles N and S of the outside and inside annular regions. The annular rotary member 10 may be provided with radial grooves 10*a* among the magnetic poles N and S of the outside and inside annular regions as shown in FIG. 51(E). In addition, the radial grooves 10*a* shown in FIGS. 51(C) or 51(E) may be molded with synthetic resin to enhance the mechanical strength of the annular rotary member 10. Furthermore, the annular rotary members 10 shown in FIGS. 51(A)–51(E) may be modified as shown in FIGS. 52(A)–52(E). In these modifications, the annular rotary member 10 is in the form of an annular rotary member which is alternately magnetized with north and south magnetic poles at its outer and inner peripheries. The magnetic poles at the inner periphery is opposed reversely in polarity to the magnetic poles at the outer periphery.

Figure 53A:
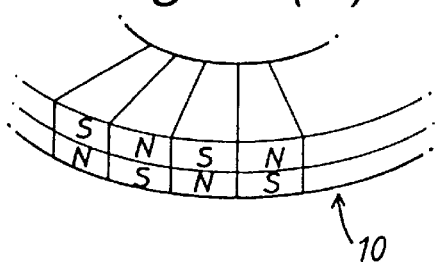
FIGS. 53(A)–53(E) illustrate modifications of the magnetic rotary disk shown in FIG. 48(A)
Figure 53B:
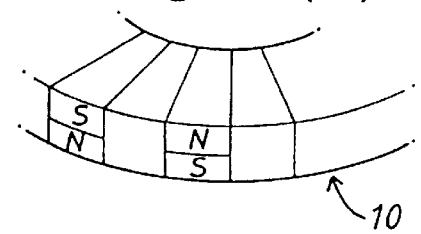
Figure 53D:
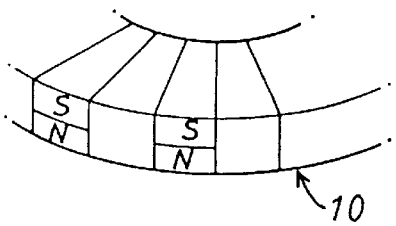
Figure 53C:
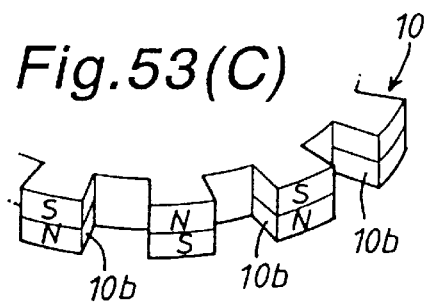
Figure 53E:
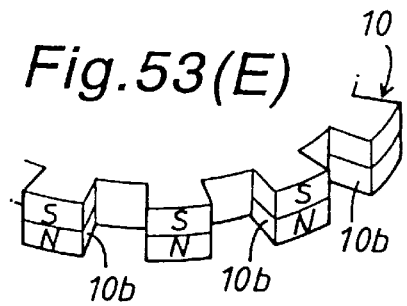
Figure 54A:
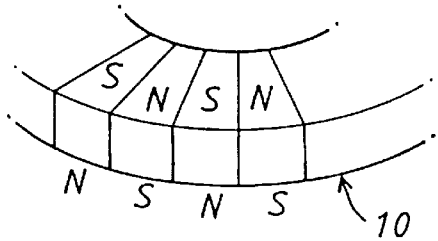
FIGS. 54(A)–54(E) illustrate other modifications of the magnetic rotary disk shown in FIG. 48(A)
Figure 54B:
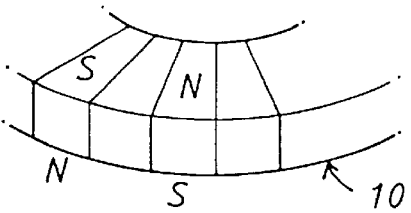
Figure 54D:
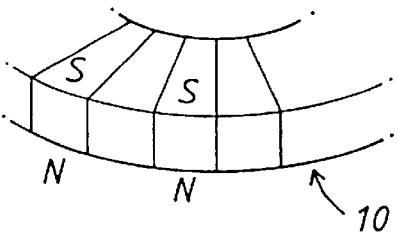
Figure 54C:
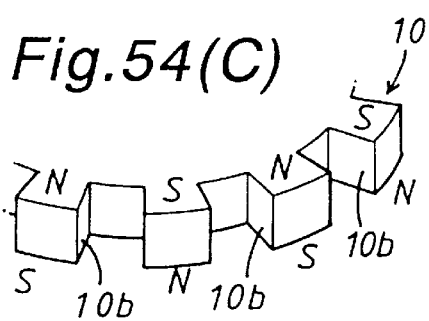
Figure 54E:
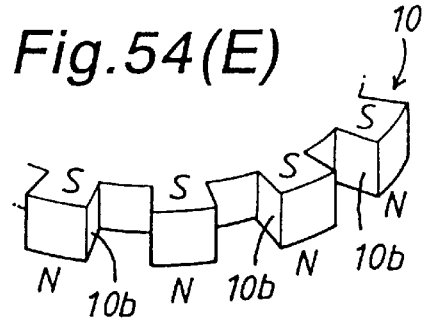

In the arrangement of the magnetic rotation detector shown in FIGS. 48(A) and 48(B), the magnetic rotary disk 10 may be modified as shown in FIGS. 53(A)–53(E). In FIG. 53(A), the magnetic rotary disk 10 is in the form of an annular rotary member composed of upper and lower annular regions which are alternately magnetized in the same width with north and south magnetic poles N and S at their outer peripheries, respectively. The magnetic poles of the upper annular region are opposed reversely in polarity to the magnetic poles of the lower annular region. Assuming that the magnetoresistance element 30 has been faced to a position between the magnetic poles of the annular rotary member 10 shown in FIG. 53(A), the magnetic field in parallel with the magnetic poles adjacent to one another acts to decrease the resistance value of superlattice 34. It is, therefore, preferable that the magnetic annular rotary member 10 of FIG. 53(A) is modified as shown in FIG. 53(B) or 53(C). In FIG. 53(B), the magnetic annular member 10 is provided with a plurality of circumferentially equally spaced nonmagnetic portions among the magnetic poles of the upper and lower annular regions. In FIG. 53(C), the magnetic annular rotary member 10 is provided with a plurality of circumferentially equally spaced radial grooves 10*b* among the magnetic poles of the upper and lower annular regions. In use of these magnetic annular rotary members 10, when the magnetoresistance element is faced to the nonmagnetic portion or radial groove 10*b* between the magnetic poles, the resistance value of superlattice 34 is increased without being applied with undesired influence of the magnetic field in parallel with the magnetized surface of the rotary member 10. The magnetic annular rotary member 10 shown in FIG. 53(B) or 53(C) may be further modified as shown in FIGS. 53(D) or 53(E), wherein the upper annular region of the rotary member 10 is provided with a plurality of circumferentially equally spaced south magnetic poles S while the lower annular region of the rotary member 10 is provided with a plurality of circumferentially equally spaced north magnetic poles N. The radial grooves 10*b* shown in FIG. 53(C) or 53(E) may be molded with synthetic resin to enhance the mechanical strength of the annular rotary member 10.

Furthermore, the annular rotary members 10 shown in FIGS. 53(A)–53(E) may be modified as shown in FIGS. 54(A)–54(E). In these modifications, the annular rotary member 10 is in the form of an annular rotary member which is alternately magnetized with north and south magnetic poles at its upper and bottom surfaces. The magnetic poles at the upper surface is opposed reversely in polarity to the magnetic poles at the bottom surface.

Figure 55A:
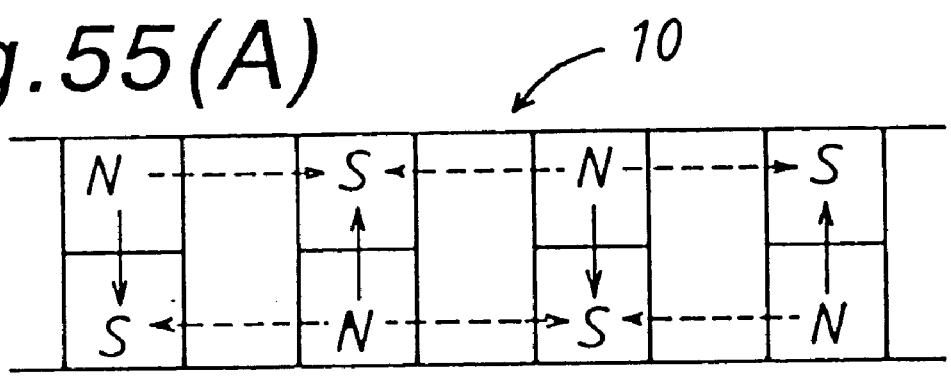
FIGS. 55(A) and 55(B) illustrate the magnetized surface of each of the magnetic rotary disks shown in FIGS. 51(A)–51(E), 52(A)–52(E), 53(A)–53(E) and 54(A)–54(E)
Figure 55B:
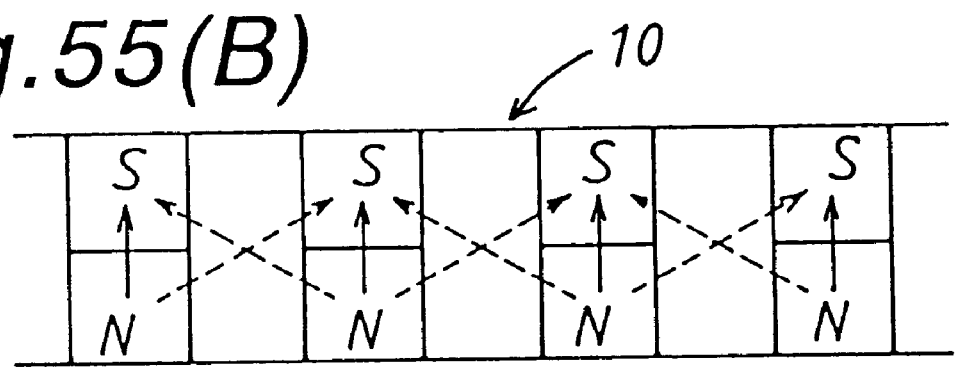

In the case that the magnetic annular rotary member 10 shown in FIGS. 51(A)–51(C), 52(A)–52(C), 53(A)–53(C) or 54(A)–54(C) is used in the magnetic rotation detector shown FIGS. 47(A), 47(B) or 48(A), 48(B), the magnetic fields applied to the surface of superlattice 34 in parallel therewith will occur in a radial or vertical direction shown by solid lines in FIG. 55(A) and in a circumferential direction shown by dotted lines in FIG. 55(A). In the case that the magnetic annular rotary member 10 shown in FIGS. 51(D), 51(E); 52(D), 52E); 53(D), 53(E); or 54(D), 54(E) is used in the magnetic rotation detector shown in FIGS. 47(A), 47(B) or 48(A), 48B), the magnetic fields applied to the surface of superlattice 34 in parallel therewith will occur in a radial or vertical direction shown by solid lines in FIG. 55(B) and in a diagonal direction shown by dotted lines in FIG. 55(B). When the magnetoresistance element 30 is faced to a position between the magnetic poles of the rotary member 10, the magnetic field in the circumferential direction or the diagonal direction is applied to the surface of superlattice 34 in parallel therewith. This results in a decrease of the resistance value of superlattice 34. It is, therefore, preferable that the magnetic field in parallel with the surface of superlattice 34 is eliminated.

Figure 56A:
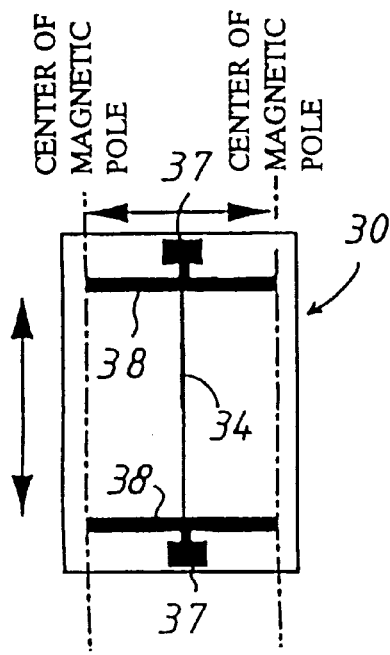
FIGS. 56(A)–56(C) illustrate improved magnetoresistance elements opposed to the magnetic rotary disks shown in FIGS. 51(A)–51(E), 52(A)–52(E), 53(A)–53(E) and 54(A)–54(E)
Figure 56B:
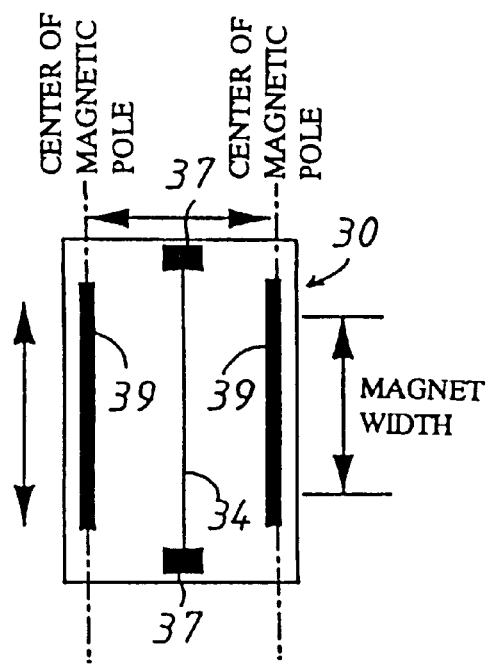
Figure 56C:
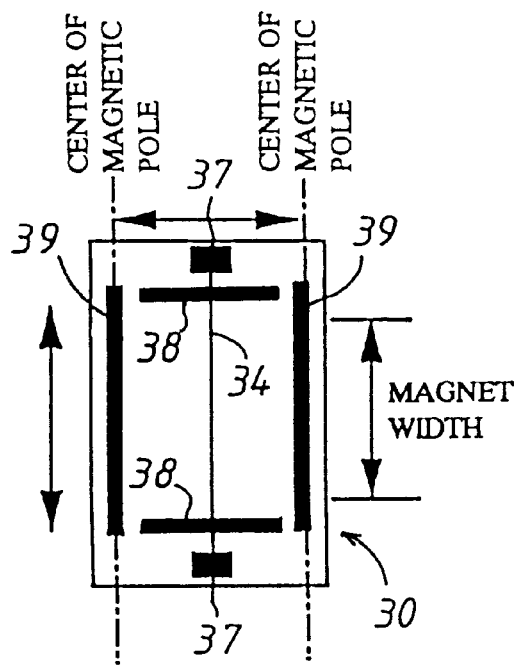
Figure 57A:
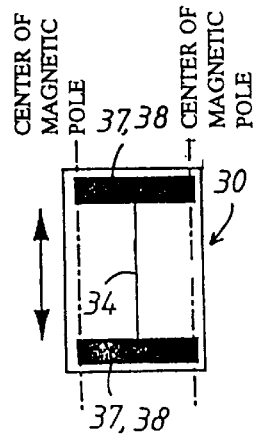
FIGS. 57(A)–57(H) illustrate modifications of the magnetoresistance element shown in FIG. 56(A)
Figure 57B:
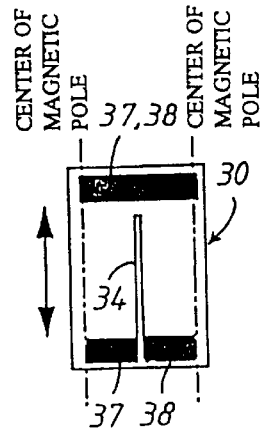
Figure 57C:
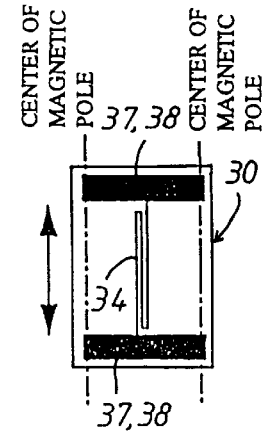
Figure 57D:
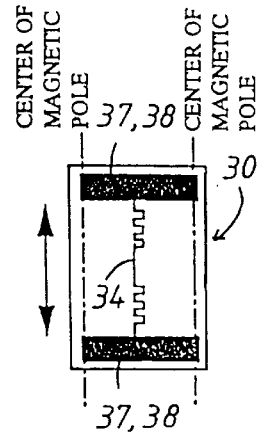
Figure 57E:
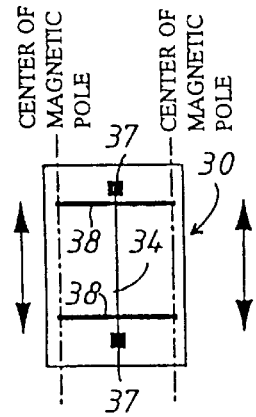
Figure 57F:
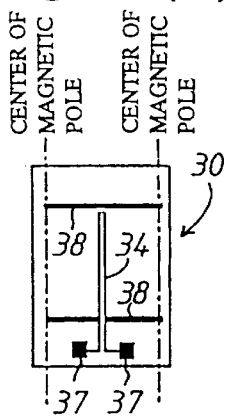
Figure 57G:
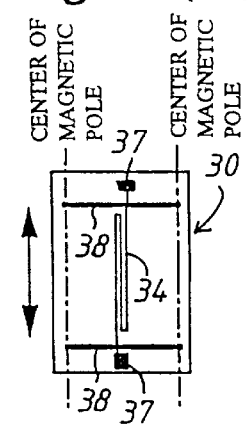
Figure 57H:
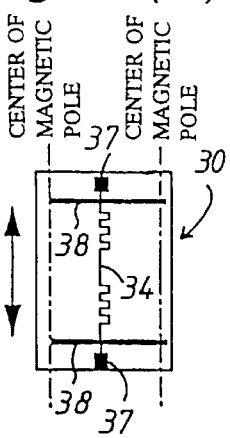

Illustrated in FIGS. 56(A)–56(C) are certain arrangements of the magnetoresistance element 30 for eliminating the undesired magnetic field in parallel with the surface of superlattice 34. In the figures, the direction of the magnetic field for detecting rotation of the magnetic rotary member 10 is indicated by an arrow. In FIG. 56(A), the magnetoresistance element 30 is provided with a pair of lateral magnetic portions 38 perpendicular to the linear pattern of superlattice 34. The length of the respective lateral magnetic portions 38 is substantially the same as the circumferential space between the magnetic poles N and S of the rotary member 10. In the case that the magnetoresistance element 30 of FIG. 56(A) is arranged as in the magnetic rotation detector shown in FIGS. 47(A), 47(B) or 48(A), 48(B), the lateral magnetic portions 38 act to block the line of magnetic force in the circumferential direction shown in FIG. 55(A) or in the diagonal direction shown in 55(B). Thus, the resistance value of superlattice 34 is maintained in a great value even when the magnetoresistance element 30 is faced to the space between the magnetic poles N and S of the rotary member 1 in the circumferential direction. The magnetoresistance element 30 of FIG. 56(A) may be modified as shown in FIGS. 57(A)–57(H), wherein the lateral magnetic portions 38 are changed in width, the linear patterns of superlattice 34 are concentrated in a narrow width, or the positions of the electrodes 37 are changed in relation to the lateral magnetic portions 38, respectively.

Figure 58A:
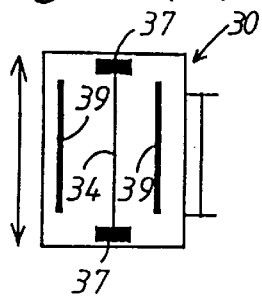
FIGS. 58(A)–58(P) illustrate modifications of the magnetoresistance element shown in FIG. 56(B)
Figure 58B:
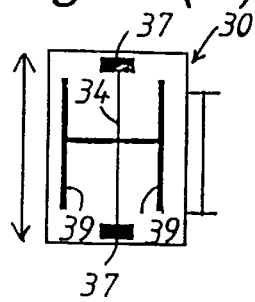
Figure 58C:
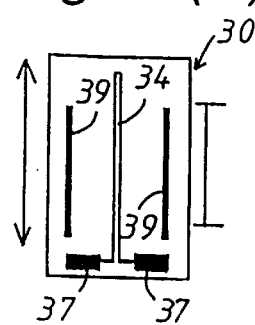
Figure 58D:
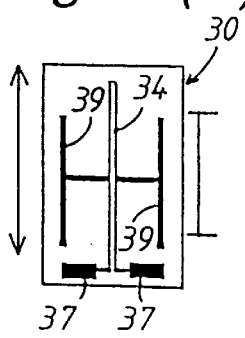
Figure 58E:
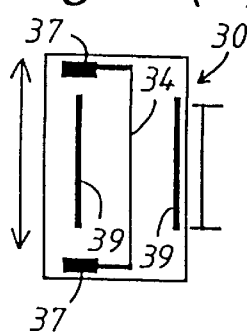
Figure 58F:
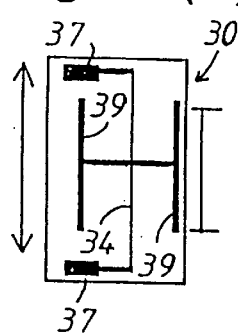
Figure 58G:
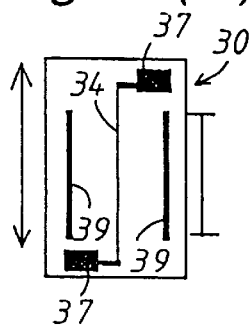
Figure 58H:
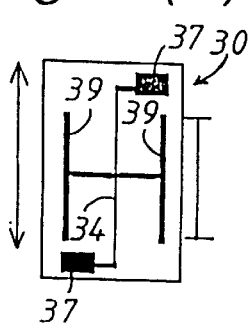
Figure 58I:
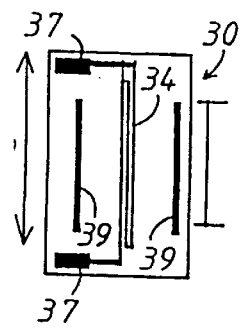
Figure 58J:
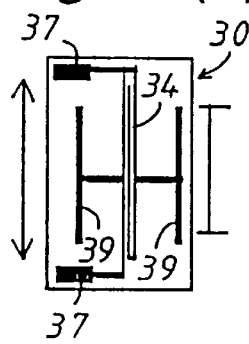
Figure 58K:
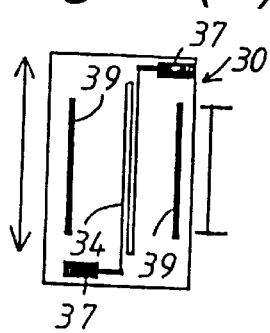
Figure 58L:
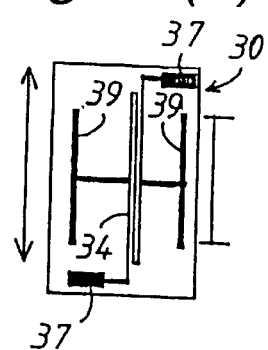
Figure 58M:
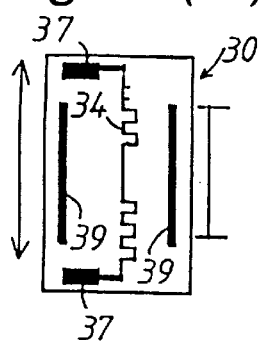
Figure 58N:
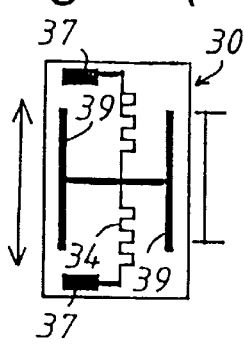
Figure 58O:
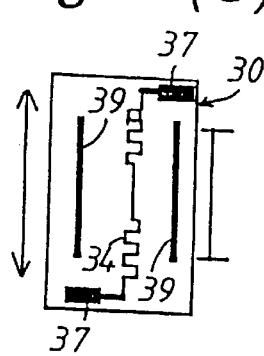
Figure 58P:
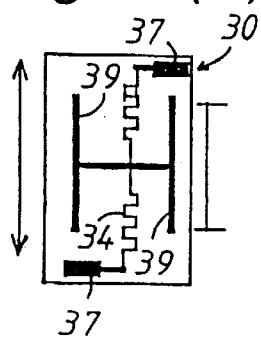

In FIG. 56(B), the magnetoresistance element 30 is provided with a pair of vertical magnetic portions 39 in parallel with the linear pattern of superlattice 34. The length of the respective vertical magnetic portions 39 is substantially the same as the width of the magnetized portion of rotary member 10. In the case that the magnetoresistance element 30 of FIG. 56(B) is arranged as in the magnetic rotation detector shown in FIGS. 47(A), 47(B) or 48(A), 48(B), the vertical magnetic portions 39 act to block the line of magnetic force in the circumferential direction shown in FIG. 55(A) or in the diagonal direction shown in 55(B). Thus, the resistance value of superlattice 34 is maintained in a great value even when the magnetoresistance element 30 is faced to the space between the magnetic poles N and S of the rotary member 1 in the circumferential direction. The magnetoresistance element 30 of FIG. 56(B) may be modified as shown in FIGS. 58(A)–58(P), wherein the lateral magnetic portions 39 are changed in width, the linear patterns of superlattice 34 are concentrated in a narrow width, or the positions of the electrodes 37 are changed in relation to the vertical magnetic portions 39, respectively.

Furthermore, the magnetoresistance element 30 may be modified as shown in FIG. 56(C), wherein the magnetoresistance element 30 is provided with the lateral magnetic portions 38 shown in FIG. 56(A) and the vertical magnetic portions 39 shown in FIG. 56(B).

Hereinafter, each modification of the annular magnetic rotary members 10 shown in FIGS. 51(A) and 53(A) will be described with reference to FIGS. 59(A) and 59(B). The annular magnetic rotary member 10 of FIG. 51(A) may be modified as shown in FIG. 59(A), wherein the north and south magnetic poles N and S of the inside annular region are displaced in the circumferential direction to be located between the north and south magnetic poles N and S of the outside annular region. The annular magnetic rotary member 10 of FIG. 53(A) may be modified as shown in FIG. 59(B), wherein the north and south magnetic poles N and S of the bottom annular region are displaced in the circumferential direction to be located between the north and south magnetic poles N and S of the upper annular region.

Assuming that the annular magnetic rotary member 10 of FIG. 59(A) or 59(B) has been used in the magnetic rotation detector shown in FIGS. 47(A), 47(B) or 48(A), 48(B), the intensity of the magnetic field in parallel with the magnetized surface of rotary member 10 increases when the magnetoresistance element 30 is faced to the magnetic poles N and S different in polarity as shown by solid lines in FIG. 60. This results in a decrease of the resistance value of superlattice 34. When the magnetoresistance element 30 is faced to the same magnetic poles S or N in polarity as shown by imaginary lines in FIG. 60, there will not occur any magnetic field between the inside and outside annular regions or between the upper and lower annular regions. This results in an increase of the resistance value of superlattice 34. Thus, rotation of the magnetic rotary member 10 can be accurately detected without the provision of the nonmagnetic portions.

Figure 61A:
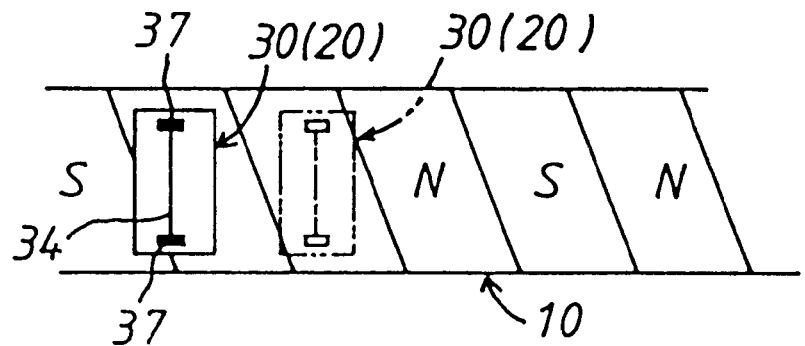
FIGS. 61(A)–61(C) illustrate modifications of the magnetization of the magnetic rotary disk shown in FIGS. 59(A) and 59(B)

The annular magnetic rotary member 10 of FIG. 59(A) or 59(B) may be further modified as shown in FIG. 61(A), wherein the magnetic poles N and S of the outside annular region or the upper annular region are inclined at an proper angle relative to the circumference of the inside annular region or the lower annular region. In this modification, the magnetic field in parallel with the magnetized surface of rotary member 10 increases when the magnetoresistance element 30 is faced to the north and south magnetic poles N and S as shown by solid lines in FIG. 61. This results in a decrease of the resistance value of superlattice 34. When the magnetoresistance element is faced to the north or south magnetic pole N or S as shown by imaginary lines in FIG. 61, there will not occur any magnetic field in parallel with the magnetized surface of rotary member 10. This results in an increase of the resistance value of superlattice 34. Thus, rotation of the magnetic rotary member 10 can be accurately detected without the provision of the nonmagnetic portions.

Figure 61B:
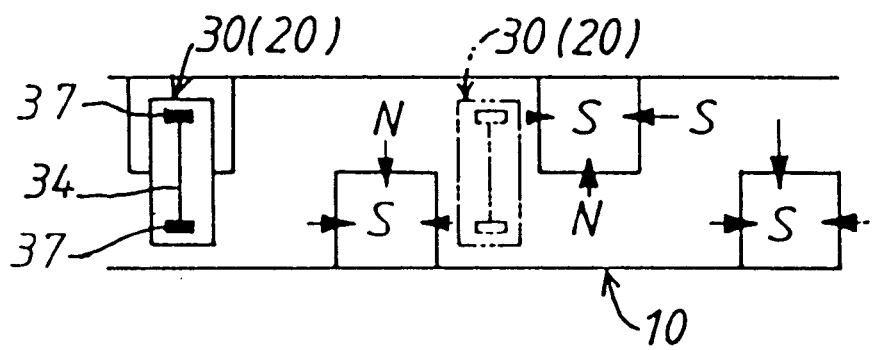
Figure 61C:
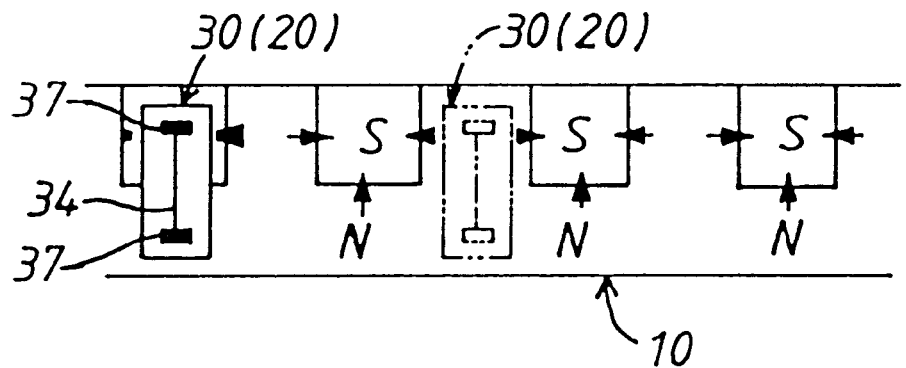

The annular magnetic rotary member 10 of FIG. 59(A) or 59(B) may be modified as shown in FIG. 61(B), wherein the outside and inside annular regions or the upper and lower annular regions are magnetized with a north pole N and provided with a plurality of circumferentially equally spaced rectangular south poles S. The annular magnetic rotary member 10 of FIG. 59(A) or 59(B) may be modified as shown in FIG. 61(C), wherein the outside or the upper annular region is provided with a plurality of circumferentially equally spaced rectangular south poles S while the inside or lower annular region is magnetized with a north pole N. In these modifications, the resistance value of superlattice 34 is decreased when the magnetoresistance element 30 is faced to the magnetic poles different in polarity as shown by solid lines in FIG. 61(B) or 61(C). When the magnetoresistance element 30 is faced only to the north pole N as shown by imaginary lines in FIG. 6(B) or 61(C), the resistance value of superlattice 34 is increased. Such variation of the resistance value is effect to accurately detect rotation of the magnetic rotary member 10.

Since the magnetoresistance element 30 associated with the annular magnetic rotary member 10 of FIG. 59(A) or 59(B) is useful to produce a series of pulse signals at a large amplitude frequency in accordance with rotation of the rotary member 10, the rotation sensor 20 including the foregoing magnetoresistance element 30 is suitable for detecting rotation of a rotary member placed in a remote position apart therefrom. For example, the rotation sensor 20 is suitable for detecting a rotation speed of an output shaft of a power transmission of an automotive vehicle or a prime mover of the vehicle or for detecting a rotation angle of a steering shaft of the vehicle.

Figure 62:
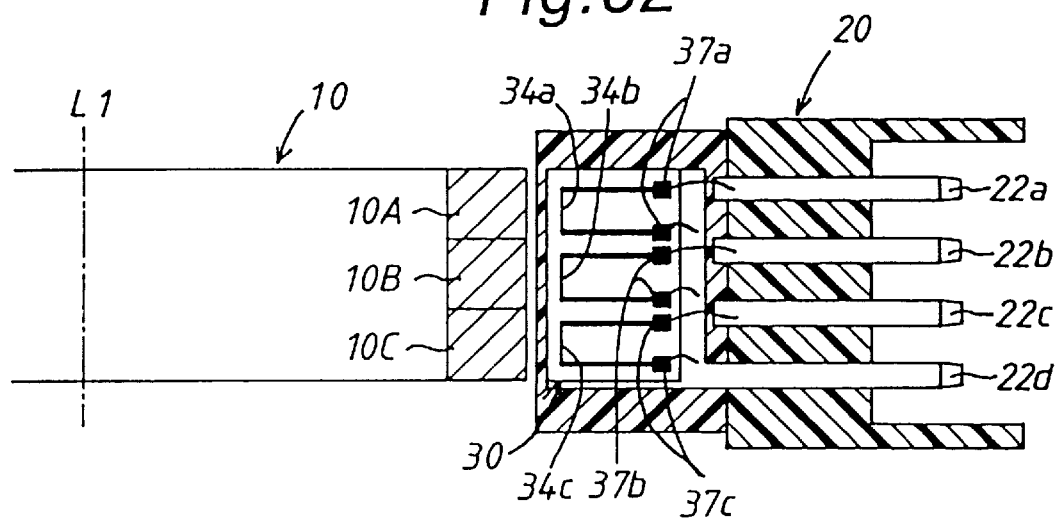
FIG. 62 is a sectional view of a magnetic rotation detector of the present invention adapted to detect a rotation speed of a prime mover of an automotive vehicle.
Figure 63A:
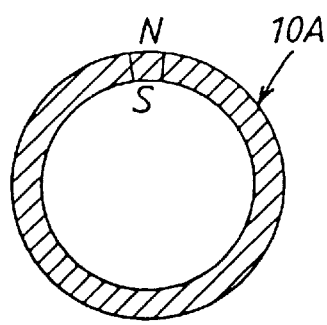
FIGS. 63(A)–63C) illustrate cross-sections of an annular region of the magnetic rotary element shown in FIG. 62.
Figure 63B:
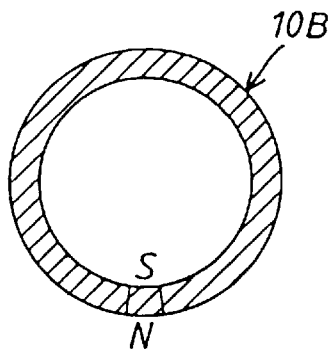
Figure 63C:
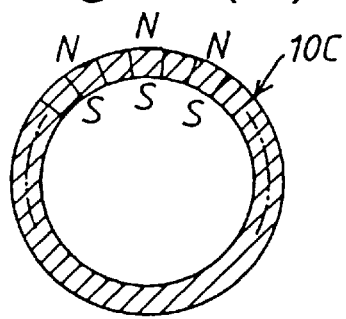

In FIG. 62 there is illustrated an embodiment of the rotation sensor 20 adapted to detect rotation of a timing rotor of a distributor for an internal combustion engine. In this embodiment, the magnetic annular rotary member 10 is in the form of an annular member which is mounted on the timing rotor of the distributor for rotation therewith. The annular member 10 is composed of three annular regions 10A, 10B and 10C. As shown in FIG. 63(A), the upper annular region 10A is provided with a north magnetic pole N at its outer periphery and with a south magnetic pole S at its inner periphery. As shown in FIG. 63(B), the intermediate annular region 10B is provided at its outer periphery with a north magnetic pole N in a position circumferentially displaced from the north magnetic pole N of upper annular region 10A at 180 degrees and at its inner periphery with a south magnetic pole S opposed to the outer north magnetic pole N. As shown in FIG. 63(C), the lower annular region 10C is provided at its outer periphery with a plurality of circumferentially equally spaced north magnetic poles N and at its inner periphery with a plurality of circumferentially equally spaced south magnetic poles S opposed to the outer north magnetic poles N.

The rotation sensor 20 is arranged to be opposed to the outer periphery of the annular rotary member 10. The magnetoresistance element of the rotation sensor 20 is provided with superlattices 34a, 34b and 34c formed on a buffer layer in such a manner as shown in FIGS. 2(A), 2(B). The superlattices 34a, 34b and 34c are placed to correspond with the annular regions 10A, 10B and 10C of rotary member 10. The superlattices 34a, 34b and 34c are provided with each pair of electrodes 37a, 37b and 37c, respectively. The magnetoresistance element 30 is arranged in such a manner that the surface of superlattices 34a–34c is placed perpendicularly to the outer periphery of rotary member 10 in a radial direction and that the superlattices 34a–34c are opposed to the outer peripheries of annular regions 10A, 10B and 10C in parallel therewith. The rotation sensor 20 is provided with four terminals 22a–22d which are connected to a signal processing circuit shown in FIG. 64 by means of a cable 23 as shown in FIG. 6. The terminals 22a–22c are connected to each one of the electrodes 37a–37c, and the terminal 22d is connected in common to the other electrodes 37a–37c.

Figure 64:
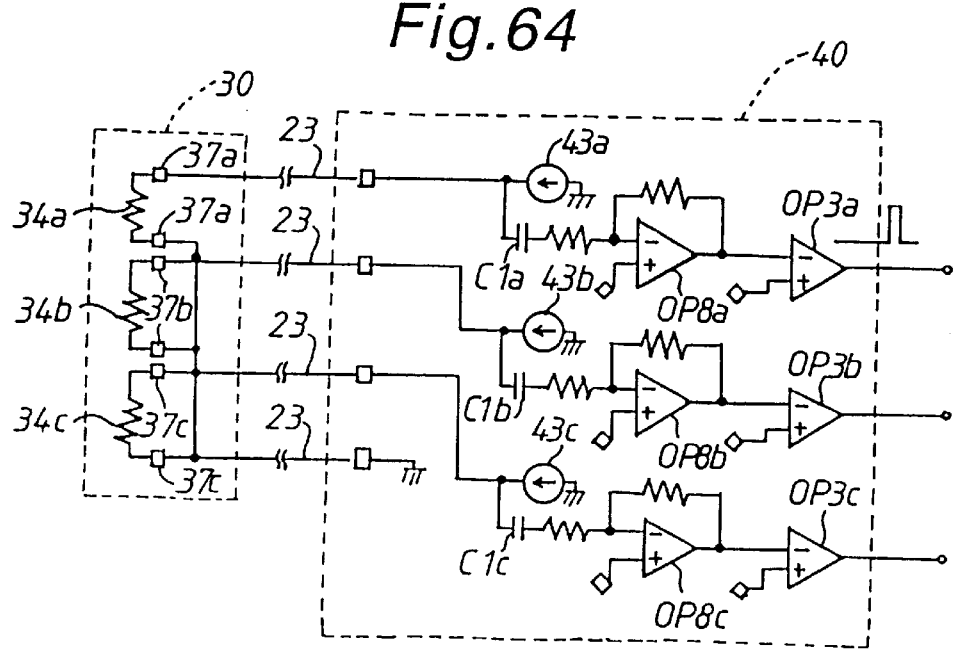
FIG. 64 is a diagram of a signal processing circuit associated with the magnetic rotation detector shown in FIG. 62.

The signal processing circuit shown in FIG. 64 has constant current source circuits 43a–43c which correspond with the superlattices 34a–34c. The constant current source circuits 43a–43c are connected to each one of the electrodes 37a–37c through the cable 23. The other electrodes 37a–37c are grounded through the cable 23. The constant current source circuits 43a–43c are also connected to each negative terminal of comparators OP3a–OP3c through condensers C1a–C1c and buffer amplifiers OP8a–OP8c, respectively. The comparators OP3a–OP3c are applied at their positive terminals with a reference voltage from a potentiometer (not shown).

Figure 65:
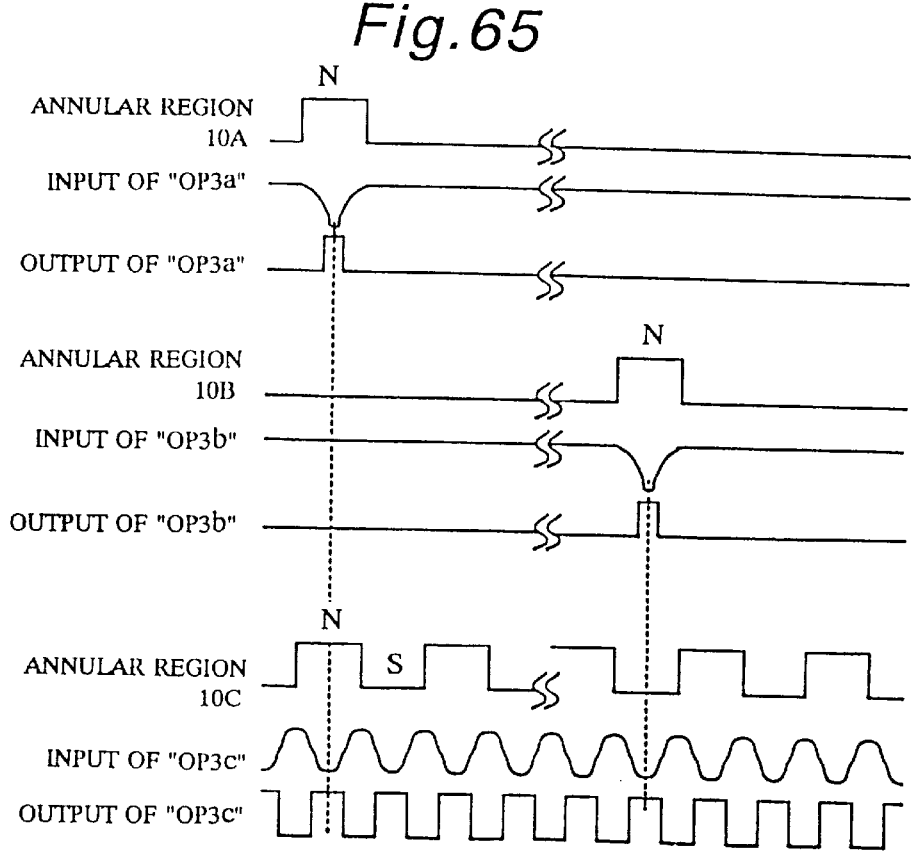
FIG. 65 is a time chart illustrating a relationship between a magnetized pattern of each annular region of the magnetic rotary element shown in FIG. 62 and waveforms of input and output signals of each comparator in the signal processing circuit shown in FIG. 64.

Assuming that the magnetic rotary member 10 is being rotated in operation of the distributor, each resistance value of the superlattices 34a–34c decreases when the magnetoresistance element 30 is faced to the magnetic poles of the annular regions 10A, 10B, 10C of the rotary member 10. When the magnetoresistance element 30 is faced to the nonmagnetic portions of the rotary member 10, each resistance value of the superlattices 34 increases. Such variation of the resistance values is converted into variation of voltages under a constant current applied from the Constance current source circuits 43a–43c. The converted voltages are applied to the comparators OP3a–OP3c through the condensers C1a–C1c and buffer amplifiers OP8a–OP8c as shown in FIG. 65. In this instance, the comparators OP3a and OP3b each produce a pulse signal therefrom at a different phase of 180 degrees per one rotation of the timing rotor of the distributor, while the comparator OP3c produces a series of pulse signals per one rotation of the timing rotor. Thus, the rotation speed of the timing rotor is detected by the superlattice 34c, and the rotation angle of the timing rotor is detected by the superlattices 34a and 34b.

In the embodiment of FIG. 62, the annular regions 10A and 10B of rotary member 10 may be-modified in magnetization as shown in Fig, 66(A), wherein each outer periphery of the annular regions 10A and 10B is magnetized with a south magnetic pole S except for a nonmangnetic portion, while each inner periphery of the annular regions 10A and 10B is magnetized with a north magnetic pole N except for the nonmagnetic portion. Alternatively, the annular regions 10A and 10B of rotary member 10 may be modified in magnetization as shown in FIG. 66(B), wherein each outer periphery of the annular regions 10A and 10B is magnetized with a north magnetic pole N at a portion thereof and with a south magnetic pole S at the other portion thereof, while each inner periphery of the annular regions 10A and 10B is magnetized with a south magnetic pole S opposed to the north magnetic pole at the outer periphery and with a north magnetic pole at the other portion thereof.

In addition, the embodiment of FIG. 62 may be modified as shown in FIG. 67, wherein the annular magnetic rotary member 10 is composed of three annular regions 10D, 10E and 10F in a radial direction, and wherein the rotation sensor 20 is arranged to oppose to the upper surface of the rotary member 10. In this modification, the superlattices 34a–34c of the magnetoresistance element 30 are located above the upper surfaces of annular regions 10D, 10E and 10F and arranged in the radial direction of rotary member 10, and the annular regions 10D, 10E and 10F are magnetized in the same manner as in the annular regions 10A, 10B and 10C shown in FIGS. 63(A)–63(C).

Figure 68A:
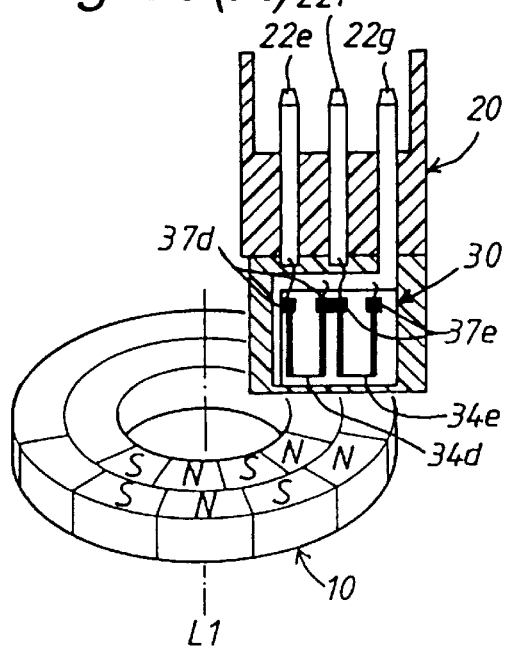
FIGS. 68(A)–68(D) illustrate embodiments of the magnetic rotation detector of the present invention adapted to detect a rotation angle of a steering shaft in an automotive vehicle.
Figure 69A:
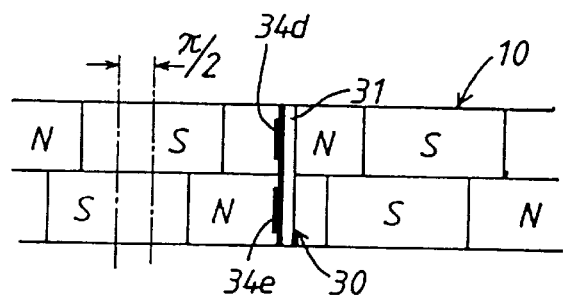
FIG. 69(A) is an enlarged view of a magnetized region respectively shown in FIGS. 68(A) and 68(B)

Illustrated in FIGS. 68(A) and 69(A) is an embodiment of the rotation sensor 20 adapted to detect a rotation angle of a steering shaft of an automotive vehicle. In this embodiment, the magnetic rotary member 10 is in the form of an annular rotary member composed of outside and inside annular regions which are alternately magnetized with north and south magnetic poles N and S in a circumferential direction. The magnetic poles of the inside annular region are circumferentially displaced from the magnetic poles of the outside annular region in a width of one fourth thereof. The annular rotary member 10 is mounted on the steering shaft for rotation therewith, and the displacement amount of the magnetic poles are determined to correspond with a phase of $\pi/2$.

The rotation sensor 20 is arranged to be opposed to the upper surface of the magnetic annular rotary member 10. The magnetoresistance element of the rotation sensor 20 is provided with superlattices 34d and 34e formed on a buffer layer in such a manner as shown in FIGS. 2(A), 2(B). The superlattices 34d and 34e are placed to correspond with the annular regions of rotary member 10. The superlattice 34d and 34e are provided with each pair of electrodes 37d and 37e, respectively. The magnetoresistance element 30 is arranged in such a manner that the surface of superlattices 34d, 34e is placed perpendicularly to the upper surface of rotary member 10 in a radial direction and that the superlattices 34d, 34e are opposed to the upper magnetized surfaces of the annular regions in parallel therewith. The rotation sensor 20 is provided with three terminals 22e–22g which are connected to the signal processing circuit 40 shown in FIG. 64 by means of a cable 23 as shown in FIG.

Figure 70:
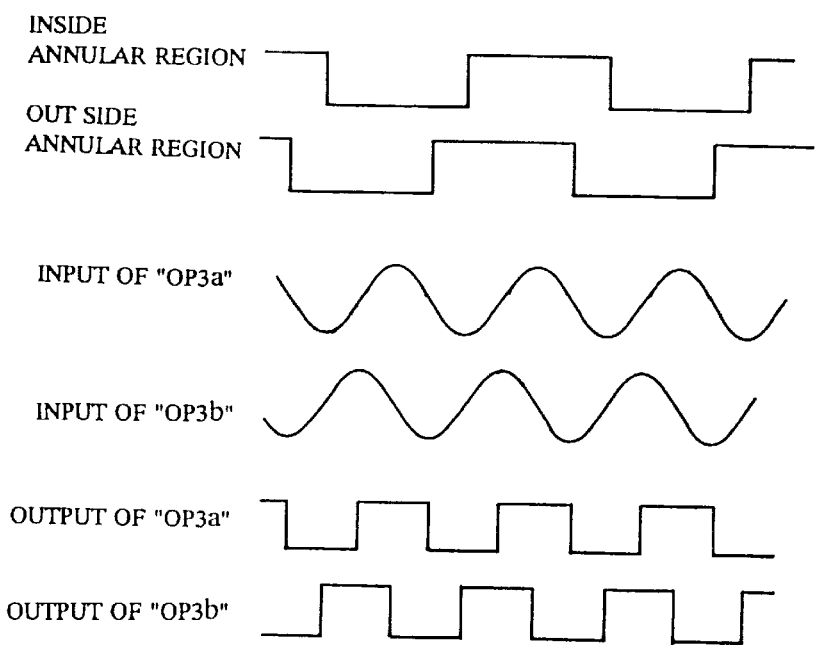
FIG. 70 is a time chart illustrating a relationship between a magnetized pattern of each annular region of the magnetic rotary elements shown in FIGS. 68(A)–68(D) and waveforms of input and output signals of each comparator in the signal processing circuit shown in FIG. 64.

6. The terminals 22e and 22f are connected to each one of the electrodes 37d, 37e, and the terminal 22g is connected in common to the other electrodes 37e–37g. In the signal processing circuit adapted to this embodiment, the circuit for the superlattice 34c shown in FIG. 64 is removed. Illustrated in FIG. 70 are input and output signals of the comparators OP3a, OP3b in the signal processing circuit 40 in relation to the magnetized pattern of the annular rotary member 10. As is understood from the illustration of FIG. 70, the signal processing circuit 40 acts to produce a series of pulse signals at a different phase of $\pi/2$ in accordance with rotation of the annular rotary member 10.

Figure 68B:
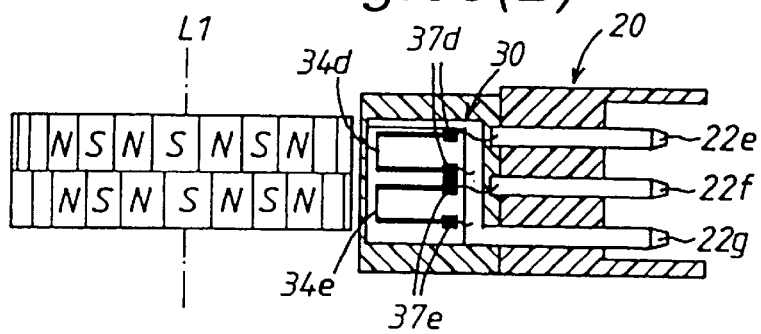

The embodiment shown in FIGS. 68(A) and 69(A) may be modified as shown in FIGS. 68(B) and 69(A), wherein the annular rotary member 10 is composed of upper and lower annular regions which are alternately magnetized with north and south magnetic poles N and S in a circumferential direction, respectively. The phase relationship in magnetization of the upper and lower annular regions is substantially the same as in the annular rotary member shown in FIG. 68(A). In this modification, the magnetoresistance element 30 of the rotation sensor 20 is arranged in such a manner that the surface of superlattices 34e, 34d is placed perpendicularly to the outer periphery of annular rotary member 10 and that the superlattices 34e, 34d are opposed to the upper and lower annular regions in parallel therewith.

Figure 68C:
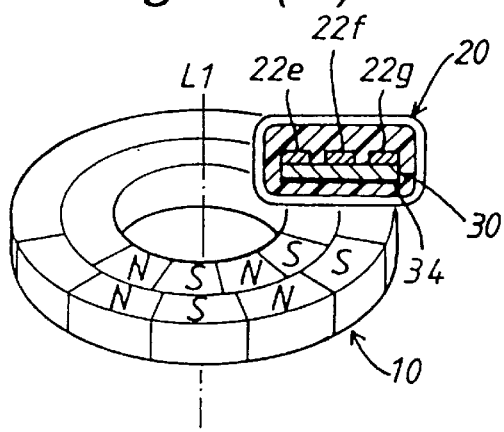
Figure 68D:
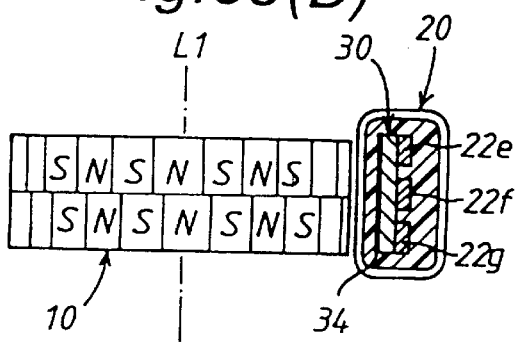
Figure 69B:
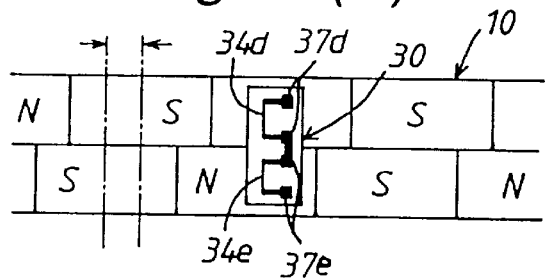
FIG. 69(B) is an enlarged view of a magnetized region respectively shown in FIGS. 68(C) and 68(D)

The embodiment shown in FIGS. 68(A) and 69(A) may be further modified as shown in FIGS. 68(C) and 69(B), wherein the magnetoresistance element 30 of the rotation sensor 20 is arranged in such a manner that the surface of superlattices 34d and 34e is placed in parallel with the magnetized upper surface of annular rotary member 10 and that the superlattices 34d and 34e are positioned in the radial direction of annular rotary member 10. The embodiment may be also modified as shown in FIGS. 68(D) and 69(B), wherein the annular rotary member 20 is composed as shown in FIG. 68(B), and wherein the magnetoresistance element 30 is arranged in such a manner that the surface of superlattices 34d, 34e is placed in parallel with the magnetized outer surface of annular rotary member 10.

Figure 71A:
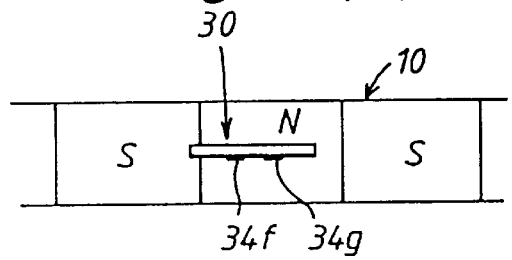
FIGS. 71(A) and 71(B) illustrate a modification of the magnetic rotation detectors shown in FIGS. 68(A)–68(D)
Figure 71B:
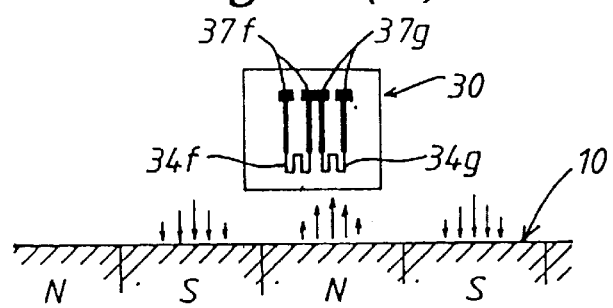

The embodiment shown in FIG. 68(A) or 68(B) may be modified to produce two series of pulse signals at the different phase of $\pi/2$. In this modification, the annular rotary member 10 is alternately magnetized at its upper surface or outer periphery with north and south magnetic poles N and S as shown in FIGS. 71(A) and 71(B), and the magnetoresistance element 30 are arranged in such a manner that the surface of superlattices 34f, 34g is placed perpendicularly to the magnetized surface of the rotary member 10 and that the superlattices 34f and 34g are located in a movement direction of the magnetized surface. The superlattices 34f and 34g are spaced in a distance of one fourth each width of the magnetic poles in the movement direction of the rotary member 10. With such an arrangement of the magnetoresistance element 30, each resistance value of the superlattices 34f and 34g changes at the different phase of $\pi/2$ in accordance with rotation of the rotary member 10. Thus, as shown in FIG. 70, two series of pulse signals are produced at the different phase of $\pi/2$.

Figure 72A:
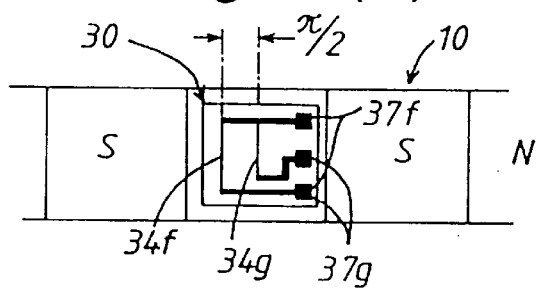
Figure 72B:
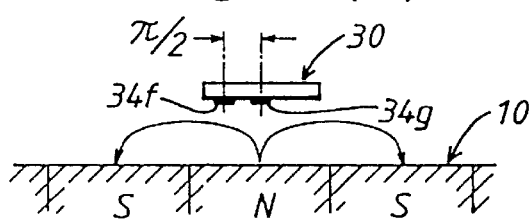

In the modification described above, the magnetoresistance element may be arranged as shown in FIGS. 72(A) and 72(B), wherein the surface of the superlattices 34f, 34g is placed in parallel with the magnetized surface of the rotary member 10, and the superlattices 34f, 34g are located perpendicularly to the movement direction of the rotary member 10. With this arrangement, each resistance value of the superlattices 34f and 34g changes at the different phase of $\pi/2$ in accordance with rotation of the rotary member 10 to produce two series of pulse signals at the different phase $\pi/2$.

What is claimed is:

1. A magnetic rotation detector comprising:
    a rotary element arranged to be rotated about a rotational axis, said rotary element being in the form of a rotary disk alternately magnetized with north and south magnetic poles in a circumferential direction;
    a magnetoresistance element arranged to be opposed to the magnetized surface of said rotary element said magnetoresistance element including a linearly patterned superlattice composed of alternately layered magnetic and nonmagnetic metals; and
    means for detecting rotation of said rotary element on a basis of variation of the resistance value of said superlattice;
    wherein a surface of said superlattice is located perpendicularly to the magnetized surface of said rotary element in a radial direction of said rotary element, and a thickness of said magetoresistance element in a circumferential direction of said rotary element is determined to be smaller than each width of said magnetic poles and wherein said rotary member is alternately magnetized with the north and south magnetic poles by using a plurality of magnetizing yokes rounded at their distal ends.

2. A magnetic rotation detector comprising:
    a rotary element arranged to be rotated about a rotational axis, said rotary element being in the form of a rotary disk alternately magnetized with north and south magnetic poles in a circumferential direction;
    a magnetoresistance element arranged to be opposed to the magnetized surface of said rotary element said magnetoresistance element including a linearly patterned superlattice composed of alternately layered magnetic and nonmagnetic metals; and
    means for detecting rotation of said rotary element on a basis of variation of the resistance value of said suiperlattice;
    wherein a surface of said superlattice is located perpendicularly to the magnetized surface of said rotary element in a radial direction of said rotary element, and a thickness of said magnetoresistance element in a circumferential direction of said rotary element is determined to be smaller than each width of said magnetic poles and wherein the linear pattern of said superlattice is formed small in width at a position where variation of the intensity of the magnetic field becomes large and is formed larger in width at a position where variation of the intensity of the magnetic field becomes small.

3. A magnetic rotation detector comprising;
    a rotary element arranged to be rotated about a rotational axis, said rotary element being in the form of a rotary disk alternately magnetized with north and south magnetic poles in a circumferential direction;
    a magnetoresistance element arranged to be opposed to the magnetized surface of said rotary element, said magnetoresistance element including a linearly patterned superlattice composed of alternately layered magnetic and nonmagnetic metals, and means for detecting rotation of said rotary element on a basis of variation of the resistance value of said superlattice;
    wherein a surface of said superlattice is located perpendicularly to the magnetized surface of said rotary element in a radial direction of said rotary element, and a thickness of said maanetoresistance element in a circumferential direction of said rotary element is determined to be smaller than each width of said magnetic poles and wherein the linear pattern of said superlattice is formed small in width at a central portion of the said magnetic rotary disk in at a radial direction and is formed larger in width at the opposite ends of said magnetic rotary disk in the radial direction.

4. A magnetic rotation detector comprising:

a rotary element arranged to be rotated about a rotational axis. said rotary element being in the form of a rotary disk alternately magnetized with north and south magnetic poles in a circumferential direction;

a magnetoresistance element arranged to be opposed to the magnetized surface of said rotary element, said magnetoresistance element including a linearly patterned superlattice composed of alternately layered magnetic and nonmagnetic metals, and means for detecting rotation of said rotary element on a basis of variation of the resistance value of said superlattice;

wherein a surface of said superlattice is located perpendicularly to the magnetized surface of said rotary element in a radial direction of said rotary element, and a thickness of said magnetoresistance element in a circumferential direction of said rotary element is determined to be smaller than each width of said magnetic poles and wherein said superlattice is in the form of at a plurality of parallel linear patterns formed on said magnetoresistance element, and wherein the linear patterns of said superlattice are formed smaller in width at a portion adjacent to the magnetized surface of said magnetic rotary element and formed larger in width at a portion apart from the magnetized surface of said magnetic rotary element.

5. A magnetic rotation detector comprising:

a rotary element arranged to be rotated about a rotational axis, said rotarm element being in the form of a rotary disk alternately magnetized with north and south magnetic poles in a circumferential direction;

a magnetoresistance element arranged to be opposed to the magnetized surface of said rotary element said magnetoresistance element including a linearly patterned superlattice composed of alternately layered magnetic and nonmagnetic metals;

means for detecting rotation of said rotary element on a basis of variation of the resistance value of said superlattice; and a magnetic plate associated with said magnetoresistance element and placed in the same plane as a surface of said superlattice to be opposed to the magnetized surface of said magnetic rotary disk;

wherein the surface of said superlattice is located perpendicularly to the magetized surface of said rotary element in a radial direction of said rotary element, and a thickness of said magnetoresistance element in a circumferential direction of said rotary element is determined to be smaller than each width of said magnetic poles.

6. A magnetic rotation detector comprising:

a rotary element arranged to be rotated about a rotational axis said rotary element being in the form of a rotary disk alternately magnetized with north and south magnetic poles in a circumferential direction;

a magnetoresistance element arranged to be opposed to the magnetized surface of said rotary element, said magnetoresistance element including a linearly patterned superlattice composed of alternately layered magnetic and nonmagnetic metals, means for detecting rotation of said rotary element on a basis of variation of the resistance value of said superlattice; and a magnetic plate having at a body portion placed in the same plane as said magnetoresistance element and at a leg portion formed in parallel with the body portion and opposed perpendicularly to the magnetized surface of said magnetic rotary element, the space between the body portion and the leg portion being determined to have the same width as that of the respective magnetic poles of said magnetic rotary disk;

wherein the surface of said superlattice is located perpendicularly to the magnetized surface of said rotary element in a radial direction of said rotary element, and a thickness of said magnetoresistance element in a circumferential direction of said rotary element is determined to be smaller than each width of said magnetic poles.

7. A magnetic rotation detector comprising:

a rotary element alternately magnetized in the same width with north and south magnetic poles in a circumferential direction and arranged to be rotatable about a rotational axis;

a magnetoresistance element arranged to be opposed to the magnetized surface of said rotary element, said magnetoresistance element including a linearly patterned superlattice composed of alternately layered magnetic and nonmagnetic metals; and means for detecting rotation of said rotary element based on variation of the resistance value of said superlattice, wherein a surface of said superlattice is arranged perpendicularly to the magnetized surface of said magnetic rotary element and located in a direction across a radial direction of said rotary element at a right angle, and wherein the resistance value of said superlattice in a unit length is determined to be higher than the other portion at two positions spaced substantially in the same distance as each width of the north and south magnetic poles of said rotary element.

8. A magnetic rotation detector comprising:

an annular rotary element having two annular regions formed adjacent to one another, the two annular regions each being alternately magnetized with north and south magnetic poles in the same width in such a manner that the magnetic poles of one of the annular region are opposed reversely in polarity to the magnetic poles of the other annular region;

a magnetoresistance element arranged to be opposed to the magnetized two annular regions of said rotary element, said magnetoresistance element including a linearly patterned superlattice composed of alternately layered magnetic and nonmagnetic metals; and means for detecting rotation of said rotary element based on variation of the resistance value of said superlattice;

wherein the surface of said superlattice is arranged perpendicularly to the magnetized two annular regions of said rotary element in a radial direction of said rotary element, and wherein said magnetoresistance element is formed smaller in thickness than each width of said magnetic poles in a circumferential direction of said rotary element.

9. A magnetic rotation detector comprising:

an annular rotary element alternately magnetized with north and south magnetic poles respectively at the inner and outer peripheries thereof in such a manner that the magnetic poles at the outer periphery are opposed reversely in polarity to the magnetic poles at the inner periphery;

a magnetoresistance element arranged to be opposed to an upper surface of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is arranged perpendicularly to the upper surface of said rotary element in the radial direction of said rotary element, and wherein said magnetoresistance element is formed smaller in thickness than each width of the magnetic poles in the circumferential direction of said rotary element.

10. A magnetic rotation detector as claimed in claim 9, wherein the resistance of said superlattice in a unit length at the opposite end portions thereof is determined to be larger than that at the central portion thereof.

11. A magnetic rotation detector as claimed in claim 8, wherein said superlattice is in the form of a plurality of parallel linear patterns formed on said magnetoresistance element.

12. A magnetic rotation detector comprising:

an annular rotary element having two annular regions formed adjacent to one another, the two annular regions each being alternately magnetized with north and south magnetic poles in the same width in such a manner the magnetic poles of one of the annular regions are opposed reversely in polarity to the magnetic poles of the other annular region;

a magnetoresistance element arranged to be opposed to the magnetized two annular regions of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is arranged in parallel with the magnetized surface of said rotary element in a direction crossing the rotational direction of said rotary element at a right angle, and wherein said superlattice is formed smaller in width than each width of the magnetic poles in the rotational direction of said rotary element.

13. A magnetic rotation detector as claimed in claim 12, wherein said rotary element is provided with a nonmagnetic portion in each space between the north and south magnetic poles in the circumferential direction.

14. A magnetic rotation detector comprising:

an annular rotary element having two annular regions formed adjacent to one another, the annular regions each being alternately magnetized with north and south magnetic poles in the same width in such a manner that the magnetic poles of one of the annular regions are opposed reversely in polarity to the magnetic poles of the other annular region;

a magnetoresistance element arranged to be opposed to the magnetized two annular regions of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is arranged in parallel with the magnetized annular regions of said rotary element and located in a direction crossing the rotational direction of said rotary element at a right angle, and wherein said superlattice is formed smaller in width than each width of the magnetic poles in the rotational direction of said rotary element.

15. A magnetic rotation detector comprising:

an annular rotary element alternately magnetized in the same width with north and south magnetic poles respectively at first and second annular surfaces thereof in such a manner that the magnetic poles at the first annular surface are opposed reversely in polarity to the magnetic poles at the second annular surface;

a magnetoresistance element arranged to be opposed to one of magnetized annular surfaces of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is arranged in parallel with a third annular surface of said rotary element in a direction crossing the rotational direction of said rotary element at a right angle, and wherein said superlattice is formed smaller in width than each width of the magnetic poles in the rotational direction of said rotary element.

16. A magnetic rotation detector as claimed in claim 12, wherein said rotary element is provided with a nonmagnetic region in each space between the north and south magnetic poles.

17. A magnetic rotation detector comprising:

a rotary element having first and second surfaces in parallel to one another, the first surface of said rotary element being magnetized with a plurality of circumferentially equally spaced first magnetic poles in the same width while the second surface of said rotary element being magnetized with a plurality of circumferentially equally spaced second magnetic poles at each position opposed to the first magnetic poles;

a magnetoresistance element arranged to be opposed to a third surface of said rotary element perpendicular to the first and second surfaces, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is arranged in parallel with the third surface of said rotary element in a direction crossing the rotational direction of said rotary element at a right angle, and wherein said superlattice is formed smaller in width than each width of the magnetic poles in the rotational direction of said rotary element.

18. A magnetic rotation detector as claimed in claim 12, wherein said superlattice is in the form of a plurality of parallel linear patterns formed on said magnetoresistance element.

19. A magnetic rotation detector as claimed in claim 12, wherein said superlattice is provided with a pair of parallel magnetized regions at the opposite ends thereof in a longitudinal direction of said magnetoresistance element.

20. A magnetic rotation detector as claimed in claim 12, wherein said superlattice is provided with a pair of parallel magnetized regions at the opposite sides thereof in parallel with a longitudinal direction of said magnetoresistance element.

21. A magnetic rotation detector comprising:

an annular rotary element having first and second annular regions formed adjacent to one another, the first annular region is alternately magnetized in the same width with north and south magnetic poles while the second region is alternately magnetized in the same width with north and south magnetic poles which are circumferentially displaced from the magnetic poles of the first annular region in each half width thereof;

a magnetoresistance element arranged to be opposed to the magnetized annular regions of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is opposed to the magnetized annular regions of said rotary element in parallel therewith in a direction crossing the rotational direction of said rotary element at a right angle, and wherein said superlattice is formed smaller in width than a half width of each of the magnetic poles in the rotational direction of said rotary element.

22. A magnetic rotation detector comprising:

an annular rotary element having a plurality of circumferentially divided regions which are inclined at a predetermined angle relative to a surface of said rotary element, the divided regions being alternately magnetized with north and south magnetic poles;

a magnetoresistance element arranged to be opposed to the magnetized regions of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is opposed to the magnetized regions of said rotary element in parallel therewith in a direction crossing the rotational direction of said rotary element at a right angle, and wherein said superlattice is formed smaller in width than a half width of each of the magnetic poles in the rotational direction of said rotary element.

23. A magnetic rotation detector comprising:

an annular rotary element having a plurality of circumferentially equally spaced regions each of which is magnetized with a first magnetic pole, said rotary element being circumferentially magnetized with a second magnetic pole at each space between the magnetized regions;

a magnetoresistance element arranged to be opposed to the magnetized regions of said rotary element, said magnetoresistance element including a linearly patterned superlattice composed of alternately layered magnetic and nonmagnetic metals; and means for detecting rotation of said rotary element based on variation of the resistance value of said superlattice;

wherein a surface of said superlattice is opposed to the magnetized regions of said rotary element in parallel therewith in a direction crossing the rotational direction of said rotary element at a right angle, and wherein said superlattice is formed smaller in width than the second magnetic pole of said rotary element in the rotational direction of said rotary element.

* * * * *